(12) United States Patent
Lucky et al.

(10) Patent No.: US 10,833,759 B2
(45) Date of Patent: *Nov. 10, 2020

(54) WIRELESS COMMUNICATION LOCATION REPORTING AND PAGING

(71) Applicant: QUALCOMM Incorporated, San Diego, CA (US)

(72) Inventors: Kundan Kumar Lucky, Bangalore (IN); Fatih Ulupinar, San Diego, CA (US); Rohit Kapoor, Bangalore (IN); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,582

(22) Filed: Sep. 19, 2019

(65) Prior Publication Data

US 2020/0014461 A1     Jan. 9, 2020

Related U.S. Application Data

(63) Continuation of application No. 15/735,140, filed as application No. PCT/US2016/040199 on Jun. 29, 2016, now Pat. No. 10,432,297.

(30) Foreign Application Priority Data

Jul. 24, 2015 (IN) .......................... 3802/CHE/2015
Nov. 13, 2015 (IN) .......................... 6106/CHE/2015

(51) Int. Cl.
*H04W 64/00* (2009.01)
*H04B 7/185* (2006.01)
(Continued)

(52) U.S. Cl.
CPC .......... *H04B 7/18547* (2013.01); *H04B 7/02* (2013.01); *H04B 7/18543* (2013.01);
(Continued)

(58) Field of Classification Search
CPC .... G06F 1/3231; G06F 1/3206; H04W 4/023; H04W 52/0209; H04W 4/027;
(Continued)

(56) References Cited

U.S. PATENT DOCUMENTS 5,959,577 A    9/1999   Fan et al.
6,091,952 A    7/2000   Xu et al.
(Continued)

FOREIGN PATENT DOCUMENTS

CN    1672347 A      9/2005
CN    101374346 A    2/2009
(Continued)

OTHER PUBLICATIONS

"Mobile Location Update using Distance Method" by Wasif, dated Sep. 2012 (Year: 2012).*

(Continued)

*Primary Examiner* — Daniel Lai

(57) ABSTRACT

The disclosure relates in some aspects to location reporting and paging for satellite communication. In one aspect, the disclosure relates to a user terminal (UT) sending a message to report information about the UT's location. A threshold may be used to control whether (e.g., when) the UT reports its location. The location information may be used to enforce area (e.g., country) restrictions for the UT. In one aspect, the disclosure relates to forwarding paging messages between network access controllers. For example, a network access controller that is not able to page a UT may forward a paging message to another network access controller. In one aspect, (Continued)

the disclosure relates to a list of paging areas that indicates where a UT need not perform a paging area update.

22 Claims, 39 Drawing Sheets

(51) Int. Cl.
| | | |
|---|---|---|
| *H04B 7/204* | (2006.01) | |
| *H04B 7/02* | (2018.01) | |
| *H04W 76/19* | (2018.01) | |
| *H04W 68/02* | (2009.01) | |
| *H04W 84/02* | (2009.01) | |

(52) U.S. Cl.
CPC ..... *H04B 7/18545* (2013.01); *H04B 7/18567* (2013.01); *H04B 7/2041* (2013.01); *H04W 64/006* (2013.01); *H04W 68/02* (2013.01); *H04W 76/19* (2018.02); *H04W 84/02* (2013.01)

(58) Field of Classification Search
CPC ......... H04W 52/0241; H04W 52/0254; H04W 52/0235; H04W 64/00; H04W 76/10; H04W 76/19; H04W 76/20; H04W 76/27; H04W 24/10; H04W 76/28; H04W 88/02; H04W 24/02; H04W 68/02; H04W 36/32; H04W 4/02; H04W 68/00; H04W 24/04; H04W 36/00; H04W 4/029; H04W 52/0251; H04W 64/006; H04W 84/02; H04B 7/18547; H04B 7/18543; H04B 7/02; H04B 7/18545; H04B 7/18567
See application file for complete search history.

(56) References Cited

U.S. PATENT DOCUMENTS

| | | |
|---|---|---|
| 6,195,555 B1 | 2/2001 | Dent |
| 6,278,876 B1 | 8/2001 | Joshi et al. |
| 6,424,831 B1 | 7/2002 | Schiff |
| 6,515,619 B1 | 2/2003 | McKay, Jr. |
| 6,560,461 B1 | 5/2003 | Fomukong et al. |
| 6,609,002 B1 | 8/2003 | Krishnamurthy et al. |
| 6,611,688 B1 | 8/2003 | Raith |
| 6,915,210 B2 | 7/2005 | Longhurst et al. |
| 6,996,372 B2 | 2/2006 | Noerpel et al. |
| 8,374,629 B2 | 2/2013 | Yin |
| 8,872,701 B2 | 10/2014 | Cheng et al. |
| 2002/0138650 A1 | 9/2002 | Yamamoto et al. |
| 2004/0002814 A1 | 1/2004 | Gogic et al. |
| 2004/0181703 A1 | 9/2004 | Lilja et al. |
| 2006/0258369 A1 | 11/2006 | Burroughs et al. |
| 2007/0105567 A1 | 5/2007 | Mohanty et al. |
| 2007/0149192 A1 | 6/2007 | Kim et al. |
| 2009/0080359 A1 | 3/2009 | Song et al. |
| 2010/0009643 A1 | 1/2010 | Haartsen |
| 2010/0061308 A1 | 3/2010 | Becker et al. |
| 2010/0238887 A1 | 9/2010 | Koodli et al. |
| 2010/0246467 A1 | 9/2010 | Song et al. |
| 2010/0273504 A1 | 10/2010 | Bull et al. |
| 2011/0069664 A1 | 3/2011 | Yin et al. |
| 2011/0096669 A1 | 4/2011 | Iovieno et al. |
| 2012/0207013 A1 | 8/2012 | Kamalaraj et al. |
| 2012/0258734 A1 | 10/2012 | Takahashi et al. |
| 2013/0143563 A1 | 6/2013 | Singh et al. |
| 2013/0178216 A1 | 7/2013 | Chang et al. |
| 2013/0250825 A1 | 9/2013 | Gosal et al. |
| 2014/0045492 A1 | 2/2014 | Zakaria et al. |
| 2014/0068066 A1 | 3/2014 | Zhang |
| 2014/0099978 A1 | 4/2014 | Egner et al. |
| 2014/0243017 A1 | 8/2014 | Das et al. |
| 2015/0257195 A1 | 9/2015 | Koskinen et al. |
| 2016/0088462 A1 | 3/2016 | Jin et al. |
| 2017/0257752 A1 | 9/2017 | Yin et al. |
| 2018/0175932 A1 | 6/2018 | Lucky et al. |
| 2018/0269959 A1 | 9/2018 | Lucky et al. |

FOREIGN PATENT DOCUMENTS

| | | |
|---|---|---|
| CN | 101491013 A | 7/2009 |
| CN | 101621741 A | 1/2010 |
| CN | 102457891 A | 5/2012 |
| EP | 0506255 A2 | 9/1992 |
| EP | 0662758 A2 | 7/1995 |
| EP | 0808035 A2 | 11/1997 |
| EP | 0963061 A2 | 12/1999 |
| EP | 0973274 A2 | 1/2000 |
| EP | 1862811 A2 | 12/2007 |
| EP | 1928126 A2 | 6/2008 |
| EP | 2063660 A1 | 5/2009 |
| EP | 2117135 A1 | 11/2009 |
| EP | 2276319 A1 | 1/2011 |
| EP | 2991417 A1 | 3/2016 |
| JP | 2000040990 A | 2/2000 |
| JP | 2000078067 A | 3/2000 |
| JP | 2003219474 A | 7/2003 |
| JP | 2007028513 A | 2/2007 |
| JP | 2007316034 A | 12/2007 |
| JP | 2008141533 A | 6/2008 |
| JP | 2008172380 A | 7/2008 |
| JP | 2010118731 A | 5/2010 |
| WO | WO-9405093 A1 | 3/1994 |
| WO | WO-9814796 A2 | 4/1998 |
| WO | WO-9831165 A2 | 7/1998 |
| WO | WO-9960725 A1 | 11/1999 |
| WO | WO-0010026 A2 | 2/2000 |
| WO | WO-0059132 A1 | 10/2000 |
| WO | WO-0059136 A1 | 10/2000 |
| WO | WO-2004004404 A2 | 1/2004 |
| WO | WO-2005062066 A2 | 7/2005 |
| WO | WO-2008115379 A1 | 9/2008 |
| WO | WO-2012039439 A1 | 3/2012 |
| WO | WO-2013085242 A1 | 6/2013 |
| WO | WO-2014119921 A1 | 8/2014 |
| WO | WO-2014186969 A1 | 11/2014 |

OTHER PUBLICATIONS

International Preliminary Report on Patentability—PCT/US2016/040198—The International Bureau of WIPO—Geneva, Switzerland, dated Nov. 22, 2017.
International Preliminary Report on Patentability—PCT/US2016/040199—The International Bureau of WIPO—Geneva, Switzerland, dated Nov. 22, 2017.
International Search Report and Written Opinion—PCT/US2016/040198—ISA/EPO—dated Sep. 30, 2016.
International Search Report and Written Opinion—PCT/US2016/040199—ISA/EPO—dated Jul. 21, 2017.
LTE Control Plane on Intel®Architecture by Intel, Jan. 2013, 13 pages.
Partial International Search Report and Written Opinion—PCT/US2016/040199—ISA/EPO—dated Apr. 13, 2017.

* cited by examiner

WIRELESS COMMUNICATION LOCATION REPORTING AND PAGING

CROSS-REFERENCE TO RELATED APPLICATION(S)

This application is continuation of U.S. patent application Ser. No. 15/735,140, filed Dec. 8, 2017, which is a 371 national stage application of international patent application number PCT/US2016/040199, filed Jun. 29, 2016, which claims priority to and the benefit of patent application number 3802/CHE/2015 filed in the India Patent Office on Jul. 24, 2015 and patent application number 6106/CHE/2015 filed in the India Patent Office on Nov. 13, 2015, the content of each of which is incorporated herein by reference.

INTRODUCTION

Various aspects described herein relate to satellite communication, and more particularly but not exclusively, to location reporting and paging for non-geosynchronous satellite communication.

Some satellite-based communication systems include gateways and one or more satellites. In some aspects, a satellite is an orbiting receiver and repeater that relays communication signals between the gateways and one or more user terminals. A gateway is an earth station having an antenna for transmitting signals to and receiving signals from communication satellites. A gateway provides communication links, using satellites, for connecting a user terminal to other user terminals or users of other communication systems, such as a public switched telephone network, the Internet, public networks, and private networks.

Geosynchronous satellites have long been used for communication. A geosynchronous satellite is stationary relative to a given location on the Earth. However, because geosynchronous satellites are limited to a geosynchronous orbit (GSO), which is a circle having a radius of approximately 42,164 km from the center of the Earth directly above the Earth's equator, the number of satellites that may be placed in the GSO is limited.

As alternatives to geosynchronous satellites, communication systems which utilize a constellation of satellites in non-geosynchronous orbits, such as low-earth orbits (LEO), have been devised to provide communication coverage to the entire Earth or at least large parts of the Earth. In non-geosynchronous satellite-based systems, such as LEO satellite-based systems, the satellites move relative to a communication device (such as a gateway or a user terminal (UT)) on the ground. Thus, a UT may be handed-off from one satellite to another satellite after the UT falls within the footprint (also referred to as a coverage area) of the other satellite.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: receive a paging message for a user terminal (UT); determine whether a first network access controller (NAC) can page the UT; and forward the paging message to a second NAC if the first NAC cannot page the UT.

Another aspect of the disclosure provides a method for communication including: receiving a paging message for a user terminal (UT); determining whether a first network access controller (NAC) can page the UT; and forwarding the paging message to a second NAC if the first NAC cannot page the UT.

Another aspect of the disclosure provides an apparatus configured for communication. The apparatus including: means for receiving a paging message for a user terminal (UT); means for determining whether a first network access controller (NAC) can page the UT; and means for forwarding the paging message to a second NAC if the first NAC cannot page the UT.

Another aspect of the disclosure provides a non-transitory computer-readable medium storing computer-executable code, including code to: receive a paging message for a user terminal (UT); determine whether a first network access controller (NAC) can page the UT; and forward the paging message to a second NAC if the first NAC cannot page the UT.

In one aspect, the disclosure provides an apparatus configured for communication that includes a memory and a processor coupled to the memory. The processor and the memory are configured to: detect a change in a location of a user terminal (UT) beyond a threshold distance; and send a message including location information for the UT, wherein the sending of the message is triggered by the detection of the change in the location of the UT.

Another aspect of the disclosure provides a method for communication including: detecting a change in a location of a user terminal (UT) beyond a threshold distance; and sending a message including location information for the UT, wherein the sending of the message is triggered by the detection of the change in the location of the UT.

Another aspect of the disclosure provides an apparatus configured for communication. The apparatus including: means for detecting a change in a location of a user terminal (UT) beyond a threshold distance; and means for sending a message including location information for the UT, wherein the sending of the message is triggered by the detection of the change in the location of the UT.

Another aspect of the disclosure provides a non-transitory computer-readable medium storing computer-executable code, including code to: detect a change in a location of a user terminal (UT) beyond a threshold distance; and send a message including location information for the UT, wherein the sending of the message is triggered by the detection of the change in the location of the UT.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Various aspects of the disclosure relate to location reporting and paging for satellite communication. In some aspects, location reporting for satellite communication involves detecting a change in a location of a UT beyond a threshold distance and, in response to the detection of the change in the location of the UT, sending a message including location information for the UT. For example, a UT may report information about its location to a satellite network entity such as a network access controller (NAC). The UT may send this message periodically, upon registration, upon re-allocation of an identifier for the UT, when there is a change in the UT's location, or at other times. The NAC may provide the UT with a threshold (e.g., a distance-based threshold) that controls whether (e.g., when) the UT reports its location information. As used herein, the term UT location information can refer to information about the location of a UT and/or information about the motion of a UT.

In some aspects, paging for satellite communication involves forwarding paging messages between satellite network entities. For example, a first NAC may forward a received paging message to a second NAC in a neighboring satellite network portal (SNP) if the second NAC can reach the UT at the time of paging. To this end, the first NAC may conduct a query to determine whether it is the right NAC to handle a paging message for a UT at paging time. If the first NAC cannot page the UT, the first NAC determines whether the second NAC can page the UT. If the second NAC can page the UT, the first UT forwards the paging message to the second NAC. These and other aspects of the disclosure are described below in further detail.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

Figure 1:
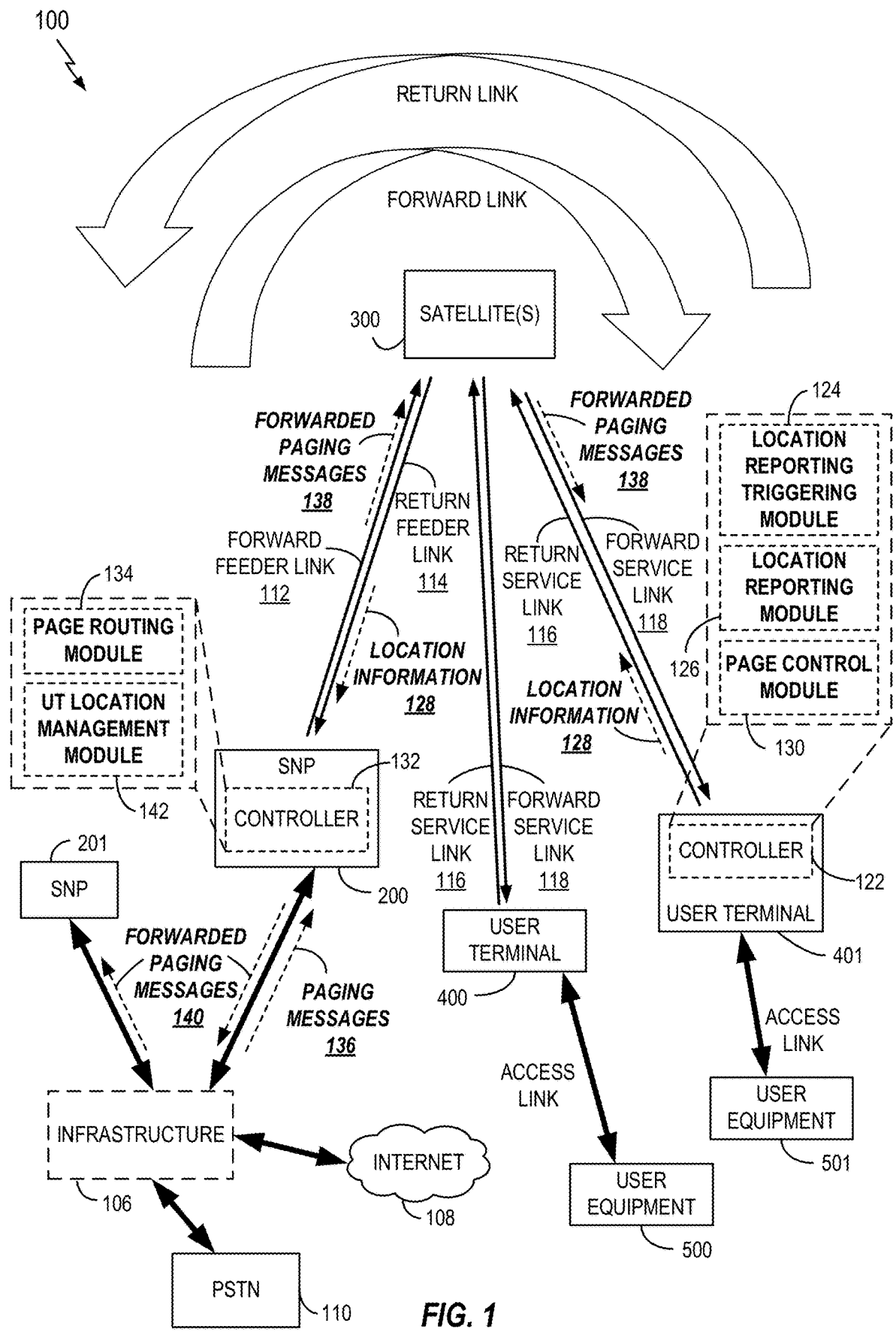
FIG. 1 is a block diagram of an example satellite communication system in accordance with some aspects of the disclosure.

FIG. 1 illustrates an example of a satellite communication system 100 which includes a plurality of satellites (although only one satellite 300 is shown for clarity of illustration) in non-geosynchronous orbits, for example, low-earth orbits (LEO). The system 100 also includes an SNP 200 (e.g., corresponding to a satellite gateway) in communication with the satellite 300, a plurality of UTs 400 and 401 in communication with the satellite 300, and a plurality of user equipment (UE) 500 and 501 in communication with the UTs 400 and 401, respectively.

Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or the UE 501 may be a device (e.g., access point, small cell, etc.) that is used to communicate to one or more end user devices.

In the example illustrated in FIG. 1, the UT 400 and the UE 500 communicate with each other via a bidirectional access link (having a forward access link and a return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or the UT 401. Alternatively, a UT and a corresponding UE may be integral parts of a single physical device, such as a mobile telephone with an integral satellite transceiver and an antenna for communicating directly with a satellite, for example.

The SNP 200 may have access to the Internet 108 or one or more other types of public, semiprivate or private networks. In the example illustrated in FIG. 1, the SNP 200 is in communication with infrastructure 106, which is capable of accessing the Internet 108 or one or more other types of public, semiprivate or private networks. The SNP 200 may also be coupled to various types of communication backhaul, including, for example, landline networks such as optical fiber networks or public switched telephone networks (PSTN) 110. Further, in alternative implementations the SNP 200 may interface to the Internet 108, PSTN 110, or one or more other types of public, semiprivate or private networks without using the infrastructure 106. Still further, the SNP 200 may communicate with other SNPs, such as the SNP 201 through the infrastructure 106 or alternatively may be configured to communicate to the SNP 201 without using the infrastructure 106. The infrastructure 106 may include, in whole or part, a network control center (NCC), a satellite control center (SCC), a wired and/or wireless core network and/or any other components or systems used to facilitate operation of and/or communication with the satellite communication system 100.

Communication between the satellite 300 and the SNP 200 in both directions are called feeder links, whereas communication between the satellite and each of the UTs 400 and 401 in both directions are called service links. A signal path from the satellite 300 to a ground station, which may be the SNP 200 or one of the UTs 400 and 401, may be generically called a downlink (DL). A signal path from a ground station to the satellite 300 may be generically called an uplink (UL). Additionally, as illustrated, signals can have a general directionality such as a forward link and a return link (or reverse link). Accordingly, a communication link in a direction originating from the SNP 200 and terminating at the UT 400 through the satellite 300 is called a forward link, whereas a communication link in a direction originating from the UT 400 and terminating at the SNP 200 through the satellite 300 is called a return link or a reverse link. As such, the signal path from the SNP 200 to the satellite 300 is labeled a "Forward Feeder Link" 112 whereas the signal path from the satellite 300 to the SNP 200 is labeled a "Return Feeder Link" 114 in FIG. 1. In a similar manner, the signal path from each UT 400 or 401 to the satellite 300 is labeled a "Return Service Link" 116 whereas the signal path from the satellite 300 to each UT 400 or 401 is labeled a "Forward Service Link" 118 in FIG. 1.

The UT 401 includes a controller 122 for location reporting operations and paging operations. A location reporting triggering module 124 of the controller 122 triggers the reporting of the location of the UT 401, thereby causing a location reporting module 126 to send location information 128 to the SNP 200 via the return links. A page control module 130 of the controller 122 processes paging-related messages sent to the UT 401. Other components of the satellite communication system 100 may include corresponding controllers as well. However, the controller 122 is only illustrated for the UT 401 to reduce the complexity of FIG. 1.

The SNP 200 includes a controller 132 for paging operations and location reporting management operations. A page routing module 134 of the controller 132 manages paging messages 136 received from the network (e.g., from the PSTN 110 or some other entity). In some cases, the page routing module 134 forwards paging messages 138 to the UT 401 via the forward links. In other cases, the page routing module 134 forwards paging messages 140 to the SNP 201. A UT location management module 142 controls location information reporting by the UT 401 and processes the location information 128 received from the UT 401. Other components of the satellite communication system 100 may include corresponding controllers as well. However, a controller is only illustrated for the SNP 200 to reduce the complexity of FIG. 1.

Figure 2:
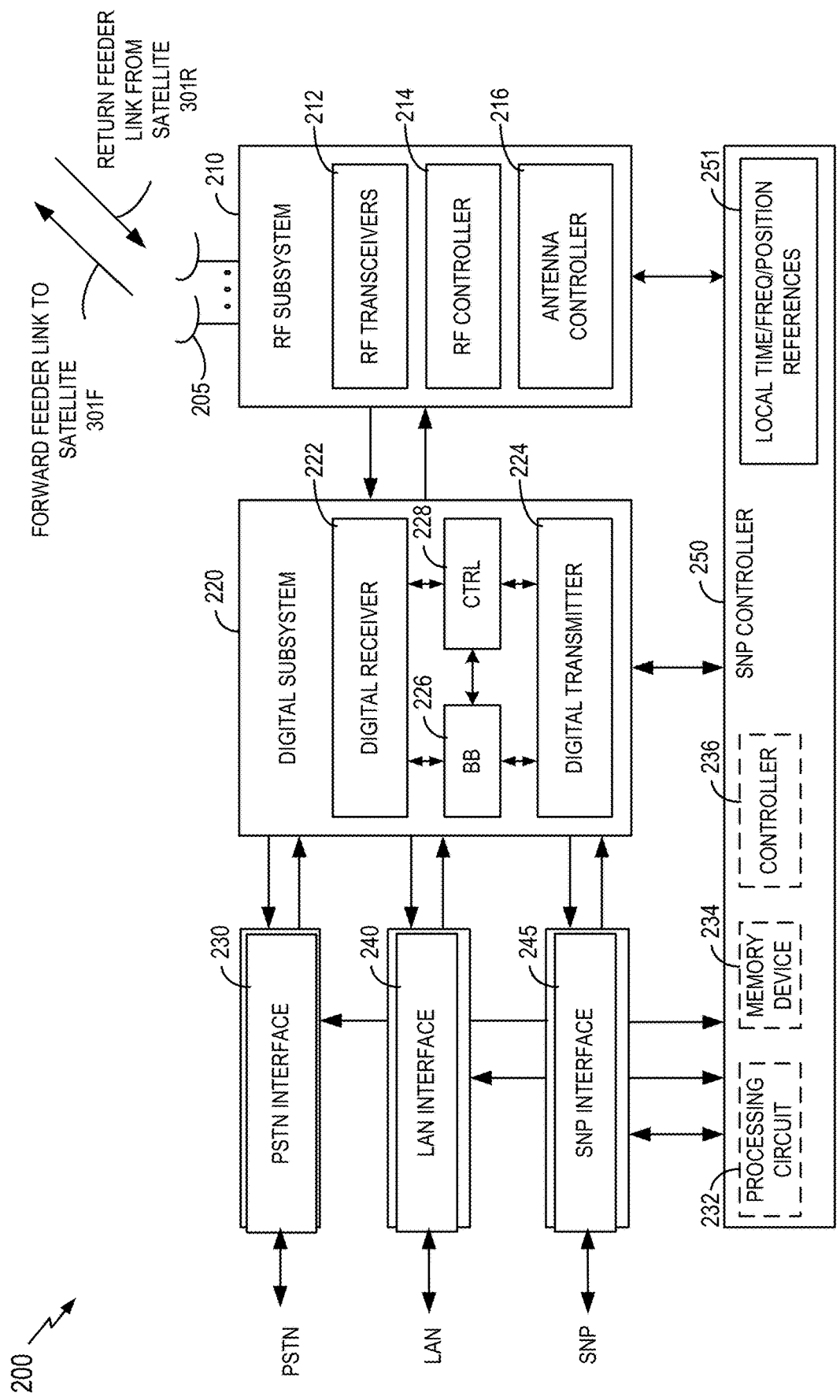
FIG. 2 is a block diagram of one example of a satellite network portal (SNP) of FIG. 1 in accordance with some aspects of the disclosure.

FIG. 2 is an example block diagram of the SNP 200, which also can apply to the SNP 201 of FIG. 1. The SNP 200 is shown to include a number of antennas 205, an RF subsystem 210, a digital subsystem 220, a Public Switched Telephone Network (PSTN) interface 230, a Local Area Network (LAN) interface 240, an SNP interface 245, and an SNP controller 250. The RF subsystem 210 is coupled to the antennas 205 and to the digital subsystem 220. The digital subsystem 220 is coupled to the PSTN interface 230, to the LAN interface 240, and to the SNP interface 245. The SNP controller 250 is coupled to the RF subsystem 210, the digital subsystem 220, the PSTN interface 230, the LAN interface 240, and the SNP interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (P_A) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of a number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communication between the SNP 200 and the UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to the digital receiver modules 222, the digital transmitter modules 224, and the baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the SNP 200 to a ground-based network (e.g., the Internet).

The LAN interface 240 may provide communication signals to, and receive communication signals from, an external LAN. For example, the LAN interface 240 may be coupled to the Internet 108 either directly or through additional infrastructure 106, as illustrated in FIG. 1. The LAN interface 240 is well known in the art, and therefore is not described in detail herein.

The SNP interface 245 may provide communication signals to, and receive communication signals from, one or more other SNPs associated with the satellite communication system 100 of FIG. 1 (and/or to/from SNPs associated with other satellite communication systems, not shown for simplicity). For some implementations, the SNP interface 245 may communicate with other SNPs via one or more dedicated communication lines or channels (not shown for simplicity). For other implementations, the SNP interface 245 may communicate with other SNPs using the PSTN 110 and/or other networks such as the Internet 108 (see also FIG. 1). For at least one implementation, the SNP interface 245 may communicate with other SNPs via the infrastructure 106.

Overall SNP control may be provided by the SNP controller 250. The SNP controller 250 may plan and control utilization of the satellite 300's resources by the SNP 200. For example, the SNP controller 250 may analyze trends, generate traffic plans, allocate satellite resources, monitor (or track) satellite positions, and monitor the performance of the SNP 200 and/or the satellite 300. The SNP controller 250 may also be coupled to a ground-based satellite controller (not shown for simplicity) that maintains and monitors orbits of the satellite 300, relays satellite usage information to the SNP 200, tracks the positions of the satellite 300, and/or adjusts various channel settings of the satellite 300.

For the example implementation illustrated in FIG. 2, the SNP controller 250 includes local time, frequency, and position references 251, which may provide local time or frequency information to the RF subsystem 210, the digital subsystem 220, and/or the interfaces 230, 240, and 245. The time or frequency information may be used to synchronize the various components of the SNP 200 with each other and/or with the satellite(s) 300. The local time, frequency, and position references 251 may also provide position information (e.g., ephemeris data) of the satellite(s) 300 to the various components of the SNP 200. Further, although depicted in FIG. 2 as included within the SNP controller 250, for other implementations, the local time, frequency, and the position references 251 may be a separate subsystem that is coupled to the SNP controller 250 (and/or to one or more of the digital subsystem 220 and the RF subsystem 210).

Although not shown in FIG. 2 for simplicity, the SNP controller 250 may also be coupled to a network control center (NCC) and/or a satellite control center (SCC). For example, the SNP controller 250 may allow the SCC to communicate directly with the satellite(s) 300, for example, to retrieve ephemeris data from the satellite(s) 300. The SNP controller 250 may also receive processed information (e.g., from the SCC and/or the NCC) that allows the SNP controller 250 to properly aim its antennas 205 (e.g., at the appropriate satellite(s) 300), to schedule beam transmissions, to coordinate handoffs, and to perform various other well-known functions.

The SNP controller 250 may include one or more of a processing circuit 232, a memory device 234, or a controller 236 that independently or cooperatively perform paging-related operations and/or location information management operations for the SNP 200 as taught herein. In an example implementation, the processing circuit 232 is configured (e.g., programmed) to perform some or all of these operations. In another example implementation, the processing circuit 232 (e.g., in the form of a processor) executes code stored in the memory device 234 to perform some or all of these operations. In another example implementation, the controller 236 (e.g., including application specific logic) is configured (e.g., programmed) to perform some or all of these operations. Although depicted in FIG. 2 as included within the SNP controller 250, for other implementations, one or more of the processing circuit 232, the memory device 234, or the controller 236 may be a separate subsystem that is coupled to the SNP controller 250 (and/or to one or more of the digital subsystem 220 and the RF subsystem 210).

Figure 3:
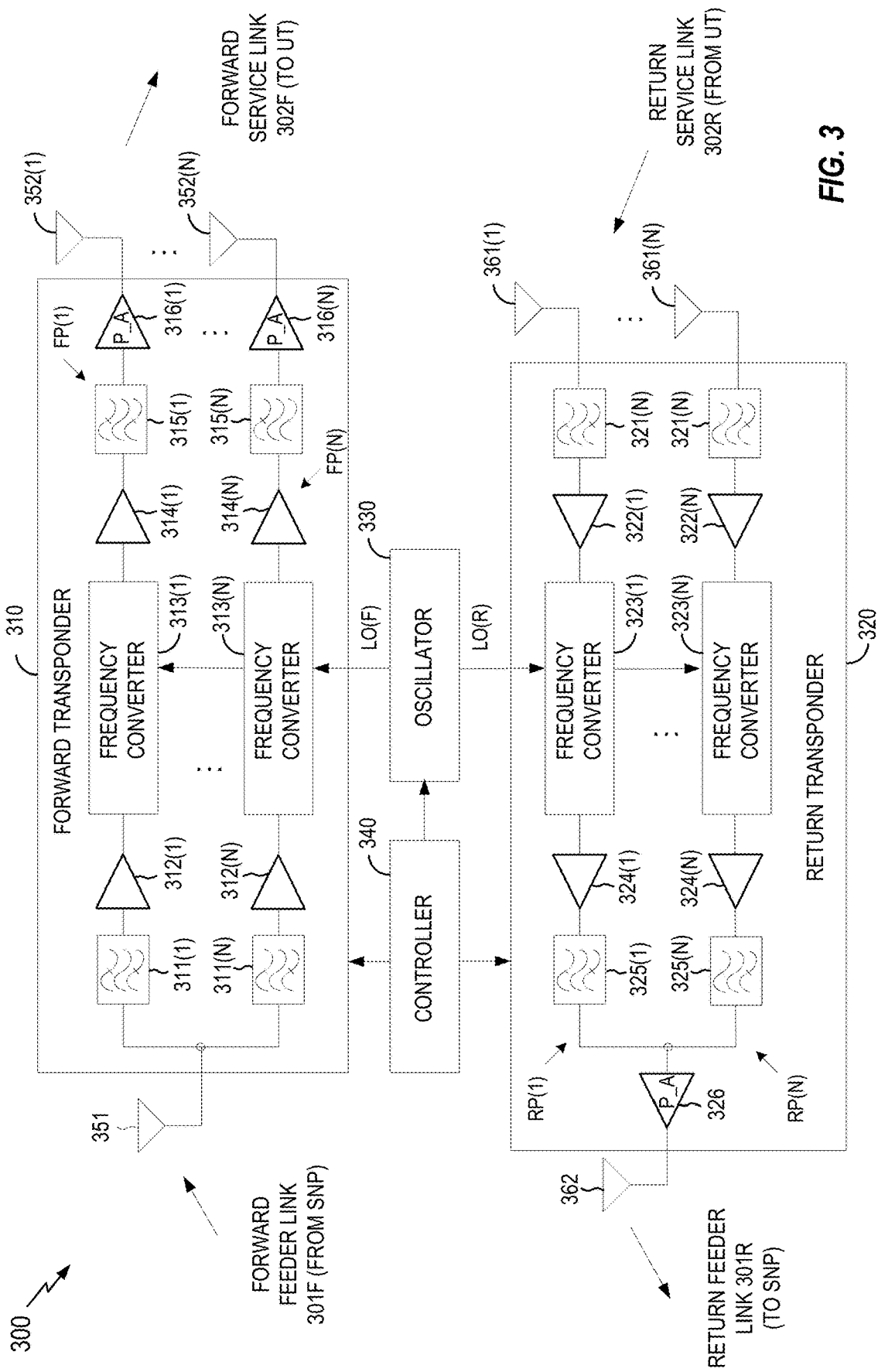
FIG. 3 is a block diagram of one example of a satellite of FIG. 1 in accordance with some aspects of the disclosure.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the SNP 200 and the UT 400. It will be appreciated that the disclosure is not limited to any specific satellite configuration and any satellite or combinations of satellites that can provide the functional connection between the SNP 200 and UT 400 can be considered within the scope of the disclosure. In one example, the satellite 300 is shown to include a forward transponder 310, a return transponder 320, an oscillator 330, a controller 340, forward link antennas 351 and 352(1)-352(N), and return link antennas 362 and 361(1)-361(N). The forward transponder 310, which may process communication signals within a corresponding channel or frequency band, may include a respective one of first bandpass filters 311(1)-311(N), a respective one of first low noise amplifiers (LNAs) 312(1)-312(N), a respective one of frequency converters 313(1)-313(N), a respective one of second LNAs 314(1)-314(N), a respective one of second bandpass filters 315(1)-315(N), and a respective one of power amplifiers (P_As) 316(1)-316(N). Each of the P_As 316(1)-316(N) is coupled to a respective one of antennas 352(1)-352(N), as shown in FIG. 3.

Within each of respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from the satellite 300 to the UT 400). The second LNA 314 amplifies the frequency-converted communication signals, and the second bandpass filter 315 filters signal components having frequencies outside of the associated channel width. The P_A 316 amplifies the filtered signals to a power level suitable for transmission to the UTs 400 via a respective antenna 352. The return transponder 320, which includes a number N of return paths RP(1)-RP(N), receives communication signals from the UT 400 along the return service link 302R via the antennas 361(1)-361(N), and transmits communication signals to the SNP 200 along the return feeder link 301R via one or more of the antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from the satellite 300 to the SNP 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a P_A 326. The P_A 326 amplifies the combined signals for transmission to the SNP 200.

The oscillator 330, which may be any suitable circuit or device that generates an oscillating signal, provides a forward local oscillator signal LO(F) to the frequency converters 313(1)-313(N) of the forward transponder 310, and provides a return local oscillator signal LO(R) to the frequency converters 323(1)-323(N) of the return transponder 320. For example, the LO(F) signal may be used by the frequency converters 313(1)-313(N) to convert communication signals from a frequency band associated with the transmission of signals from the SNP 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the SNP 200.

The controller 340, which is coupled to the forward transponder 310, the return transponder 320, and the oscillator 330, may control various operations of the satellite 300 including (but not limited to) channel allocations. In one aspect, the controller 340 may include a memory (not shown) coupled to a processing circuit (e.g., a processor). The memory may include a non-transitory computer-readable medium (e.g., one or more nonvolatile memory elements, such as an EPROM, an EEPROM, a Flash memory, a hard drive, etc.) storing instructions that, when executed by the processing circuit, cause the satellite 300 to perform operations including (but not limited to) those described herein.

Figure 4:
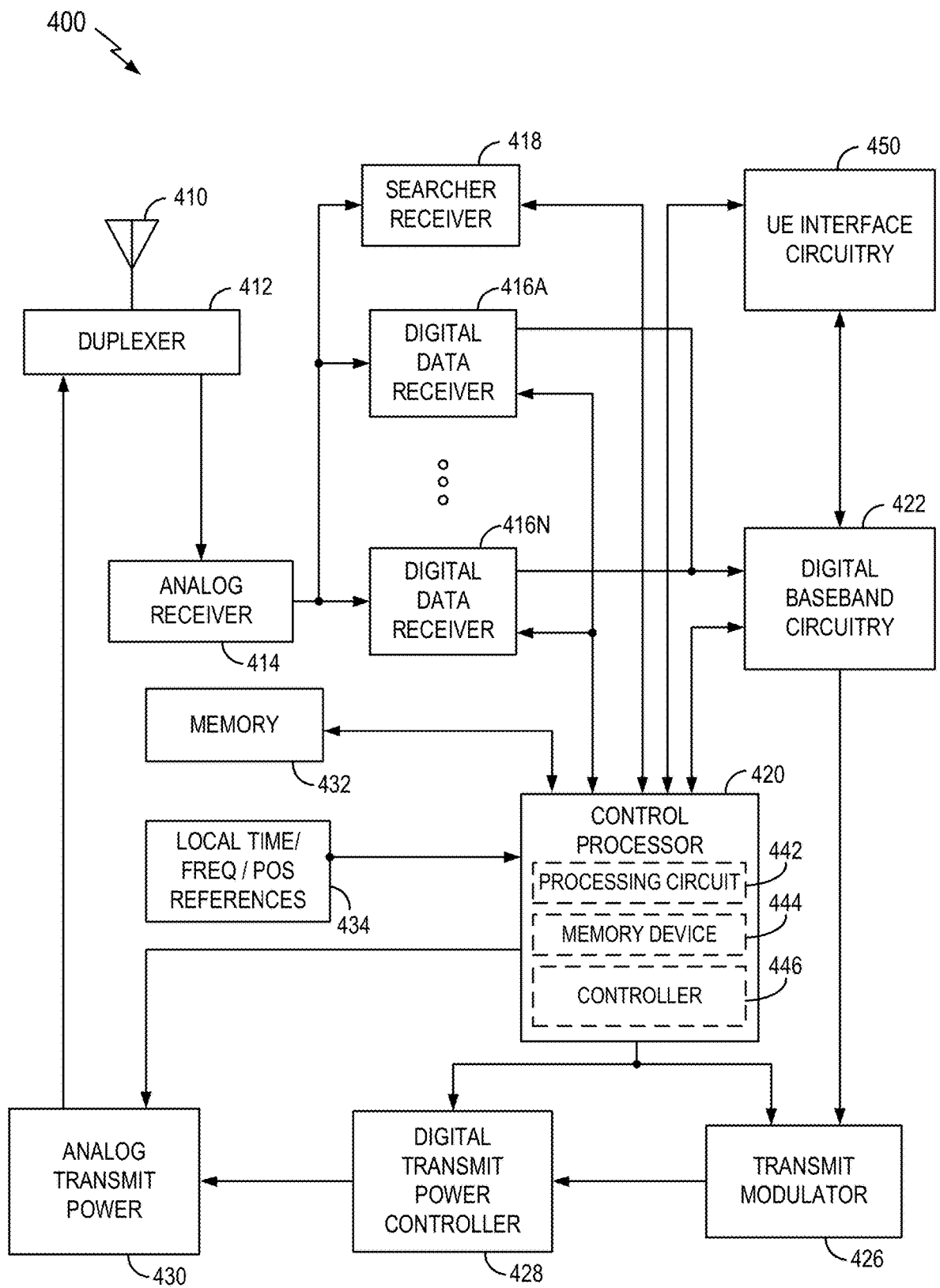
FIG. 4 is a block diagram of one example of a user terminal of FIG. 1 in accordance with some aspects of the disclosure.

An example of a transceiver for use in the UT 400 or the UT 401 is illustrated in FIG. 4. In FIG. 4, at least one antenna 410 is provided for receiving forward link communication signals (e.g., from the satellite 300), which are transferred to an analog receiver 414, where they are downconverted, amplified, and digitized. A duplexer element 412 is often used to allow the same antenna to serve both transmit and receive functions. Alternatively, a UT transceiver may use separate antennas for operating at different transmit and receive frequencies.

The digital communication signals output by the analog receiver 414 are transferred to at least one digital data receiver 416A and at least one searcher receiver 418. Additional digital data receivers (e.g., as represented by a digital data receiver 416N) can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 includes processing and presentation elements used to transfer information to and from the UE 500 as shown in FIG. 1, for example. Referring to FIG. 4, if diversity signal processing is used, the digital baseband circuitry 422 may include a diversity combiner and decoder (not shown). Some of these elements may also operate under the control of, or in communication with, a control processor 420.

When voice or other data is prepared as an output message or a communication signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., the satellite 300).

In FIG. 4, the UT transceiver also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also use frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element (e.g., the memory 432) as desired.

The control processor 420 may also be coupled to the UE interface circuitry 450 to allow communication between the UT 400 and one or more UEs. The UE interface circuitry 450 may be configured as desired for communication with various UE configurations and accordingly may include various transceivers and related components depending on the various communication technologies used to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

The control processor 420 may include one or more of a processing circuit 442, a memory device 444, or a controller 446 that independently or cooperatively perform location reporting-related operations and/or paging-related operations for the UT 400 as taught herein. In an example implementation, the processing circuit 442 is configured (e.g., programmed) to perform some or all of these operations. In another example implementation, the processing circuit 442 (e.g., in the form of a processor) executes code stored in the memory device 444 to perform some or all of these operations. In another example implementation, the controller 446 (e.g., including application specific logic) is configured (e.g., programmed) to perform some or all of these operations. Although depicted in FIG. 4 as included within the control processor 420, for other implementations, one or more of the processing circuit 442, the memory device 444, or the controller 446 may be a separate subsystem that is coupled to the control processor 420.

Figure 5:
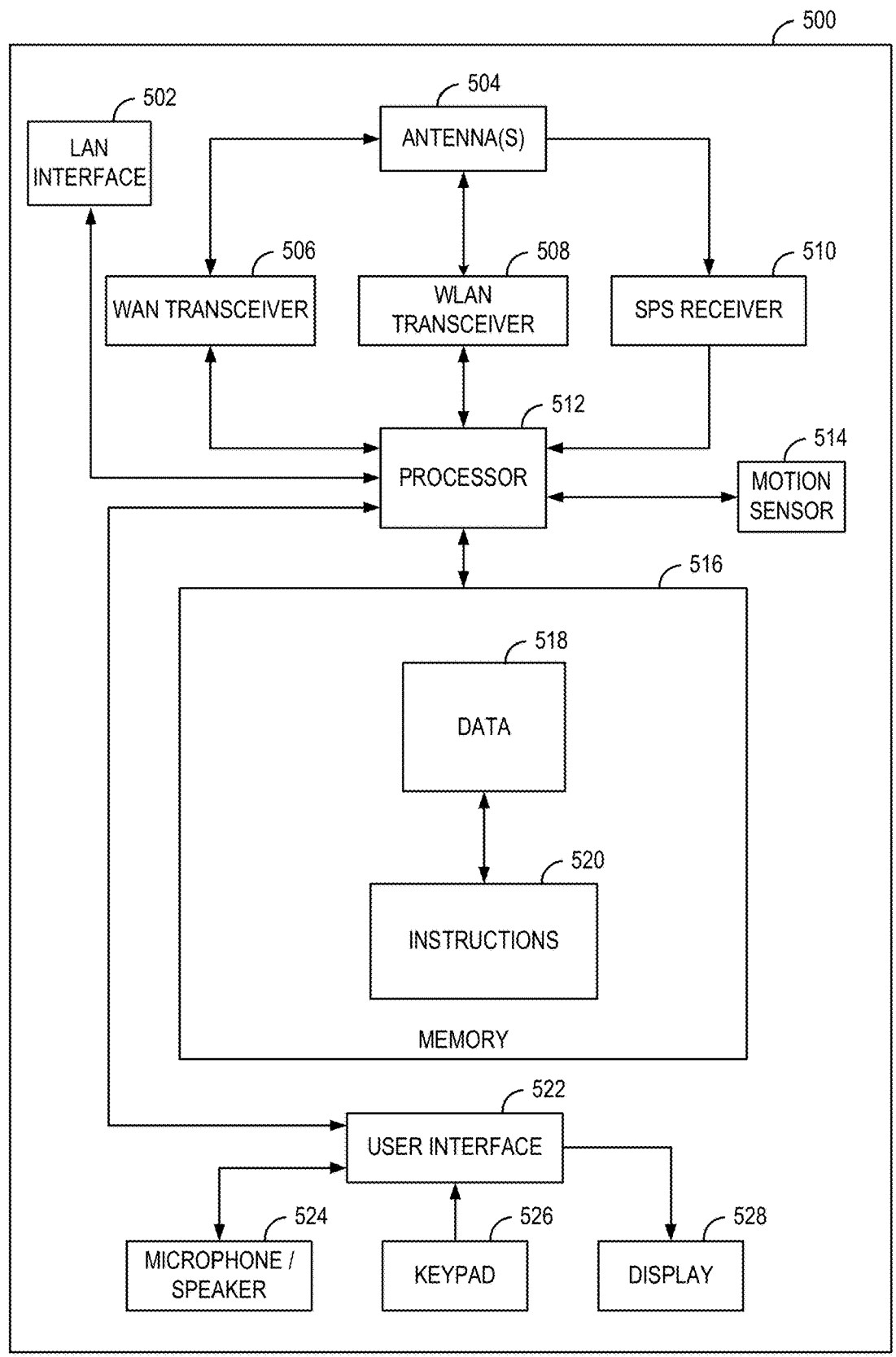
FIG. 5 is a block diagram of one example of a user equipment of FIG. 1 in accordance with some aspects of the disclosure.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various's ultimate end user devices and/or to various public or private networks. In the example shown in FIG. 5, the UE 500 may include a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a WI-FI transceiver, with or without the LAN interface 502, the WAN transceiver 506, and/or the SPS receiver 510, for example. Further, the UE 500 may include additional transceivers such as BLUETOOTH, ZIGBEE and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510.

Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

In the example shown in FIG. 1, the two UTs 400 and 401 may conduct two-way communication with the satellite 300 via return and forward service links within a beam coverage (i.e., with the coverage area of the beam). A satellite may communicate with more than two UTs within a beam coverage. The return service link from the UTs 400 and 401 to the satellite 300 may thus be a many-to-one channel. Some of the UTs may be mobile while others may be stationary, for example. In a satellite communication system such as the example illustrated in FIG. 1, multiple UTs 400 and 401 within a beam coverage may be time-division-multiplexed (TDM'ed), frequency-division-multiplexed (FDM'ed), or both.

At some point in time, a UT may need to be handed-off to another satellite (not shown in FIG. 1). Handoff may be caused by scheduled events or unscheduled events.

Several examples of handoff due to scheduled events follow. Inter-beam and inter-satellite handoff may be caused by movement of the satellite, movement of the UT, or a satellite beam being turned off (e.g., due to a Geo-stationary satellite (GEO) restriction). Handoff also may be due to a satellite moving out of the SNP's range while the satellite is still within the UT's line of sight.

Several examples of handoff due to nonscheduled events follow. Handoff may be triggered by a satellite being obscured by an obstacle (e.g., a tree). Handoff also may be triggered due to a drop in channel quality (e.g., signal quality) due to rain fade or other atmospheric conditions.

In some implementations, at a particular point in time, a particular satellite may be controlled by a particular entity (e.g., a network access controller, NAC) in an SNP. Thus, an SNP may have several NACs (e.g., implemented by the SNP controller 250 of FIG. 2), each of which controls a corresponding one of the satellites controlled by the SNP. In addition, a given satellite may support multiple beams. Thus, over time, different types of handoff may occur.

In inter-beam handoff, a UT is handed-off from one beam of a satellite to another beam of the satellite. For example, the particular beam serving a stationary UT may change over time as the serving satellite moves.

In inter-satellite handoff, a UT is handed-off from the current serving satellite (referred to as the source satellite) to another satellite (referred to as the target satellite). For example, a UT may be handed-off to the target satellite as the source satellite moves away from the UT and the target satellite moves toward the UT.

Example Functional Blocks

Figure 6:
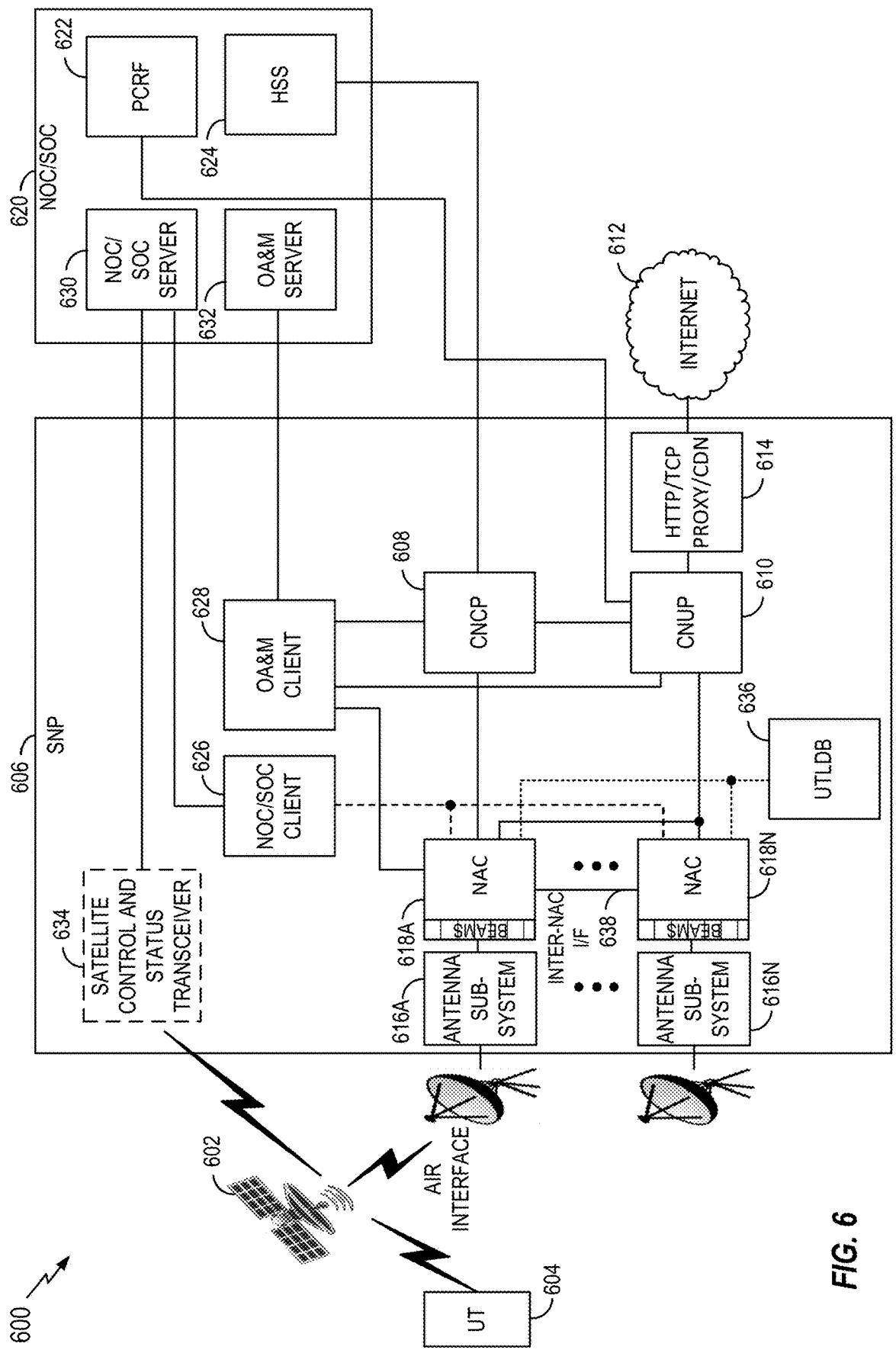
FIG. 6 is a block diagram of an example communication architecture in accordance with some aspects of the disclosure.

Prior to discussing additional details of location reporting and paging functions according to the teachings herein, example functional blocks that may be used to provide these functions will be described with reference to FIG. 6. This figure illustrates a portion of a satellite system 600 that includes a number of satellites 602, UTs 604, and SNPs 606. To reduce the complexity of FIG. 6, only a single satellite 602, a single UT 604, and a single SNP 606 are shown. The satellite 602 is an example of the satellite 300 of FIG. 1. The UT 604 is an example of the UT 400 or the UT 401 of FIG. 1. The SNP 606 is an example of the SNP 200 or the SNP 201 of FIG. 1. In some implementations, the system 600 may be a non-geosynchronous satellite communication system, such as a low-earth orbit (LEO) satellite communication system, for data, voice, video, or other communication.

The satellite 602 may project a number of beams on earth. The satellite 602 can receive signals from and transmit signals to the UT 604 provided the UT 604 is within the coverage area (footprint) of the satellite 602. The coverage area of the satellite 602 is the geographic region on the surface of the earth within the range of signals of the satellite 602. The coverage area is usually geographically divided into beams through the use of antennas (e.g., the antennas may be used to create fixed, static beams or may be used to create dynamically adjustable beams through beam-forming techniques). Each beam covers a particular geographic region within the coverage area. Beams may be directed so that more than one beam from the same satellite covers the same specific geographic region. In addition, beams from multiple satellites may be directed to cover the same geographic region. In some aspects, a beam may correspond to or be referred to as a cell.

Each satellite 602 in the system 600 is controlled by a NAC 618 (represented by the NACs 618A-618N) to facilitate communication with one or more UTs 604. A NAC 618 performs radio network functions. To this end, each NAC 618 interfaces with a corresponding antenna subsystem 616 for sending beams to and receiving beams from the satellites 602 for communication with the UTs 604. At some times, however, a NAC 618 may be idle (i.e., the NAC 618A might not control any satellites 602 for a period of time).

In some aspects, a collection of NACs 618 may constitute an SNP 606. Each SNP 606 includes a core network control-plane (CNCP) 608 that performs core network-related functions and a core network user-plane (CNUP) 610 that provides connectivity to another network. In the example, of FIG. 6, the CNUP 610 connects to the Internet 612 via a hypertext transfer protocol/transmission control protocol (HTTP/TCP) proxy/content delivery network (Proxy/CDN) 614.

The CNCP 608 and the CNUP 610 connect to a network operations center/security operations center (NOC/SOC) 620. In particular, the CNUP 610 communicates with a policy and charging rules function (PCRF) 622 and the CNCP 608 communicates with a home subscriber server (HSS) 624 in the NOC/SOC 620.

The SNP 606 includes an NOC/SOC client 626 and an operations, administration and maintenance (OA&M) client 628 that respectively communicate with an NOC/SOC server 630 and an OA&M server 632 of the NOC/SOC 620.

The SNP 606 optionally includes a satellite control and status transceiver 634 that communicates with the NOC/SOC server 630 to enable the NOC/SOC 620 to communicate with the satellites 602.

The SNP 606 also includes a database, referred to as the UT location and motion information database (UTLDB) 636. The UTLDB 636 stores information regarding the locations (e.g., current position, current motion, projected path, etc.) of the UTs 604 in the satellite system 600. An entity for storing location information may be referred to, in a more general sense, as a position locator subsystem (PLS). Thus, references to a UTLDB herein may be more broadly applicable to a PLS.

The NAC 618 may perform various UT location information management operations. The NAC 618 may receive location information for the UT 604 from the UT 604 or some other entity. The NAC 618 stores the received UT location information in the UTLDB 636 or in some other suitable storage location (e.g., a remote database).

The NAC 618 may query the UTLDB 636 or other storage location for the location and motion information for a particular UT. For example, the NAC 618 may query the UTLDB 636 for the location and motion information for the UT 604 in response to a paging message received from the core network (or some other trigger). Based on this information, the NAC 618 can determine if it is the right NAC to handle the paging message at paging time.

The SNP 606 included an inter-NAC interface 638 that enables the NACs 618 to directly communicate with one another. For example, the NAC 618A may send (e.g., forward) a paging message to the NAC 618N via the inter-NAC interface 638.

If the UT 604 was previously served by a first NAC of a first SNP (not shown) and is now being served by the NAC 618 of the SNP 606, communication may be routed between the UT 604 and the CNUP of the first SNP via a VPN gateway (not shown) of the SNP 606. When the NAC 618 decides that the UT 604 has moved sufficiently into the coverage area of the SNP 606, the NAC 618 may send a message to the UT 604 instructing the UT 604 to perform a re-attach procedure when the UT 604 moves to the SNP 606. When the UT 604 attempts to re-attach, the NAC 618 may then connect the UT 604 to the CNCP 608 associated with the SNP 606.

The NAC 618 may send a message to the UT 604 to provide the UT 604 with a list of the paging areas (PAs) where the UT 604 is not required to perform a paging area update (PAU). In this way, fewer pages may be sent in the system 600 and associated networks.

The NAC 618 may enforce area restrictions or other restrictions for the UT 604 based on the location and motion information for the UT. Examples of an area restriction include a country restriction (e.g., that indicates which UTs are allowed service in different countries), a defined geographical area, a legal area, or some other suitable area-related restriction. For example, upon receiving location information for the UT 604, if no service is allowed based on the location of the UT 604, the NAC 618 may send a radio connection release message to the UT 604 indicating that service has been rejected.

UT Location Reporting

The disclosure relates in some aspects to a UT sending a message to report information about the UT's location and/or motion. For example, a UT may send this information to the NAC of the satellite that is currently serving the UT. Several examples of operations that may be performed by a UT, a NAC, and other components in support of UT location reporting will now be described with respect to FIGS. 7-13.

Figure 7:
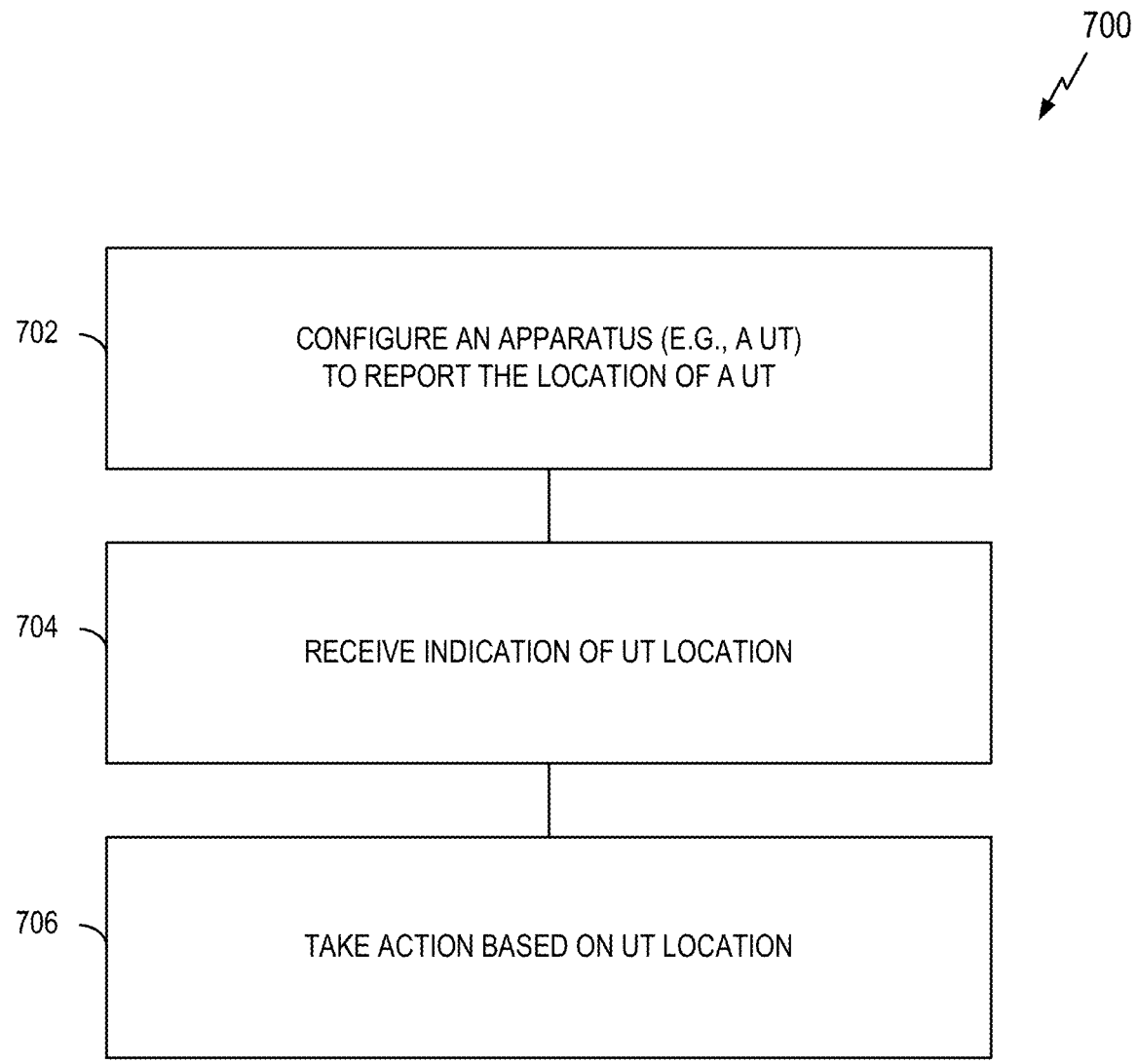
FIG. 7 is a flowchart illustrating an example of a location reporting process in accordance with some aspects of the disclosure.

FIG. 7 is a diagram illustrating an example of a process 700 for using location information in accordance with some aspects of the disclosure. The process 700 may take place within a processing circuit which may be located in a NAC, an SNP, or some other suitable apparatus (device). In some implementations, the process 700 represents operations performed by the SNP controller 250 of FIG. 2. In some implementations, the process 700 represents operations performed by the apparatus 2100 of FIG. 21 (e.g., by the processing circuit 2110). Of course, in various aspects within the scope of the disclosure, the process 700 may be implemented by any suitable apparatus capable of supporting communication-related operations.

At block 702, a NAC (or other suitable apparatus) configures an apparatus (e.g., a UT) to report the location of a UT. For example, the NAC may send location reporting thresholds to the UT and/or send other information about a location reporting trigger.

At block 704, the NAC (or other suitable apparatus) receives an indication of the location of the UT. For example, the NAC may receive a UT location and motion report message from the UT.

At block 706, the NAC (or other suitable apparatus) takes action based on the reported UT location. For example, as discussed below, the NAC may use the location information to determine whether to connect to the UT for paging operations or for other operations.

Figure 8:
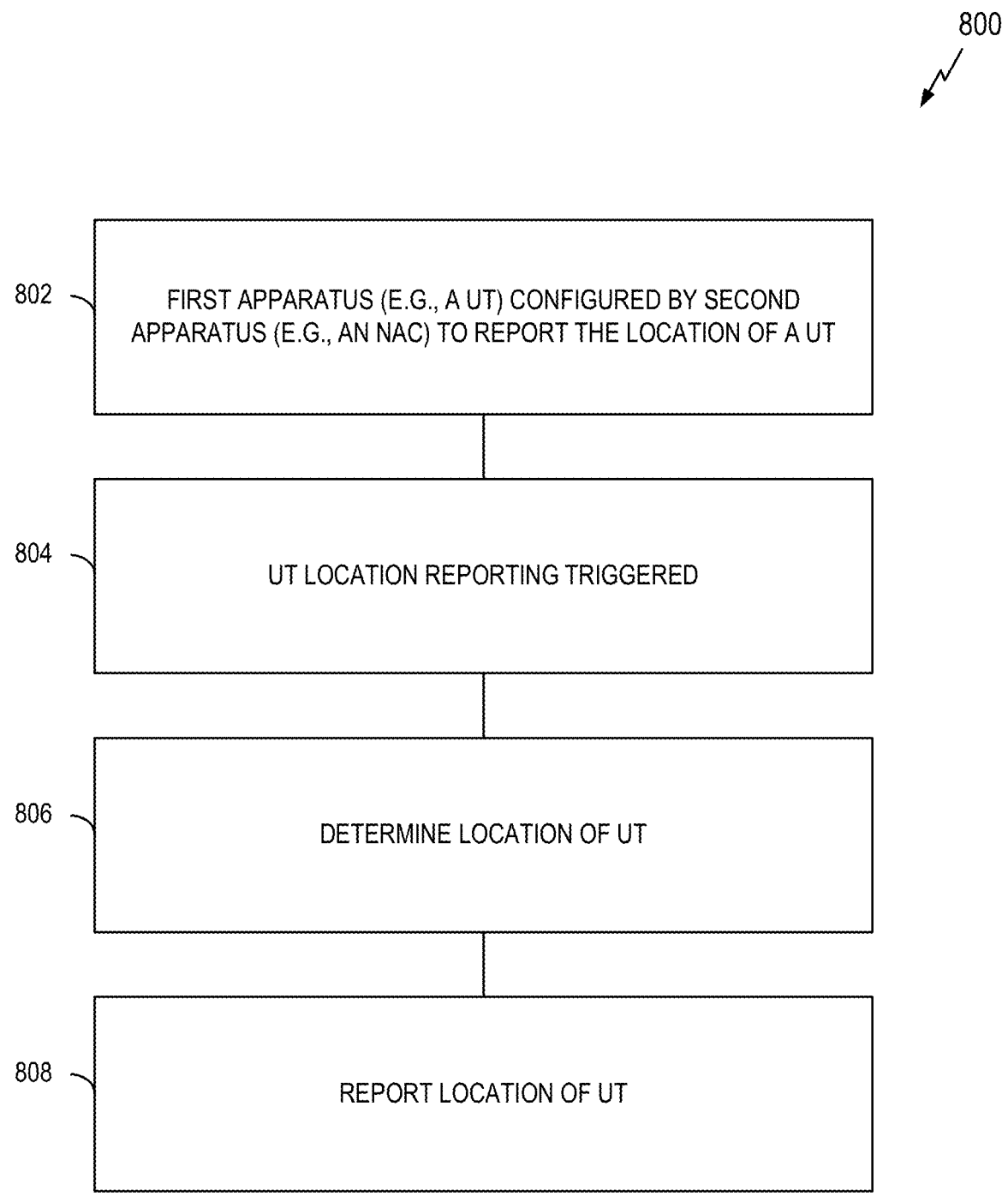
FIG. 8 is a flowchart illustrating another example of a location reporting process in accordance with some aspects of the disclosure.

FIG. 8 is a diagram illustrating an example of a process 800 for reporting location information in accordance with some aspects of the disclosure. The process 800 may take place within a processing circuit which may be located in a UT or some other suitable apparatus (device). In some implementations, the process 800 represents operations performed by the control processor 420 of FIG. 4. In some implementations, the process 800 represents operations performed by the apparatus 3100 of FIG. 31 (e.g., by the processing circuit 3110). Of course, in various aspects within the scope of the disclosure, the process 800 may be implemented by any suitable apparatus capable of supporting communication-related operations.

At block 802, a UT (or other suitable apparatus) is configured by an apparatus (e.g., a NAC) to report the location of a UT. For example, the UT may receive location reporting thresholds and/or other information about a location reporting trigger from the NAC.

At block 804, location reporting is triggered at the UT (or other suitable apparatus). For example, UT location reporting may be triggered: (1) periodically; (2) when there is a completion of a registration-related procedure with a CNCP; (3) when there is a re-allocation of a Core Network Temporary Identity (CNTI), the CNCP level UE identity of the UT; (4) when there is a change in the UT's location and/or motion beyond a certain threshold; (5) or at times based on some combination of the above.

At block 806, the UT (or other suitable apparatus) determines the UT's location. For example, the UT can use a GPS mechanism to determine its location.

At block 808, the UT (or other suitable apparatus) sends a message reporting the UT's location information to the appropriate entity (e.g., a NAC). The message may include at least one of the following information elements (IEs): a UT identifier (e.g., a CNTI), longitude, latitude, elevation, speed (for moving UTs), direction (for moving UTs), or an old CNTI (for clearing an old UTLDB entry).

Figure 9:
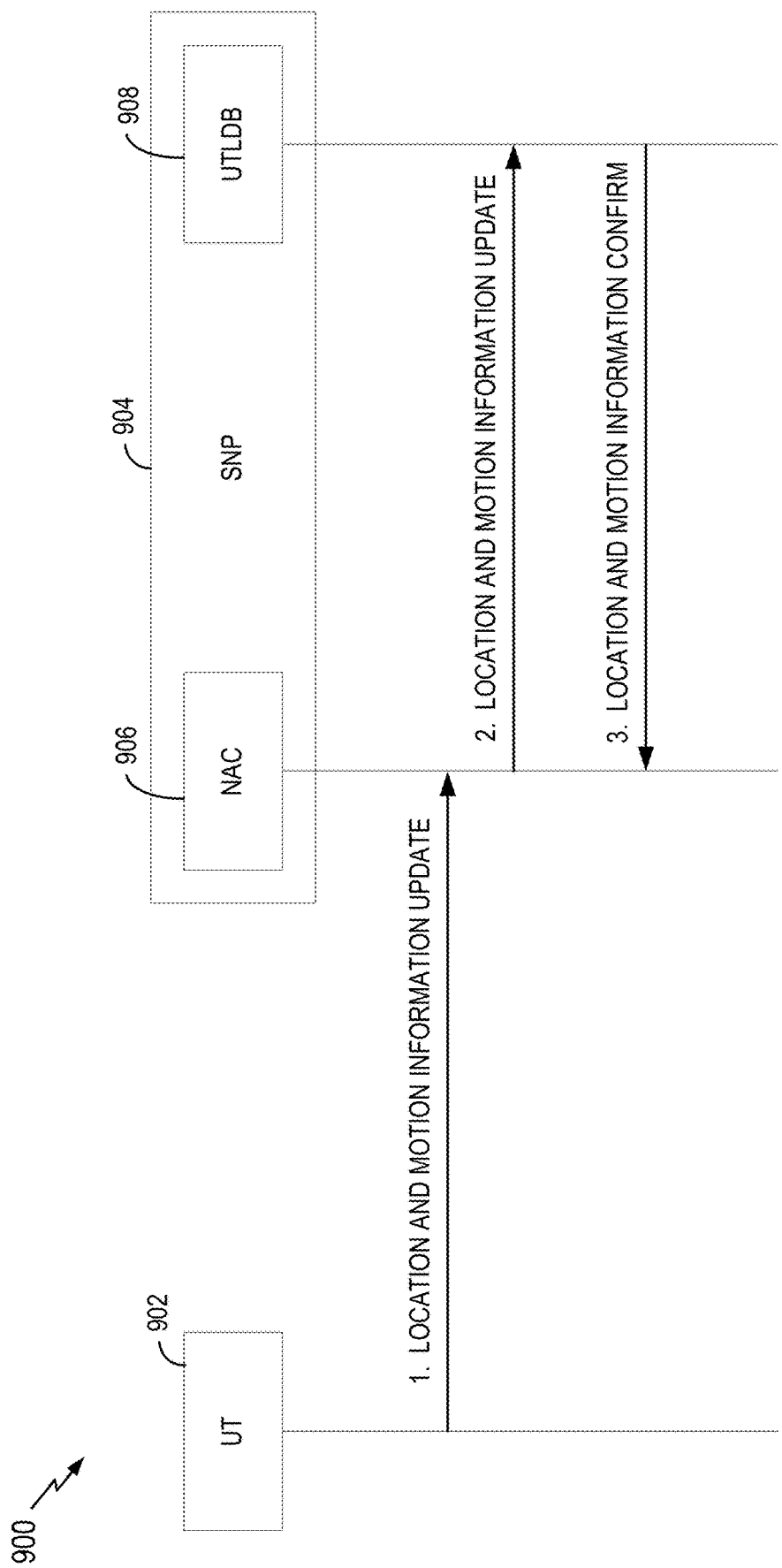
FIG. 9 is a timing diagram illustrating an example of UT location and motion information reporting in accordance with some aspects of the disclosure.

FIG. 9 is a call flow diagram 900 illustrating an example of a call flow for generating and using location information in accordance with some aspects of the disclosure. The call flow will be discussed in the context of a satellite communication system that includes a UT 902 and an SNP 904. The SNP 904 includes a NAC 906 and a UT location database (UTLDB) 908. The UT 902 is an example of the UT 400 or the UT 401 of FIG. 1. The SNP 904 is an example of the SNP 200 or the SNP 201 of FIG. 1. The NAC 906 is an example of the NAC 618 of FIG. 6. The UTLDB 908 is an example of the UTLDB 636 of FIG. 6. Other components could be used in other implementations.

At a first operation (1), once UT location reporting is triggered, the UT 902 reports its location and motion information to the NAC 906 of the SNP 904 via a Location and Motion Information Update message. At a second operation (2), the NAC 906 sends a corresponding UT Location and Motion Information Update message to the UTLDB 908. At a third operation (3), the UTLDB 908 stores the UT's location and motion information and responds with a UT Location and Motion Information Confirm message. The NAC 906 can also cache the UT location and motion information locally (e.g., for stationary UTs).

Elaborating further, a NAC may send a UT Location and Motion Information Update message to an UTLDB upon receiving a Location and Motion Information Update message from the UT. This can trigger one or more of creation, updating, or clearing of an entry in the UTLDB. The UT information may be maintained with reference to the UT's CNTI. An entry in the UTLDB may have one or more of the following elements: CNTI; longitude; latitude; elevation; speed for moving UTs, or direction for moving UTs.

As mentioned above, the UTLDB may send a UT Location and Motion Information Confirm message in response to the update sent by the NAC. The sending of this message may serve as a confirmation of the information update.

Subsequently, the NAC may use the information in the UTLDB for paging or other operations. For example, a NAC may send a UT Location and Motion Information Request message upon receiving a PAGING message via a CNCP (not shown in FIG. 9) to query the location of a UT. The UTLDB may then send a UT Location and Motion Information Response message in response to the query sent by the NAC about the location of a UT. Again, the NAC may cache the information received for the stationary UTs.

Figure 10:
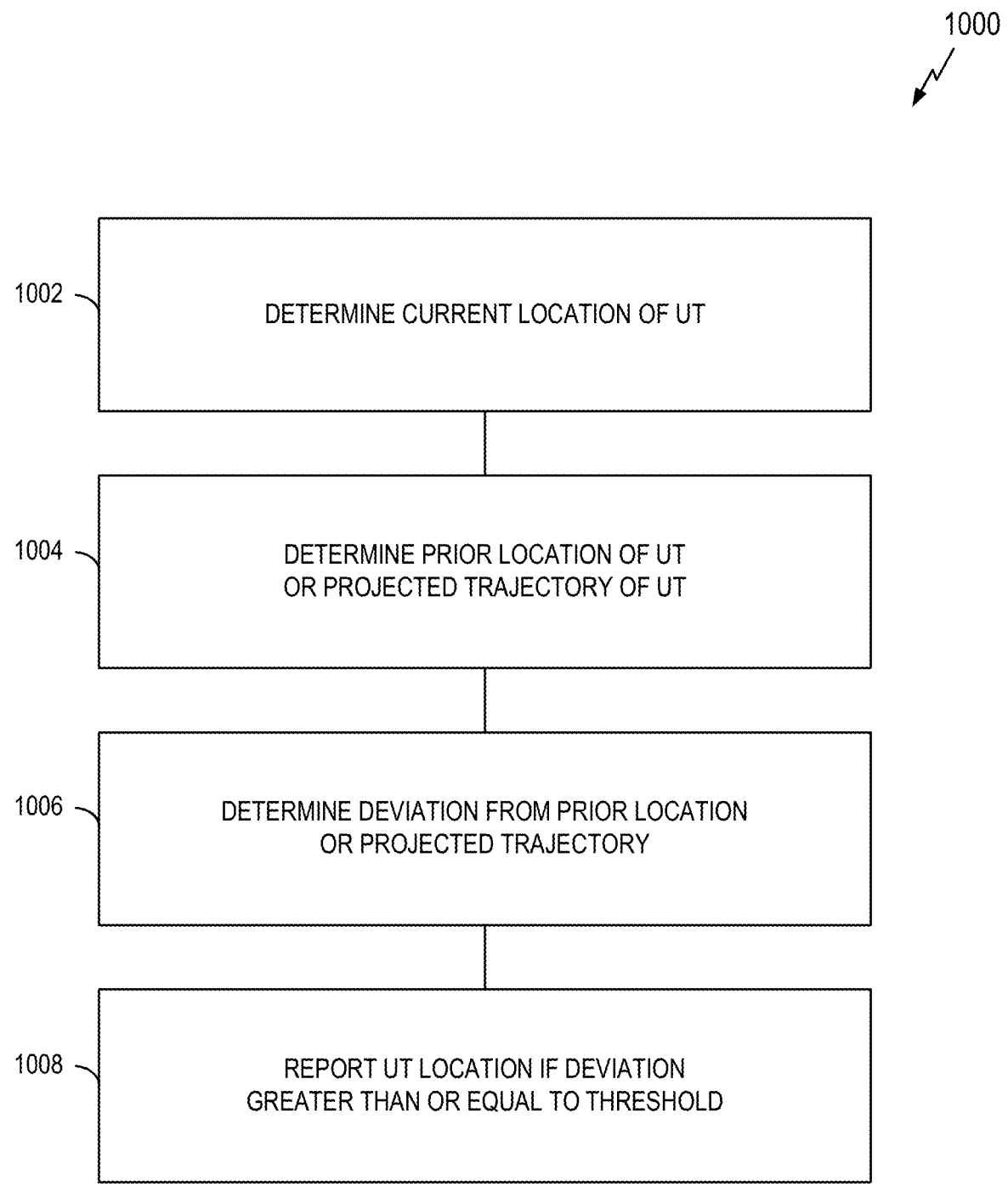
FIG. 10 is a flowchart illustrating another example of a location reporting process in accordance with some aspects of the disclosure.

As mentioned above, location information may relate to a particular location of a UT and/or motion of a UT. FIG. 10 is a diagram illustrating an example of a location reporting process 1000 in accordance with some aspects of the disclosure that covers each of these scenarios. The process 1000 may take place within a processing circuit which may be located in a UT, or some other suitable apparatus. In some implementations, the process 1000 represents operations performed by the control processor 420 of FIG. 4. In some implementations, the process 1000 represents operations performed by the apparatus 3100 of FIG. 31 (e.g., by the processing circuit 3110). Of course, in various aspects within the scope of the disclosure, the process 1000 may be implemented by any suitable apparatus capable of supporting location-related operations.

At block 1002, a UT (or other suitable apparatus) determines its current location. For example, a UT may have access to a GPS unit or a navigation system, which can provide accurate location and motion information. A GPS unit can provide accurate location information for a static UT, and accurate location and velocity information for a moving UT.

A static UT is defined as one that is not moving (e.g., never moves). A static UT can obtain its location from a GPS unit installed in the UT or in a structure that is common to the UT (e.g., a vehicle). In some implementations, a UT is (or several UTs are) connected to a single GPS server. A GPS unit provides the location of a user in the World Geodetic System (WGS) 84 reference coordinate system. The WGS 84 system models the earth as an ellipsoid. The coordinates of a point P in such a system are known as geodetic coordinates. In some implementations, the UT transmits these coordinates in a UT Location IE. The coordinates include the following information: geodetic latitude (Ø), given by the angle between the normal dropped from point P on the ellipsoid and the equatorial plane; geodetic longitude (λ); and geodetic height (h), the height from the surface of the ellipsoid.

For a moving UT, the current time, the velocity of the UT, and the acceleration of the UT are measured in addition to the current UT position. These measurements will be discussed in turn.

In some implementations, the time measurement is the time at which a location report message (e.g., a UTLocationAndMotion message that include a UT location IE) is transmitted and/or a time at which one or more of the other measurements (velocity and/or acceleration) is taken. The message may take approximately 20 milliseconds (ms) in return link (RL) delay to reach the SNP (e.g., to reach a NAC in the SNP). The time information enables the SNP to make corrections to track the location of the UT if there is a delay in reception of the message. The SNP discards the message altogether if the delay in reception exceeds an acceptable threshold, delayAcceptThresh.

The velocity of the UT is a vector that indicates the speed of the UT in three orthogonal directions, for example: speedInLonDir in meters/sec (East or West), speedInLatDir in meters/sec (North or South), and speedInRadialDir in meters/sec towards the center of the earth or away from the center of the earth.

The acceleration of the UT is a vector that indicates the acceleration of the UT in three orthogonal directions, for example: acclnInLonDir in meters/sec$^2$ (East or West), acclnInLatDir in meters/sec$^2$ (North or South), and acclnInRadialDir in meters/sec$^2$ towards the center of the earth or away from the center of the earth.

For a UT attached to an airplane, the UT can obtain location and motion information from the airplane's navigation system. For most commercial airplanes, the airplane navigation system is connected to other devices in the airplane through a LAN network called ARINC (Aeronautical Radio, Inc.). ARINC-429 refers to the communication protocol for the data bus connecting the airplane navigation system with other devices. Thus, a UT on an airplane can obtain the UT's location and motion information using ARINC-429.

At block 1004, the UT determines a prior location if the UT is not currently moving or a projected trajectory if the UT is currently moving. In the former case, the UT may identify the last reported location value. In the latter case, the UT may identify, for example, a geodesic arc that is expected to correspond (e.g., approximately) to the motion of the UT.

At block 1006, the UT determines the deviation from the prior location or the projected trajectory. In the former case, the UT may simply determine the distance between the prior UT location from block 1004 and the current UT location from block 1002. For a moving UT, the UT determines where the UT is expected to be on the projected path (e.g., a geodesic arc) based on a prior initial point (UT location), UT velocity, some other parameter, or a combination of these parameters. The UT can then determine the distance between the expected (projected) UT location from block 1004 (on the projected path) and the current UT location from block 1002.

At block 1008, the UT reports its location if the deviation from block 1006 is greater than or equal to a threshold. For a stationary UT, the UTLocationAndMotion message may contain a single IE, the UT Location IE. For UTs that can move, the UTLocationAndMotion message may contain two IEs: a UT Location IE; and a UT Motion IE. In some scenarios, the UT Location IE consists of the geodetic coordinates of the UT, as described above, at the time the UTLocationAndMotion message is transmitted. In some scenarios, the UT Motion IE contains the time, velocity, and acceleration information discussed above. The information provided in the UT Location IE and UT Motion IE together enables the SNP to track the UT's location over time.

It is desirable that updates of the UT location and motion information be transmitted as infrequently as possible to keep the signaling overhead low, but at the same time, the SNP should be able to track the UT accurately enough so that satellite handover information (e.g., in the form of a satellite and beam transition table, satellite and beam transition rows, or more generally, satellite and beam transition information) can be correctly computed. To achieve the above goal, the procedure that follows may be used. The UTLocationAndMotion message is transmitted by a moving UT whenever the UT determines that it has deviated significantly from a projected trajectory. In one example, the projected trajectory may be computed by the UT by assuming that the UT moves locally along a geodesic arc, specified by the same initial point and initial velocity that the UT transmitted to the SNP in the last location update message (e.g., a UTLocationAndMotion message). The deviation of the UT from its projected trajectory over time is given by $|p_{proj}(t)-p_{act}(t)|$, where $p_{act}(t)$ and $p_{proj}(t)$ are the actual and projected positions of the UT at time t. The UT transmits a UTLocationAndMotion message whenever it computes that the deviation $|p_{proj}(t)-p_{act}(t)|$ exceeds a given threshold errorThresh (e.g., $|p_{proj}(t)-p_{act}(t)|>$errorThresh). The errorThresh threshold is fixed at some suitable value, for example, 1 km. In another example, the projected location of the UT may be determined by taking a simple linear approximation using the velocity vector and doing computations using the Cartesian coordinate system. If the last location and motion information message was sent at time tprev, and the location and velocity vectors sent were xprev and vprev, respectively, then the projected location at time t is given by xproj(t)=xprev+vprev*(t−tprev). The UT sends a location and motion information message at time t if |xproj(t)−xact(t)|>errorThreshold, where xact(t) is the actual location of the UT at time t.

In some scenarios, the threshold for location reporting, errorThresh, is specified by the SNP. Different thresholds can be specified for idle and connected states of a UT. Thus, the maximum location error may be limited (e.g., capped) by repeated location reporting in connected state and idle state. Also, the SNP may send, in separate signaling messages to the UT, the thresholds the UT should use here.

Figure 11:
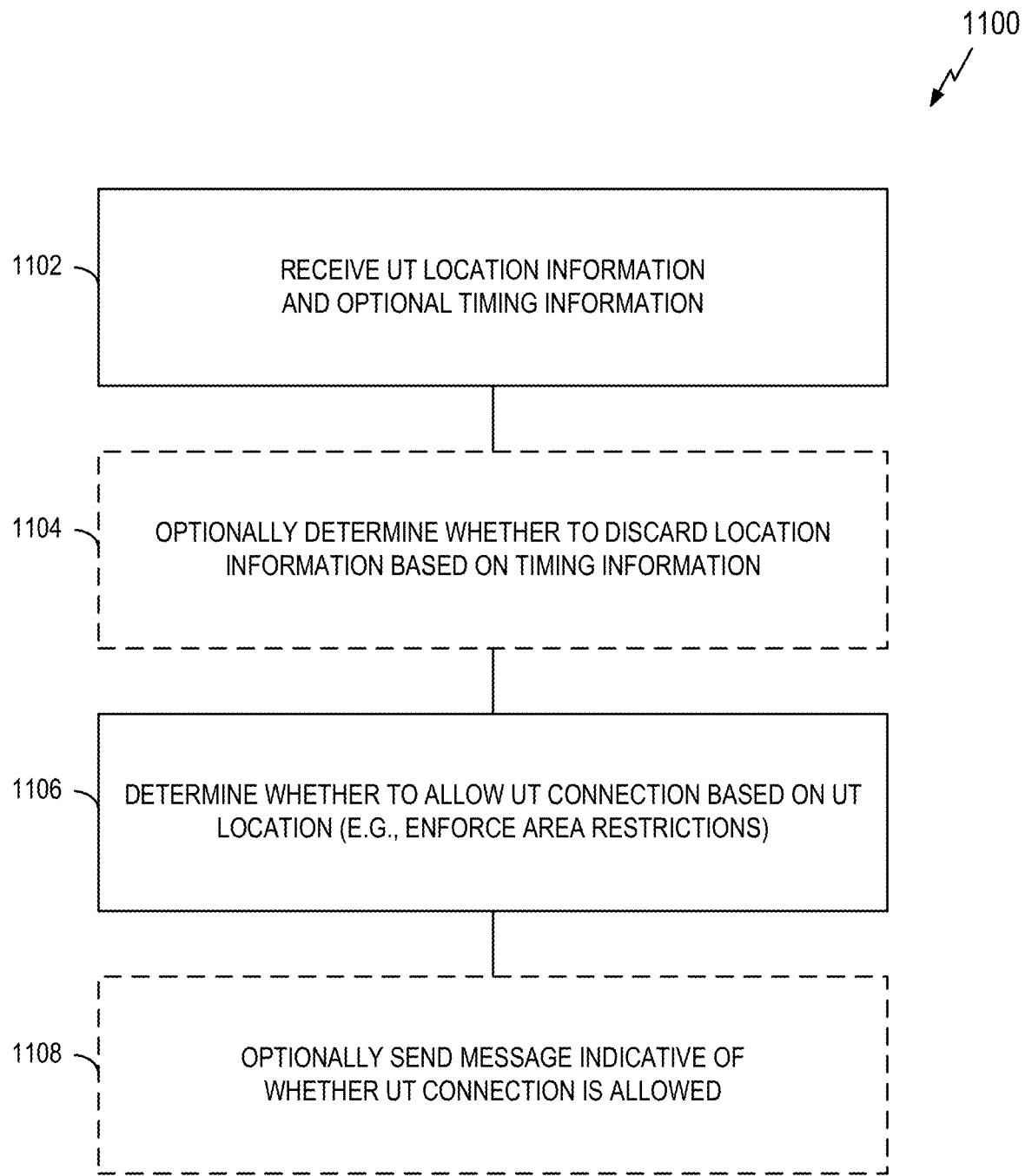
FIG. 11 is a flowchart illustrating another example of a location reporting process in accordance with some aspects of the disclosure.

A NAC may use location information to determine whether a location measurement is too old and/or to determine whether to provide service for a UT. FIG. 11 is a diagram illustrating an example of a process 1100 for taking such action based on location information in accordance with some aspects of the disclosure. The process 1100 may take place within a processing circuit which may be located in a NAC, an SNP, or some other suitable apparatus (device). In some implementations, the process 1100 represents operations performed by the SNP controller 250 of FIG. 2. In some implementations, the process 1100 represents operations performed by the apparatus 2100 of FIG. 21 (e.g., by the processing circuit 2110). Of course, in various aspects within the scope of the disclosure, the process 1100 may be implemented by any suitable apparatus capable of supporting communication-related operations.

At block 1102, the NAC (or other suitable apparatus) receives a location report (e.g., a UTLocationAndMotion message) that includes location information for a UT. As discussed above, the location report may include timing information.

At block 1104, if timing information is included in the location report, the NAC (or other suitable apparatus) may determine whether to discard the location report depending on one or more characteristics of the timing information. For example, the NAC may elect to not update the location information in the UTLDB if the location report message is too old. To this end, the NAC can determine the difference between a time indicated by the timing information and the current time, and then compare this difference to a threshold.

At block 1106, the NAC determines whether to allow a UT connection. In some aspects, this determination is based on the UT location obtained at block 1102. For example, the NAC may use the UT location to enforce area restrictions (e.g., country restrictions, etc.). If the NAC determines that it will not allow service for the UT, the NAC may send a message (e.g., a reject message or some other suitable message) to the UT informing the UT whether service (e.g., a connection) is allowed (block 1108).

Figure 12:
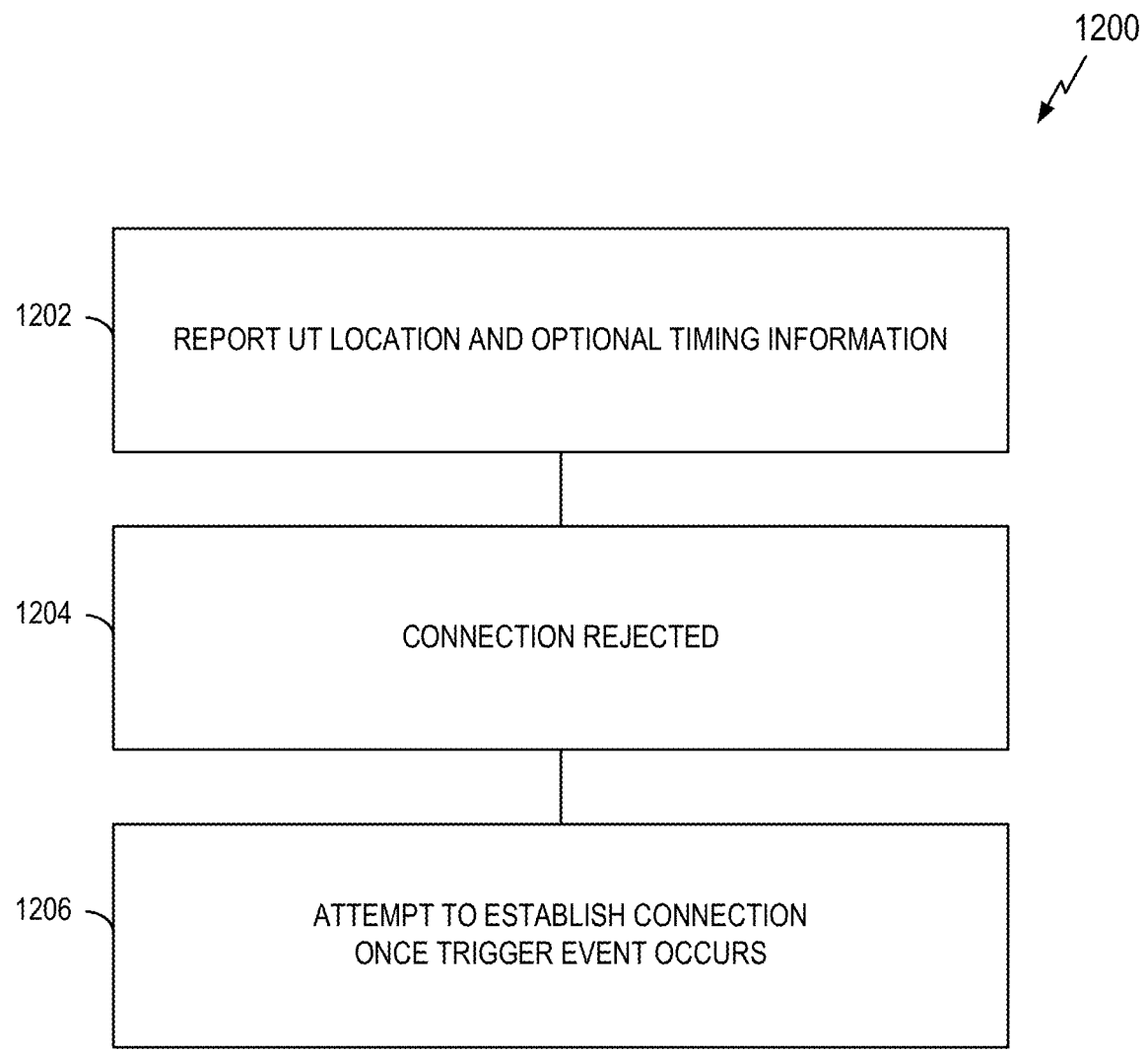
FIG. 12 is a timing diagram illustrating an example of connection process in accordance with some aspects of the disclosure.

FIG. 12 is a diagram illustrating an example of a process 1200 for taking such action based on location information in accordance with some aspects of the disclosure. The process 1200 may take place within a processing circuit which may be located in a UT or some other suitable apparatus (device). In some implementations, the process 1200 represents operations performed by the control processor 420 of FIG. 4. In some implementations, the process 1200 represents operations performed by the apparatus 3100 of FIG. 31 (e.g., by the processing circuit 3110). Of course, in various aspects within the scope of the disclosure, the process 1200 may be implemented by any suitable apparatus capable of supporting communication-related operations.

At block 1202, the UT (or other suitable apparatus) reports its location information (e.g., to a NAC). As discussed above, the location report may include timing information.

At block 1204, the UT (or other suitable apparatus) receives a message informing the UT that service is not allowed. For example, the UT may receive a reject message from the NAC.

At block 1206, the UT (or other suitable apparatus) attempts to establish a connection at a later point in time. For example, the UT may wait for a trigger event before attempting to connect again.

Area restrictions (e.g., country restrictions, etc.) may be checked at various times and/or in conjunction with various procedures. For example, area restrictions may be checked during an Attach procedure (e.g., when the UT first registers with the network), when going to Connected Mode (e.g., if the UT has moved across SNPs when Idle), and in Connected Mode (e.g., if the UT is moving across SNPs).

Figure 13:
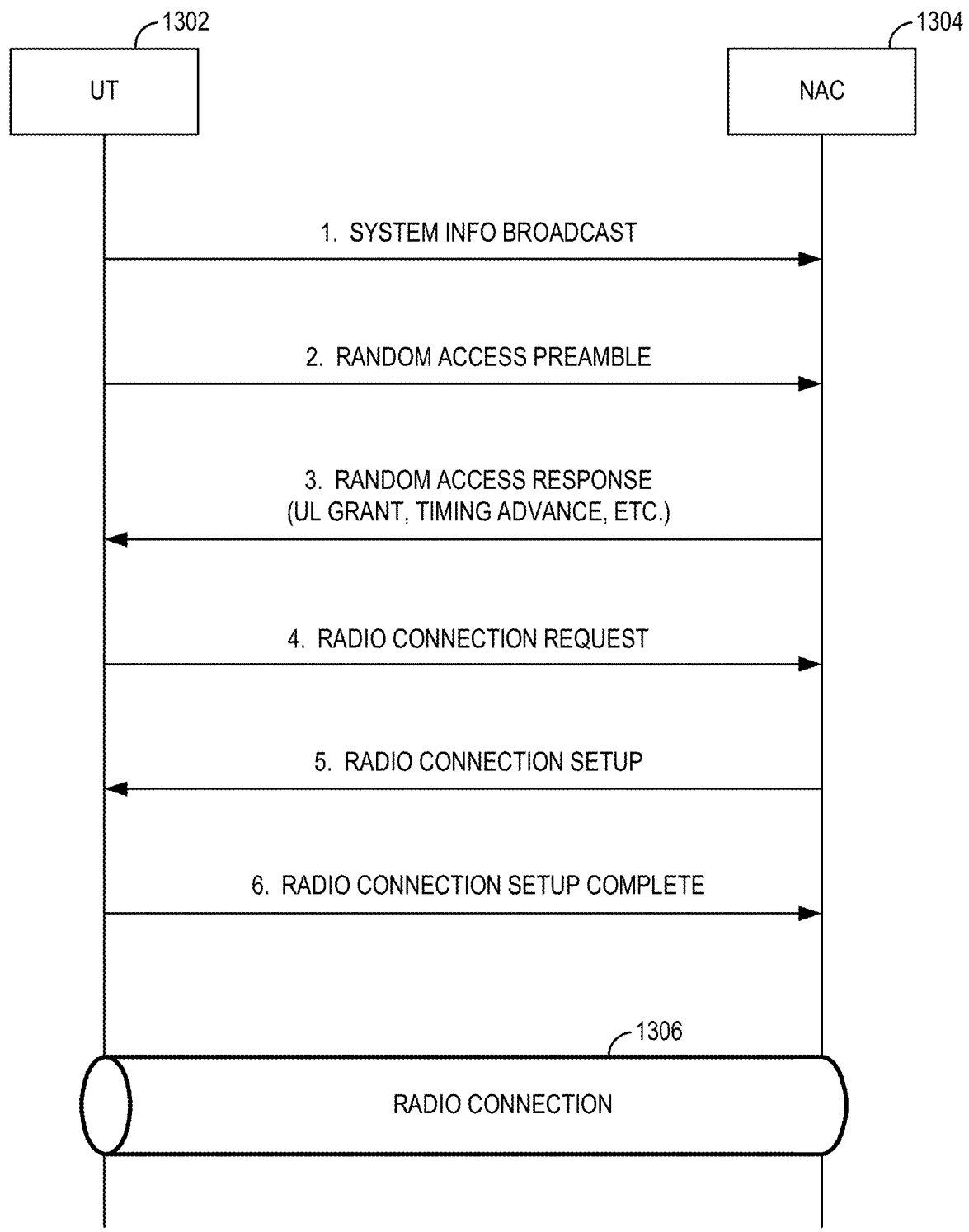
FIG. 13 is a timing diagram illustrating an example of radio connection establishment in accordance with some aspects of the disclosure.

Enforcement of area restrictions while performing connection setup will be discussed in more detail in conjunction with FIG. 13 which shown an example call flow for Radio Connection Establishment. Here a UT 1302 may be configured to report its location to a NAC 1304 if the UT's location deviates by a delta from a projected (e.g., expected) location. In addition, service may be allowed or not depending on the UT's location.

Radio Connection Establishment is the first procedure initiated by the UT 1302 when the UT transitions from idle mode to connected mode. This procedure could be triggered at the UT 1302 due to a need to carry out uplink signaling, a need to transmit uplink data, reception of a paging message from the NAC 1304, or as a result of some other trigger event. Six operations of an example Radio Connection Establishment procedure follow.

In a first operation (1), the UT 1302 reads the system information blocks (SIBs) being broadcast by the NAC. Based on these SIBs, the UT determines the parameters to be used for accessing a random access channel (RACH).

In a second operation (2), the UT commences a random access procedure. To this end, the UT transmits a Random Access Preamble on the RACH.

In a third operation (3), the NAC accepts the UT's access attempt and responds with a Random Access Response message. This message contains a cell-radio temporary network identifier (C-RNTI) for the UT, an uplink grant, and information regarding a timing advance.

In a fourth operation (4), the UT requests a connection by sending a Radio Connection Request message. This message is delivered to the NAC through a Signaling Radio Bearer (SRB). For example, the message may be delivered through a common SRB (e.g., SRB1) used by all UTs served by a NAC.

In a fifth operation (5), the NAC sends a Radio Connection Setup message to the UT, which sets up SRB1, the dedicated Signaling Radio Bearer. The NAC provides the UT with two thresholds in the Radio Connection Setup message, D_ConnThresh and D_IdleThresh (e.g., distance in meters), which are applicable in connected and idle mode, respectively. The UT reports its location when this location deviates an amount D_ConnThresh (e.g., specified in kilometers; for example, 1 km) from a projected UT location. The D_ConnThresh can also be specified as part of Radio Measurement Reporting configuration information that a NAC signals to a connected UT.

In a sixth operation (6), the UT sends a Radio Connection Setup Complete message over SRB1 to notify the NAC that the Radio Connection Establishment is complete. Thus, a radio connection 1306 is established between the UT 1302 and the NAC 1304.

The UT can send its location and motion information as part of the Radio Connection Setup Complete message. This allows the NAC to enforce area restrictions. If no service is allowed due to the current UT location, the NAC sends a Radio Connection Release message, with ReleaseCause set to "Service Reject."

Upon receiving the Radio Connection Release message, the UT should get disconnected. Subsequently, the UT should attempt connection again (with the Radio Connection Setup Complete containing a new IE, Reason="Connecting after Service Disconnect") under one of the following conditions: (a) the UT location has changed by a minimum amount; (b) the UE has moved to a new PA; or (c) a minimum amount of time has elapsed.

Paging

A UT may register with the SNP and go back to idle mode when it has no activity to perform. In this case, the system will page the UT if there is any incoming data for the UT.

Consequently, the UT may be configured to monitor a paging channel at predetermined times.

Figure 14:
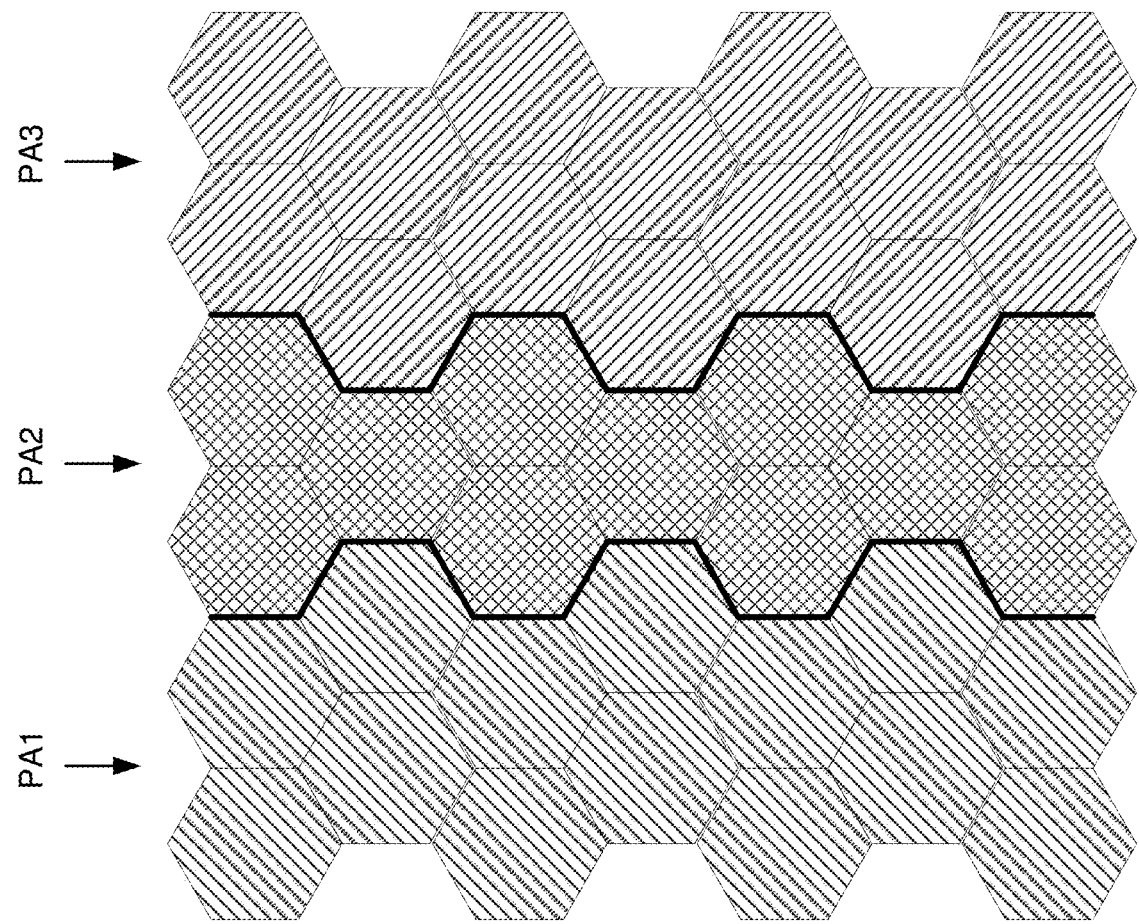
FIG. 14 is a diagram of example paging areas in accordance with some aspects of the disclosure.

Paging can be performed in a satellite system over a paging area (PA). FIG. 14 illustrates a simplified example of several paging areas (PA1, PA2, and PA3). A paging area refers to the area covered by all the beams of all the satellites currently belonging to one SNP. In a typical implementation, all beams from one SNP broadcast the same Paging Area Identity/Identifier (PAI). A paging area update (PAU) is a procedure used by a UT in the idle mode to report its current PAI to the CNCP. Two variants of a PAU are: (1) periodic (to let the CNCP know that the UT is still present in the current PA); and (2) change of PA (to inform the CNCP of the new PA to which the UT has moved).

The SNP could page the UT via all the NACs, whereby all beams of all satellites are made to carry the paging message to the UT. However, this page flooding technique may result in relatively high paging load; particularly in cases where the paging area size (coverage of one SNP) is relatively large. Moreover, for UTs located in overlapping areas, paging messages will be sent via even more beams. Consequently, it is desirable to reduce this undesirable overhead associated with paging messages (paging load).

Furthermore, UTs lying in areas of overlapping coverage may end up performing a relatively large number of paging areas updates. Thus, it is desirable to minimize (or eliminate) excessive paging area updates for this situation.

In addition, moving UTs may enter the coverage of another SNP. Thus, there is a need to re-anchor these UTs to the new SNP and its CNUP.

Figure 15:
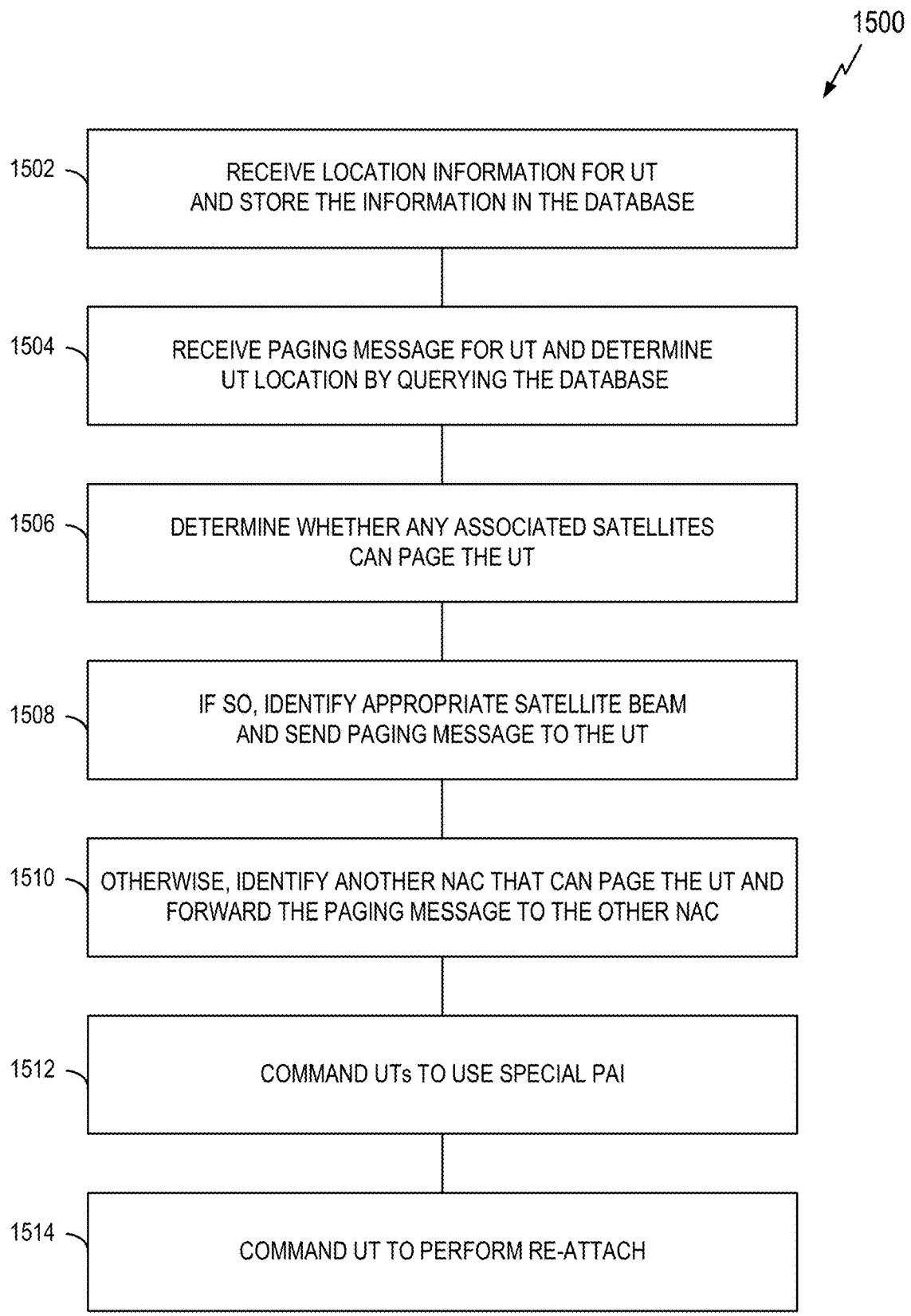
FIG. 15 is a flowchart illustrating an example of a paging process in accordance with some aspects of the disclosure.

One or more of the operations described in FIG. 15 may be used to address the above issues. FIG. 15 illustrates an example of a process 1500 for paging and other operations in accordance with some aspects of the disclosure. The process 1500 may take place within a processing circuit which may be located in a NAC, and SNP, or some other suitable apparatus (device). In some implementations, the process 1500 represents operations performed by the SNP controller 250 of FIG. 2. In some implementations, the process 1500 represents operations performed by the apparatus 2100 of FIG. 21 (e.g., by the processing circuit 2110). Of course, in various aspects within the scope of the disclosure, the process 1500 may be implemented by any suitable apparatus capable of supporting paging-related operations.

At some point in time (e.g., periodically, upon movement, etc.), each UT reports its location information to the NAC (via a message). Accordingly, at block 1502, the NAC receives the location information and updates the information in the UTLDB (e.g., a network node or some other suitable entity).

At some point in time (e.g., after data arrives from the core network), the CNCP sends a paging message to all of the NACs under the CNCP. Accordingly, at block 1504, the NAC receives a paging message for a UT and determines the location of the UT by querying the database.

In accordance with some aspects of the disclosure, only the NAC(s) that can actually deliver the paging message to the UT transmit(s) the paging message over the air. In this way, paging load may be reduced as compared to the page flooding technique discussed above. Thus, at block 1506, the NAC initially determines whether any of its satellites can page the UT (e.g., by determining whether the UT is currently located within one of the beams of these satellites). If so, at block 1508, the NAC identifies the appropriate satellite beam and sends the paging message to the UT via that beam.

If none of the NAC's satellites can page the UT, at block 1510, the NAC may identify another NAC (e.g., in a neighboring SNP) that can actually deliver the paging message to the UT. In this case, the NAC forwards the message to the other NAC (e.g., over the Inter-NAC Interface 638 depicted in FIG. 6).

At block 1512, the NAC may command the UTs lying in the areas of overlapping coverage to perform a paging area update and report a special paging area identity. Upon receiving this special paging area identity, the CNCP assigns a paging area list to the UT which includes all the paging areas that overlap at the UT's location. Advantageously, the UT may be able to avoid the PAU procedure when detecting different PAs in the overlap region. Thus, paging load may be reduced.

At block 1514, when a first NAC detects that a UT has completely moved into the coverage area of a second NAC, the first NAC may command the UT to perform a re-Attach procedure. In this case, the UT requests a new connection and is connected to the new CNCP. On completion of the Attach procedure, the CNUP for the UT is also updated.

These and other operations will now be described in more detail with reference to FIGS. 16-20. FIGS. 16, 17, 19, and 20 depict call flows, while FIG. 18 depicts communication flow between SNPs.

Intra-SNP Paging

Figure 16:
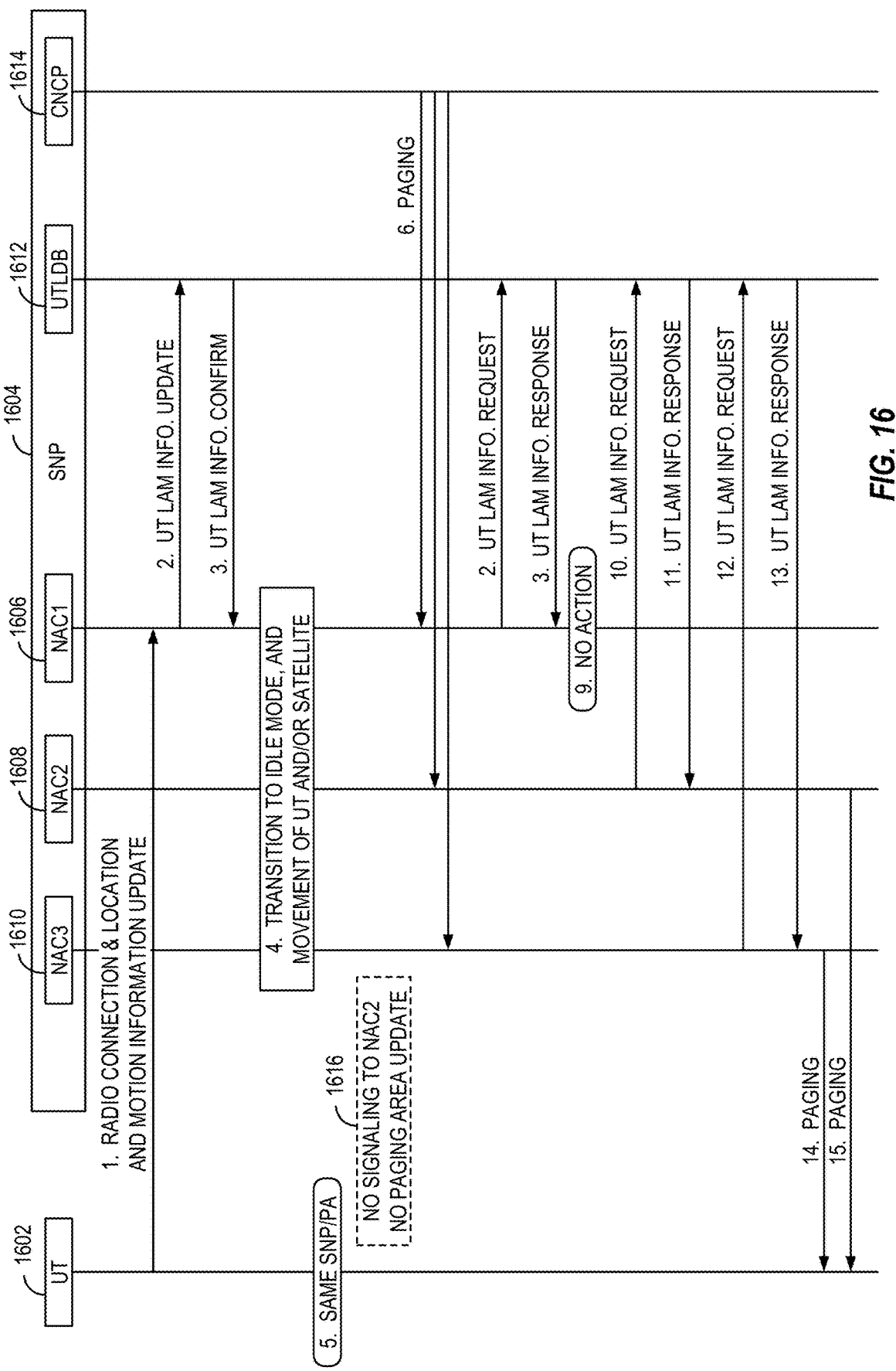
FIG. 16 is a timing diagram illustrating an example of paging of a UT within one SNP in accordance with some aspects of the disclosure.

FIG. 16 illustrates an example of paging of a UT that remains under a single SNP. The call flow will be discussed in the context of a satellite communication system that includes a UT 1602 and an SNP 1604. The SNP 1604 includes a first NAC (NAC1) 1606, a second NAC (NAC2) 1608, a third NAC (NAC3) 1610, a UTLDB 1612, and a CNCP 1614. The UT 1602 is an example of the UT 400 or the UT 401 of FIG. 1. The SNP 1604 is an example of the SNP 200 or the SNP 201 of FIG. 1. The NACs 1606-1610 are examples of the NAC 618 of FIG. 6. The UTLDB 1612 is an example of the UTLDB 636 of FIG. 6. The CNCP 1614 is an example of the CNCP 608 of FIG. 6. Other components could be used in other implementations.

One or more of the following operations may be performed. At a first operation (1), at a previous connection establishment time, the UT 1602 provides its location and motion information to the first NAC 1606 to which the UT 1602 is connected. At second and third operations (2) and (3), the first NAC 1606 updates the UTLDB 1612 with the latest location and motion information. At a fourth operation (4), the UT 1602 transitions to Idle mode and either the UT 1602 moves or the satellites move, resulting in the UT 1602 selecting a cell in a different satellite. At this point, the UT 1602 is under the coverage of the second NAC 1608. At a fifth operation (5), since the UT 1602 is served by the same SNP 1604 (whereby the PA remains the same), the UT 1602 does not need to perform a PA update procedure. At a sixth operation (6), the CNCP 1614 pages the UT 1602 based on a packet arrival from the network for the UT 1602. At seventh and eight operations (7) and (8), the first NAC 1606 retrieves the latest location and motion information for the UT 1602 from the UTLDB 1612. If the UT 1602 is a stationary UT, the first NAC 1606 may cache the location and motion information for the UT 1602. At a ninth operation (9), the first NAC 1606 determines that the UT 1602 cannot be served by any satellite controlled by the first NAC 1606. This determination can be made because the UT's location is known (e.g., from the UTLDB 1612). Consequently, the first NAC 1606 does not page the UT 1602. This reduces the paging load. At tenth through thirteenth operations (10)-(13), the second NAC 1608 and the third NAC 1610 also retrieve the location and the motion information for the UT 1602. At fourteenth and fifteenth operations (14) and (15), the second NAC 1608 and the third NAC 1610 determine that the UT 1602 may be served by one or more cells of the satellites controlled by that particular NAC. Consequently, the second NAC 1608 and the third NAC 1610 each page the UT 1602 over the paging channel of one or more cells of the satellites controlled by that particular NAC.

Paging Area Update

Figure 17:
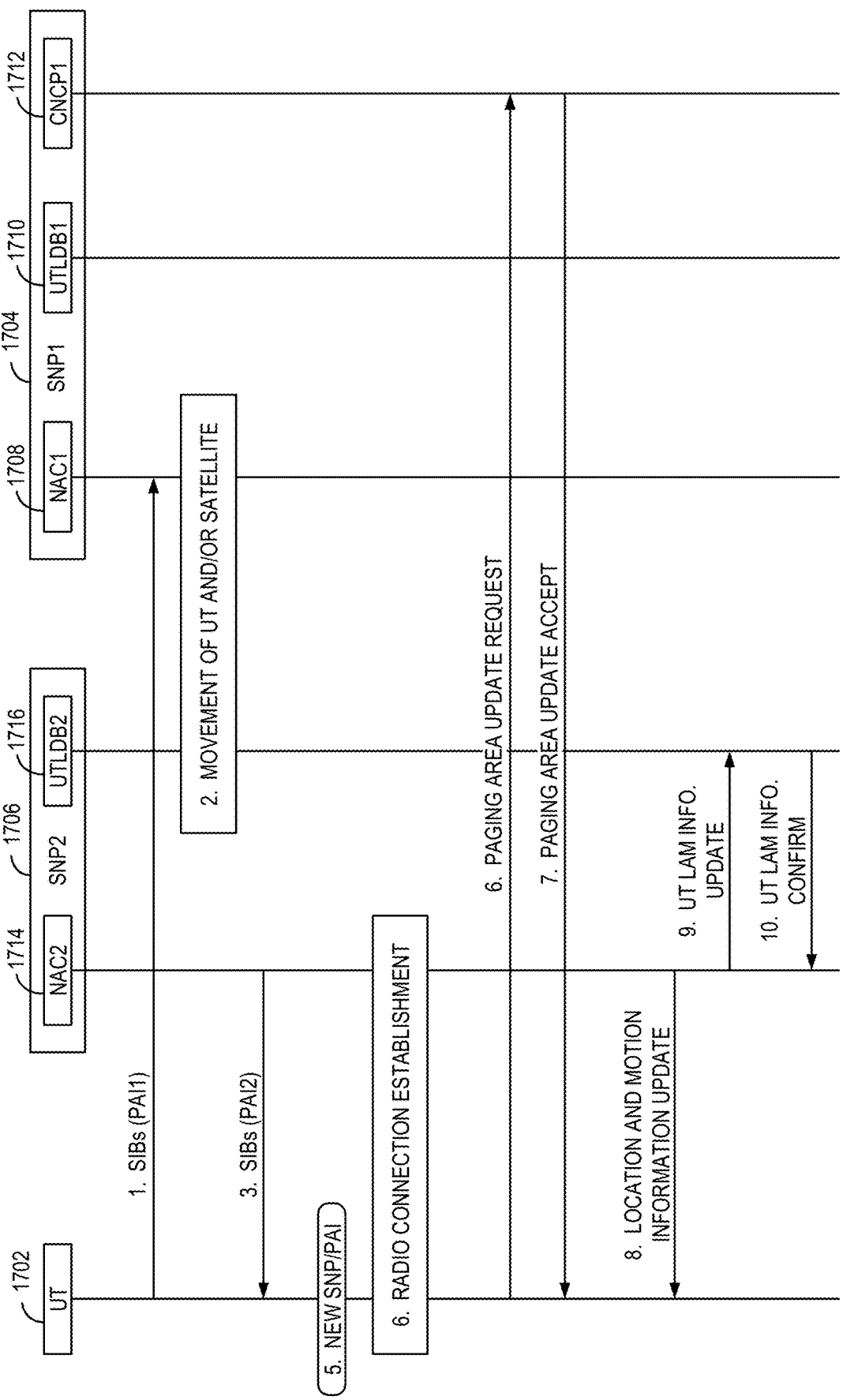
FIG. 17 is a timing diagram illustrating an example of a paging area update in accordance with some aspects of the disclosure.
Figure 18:
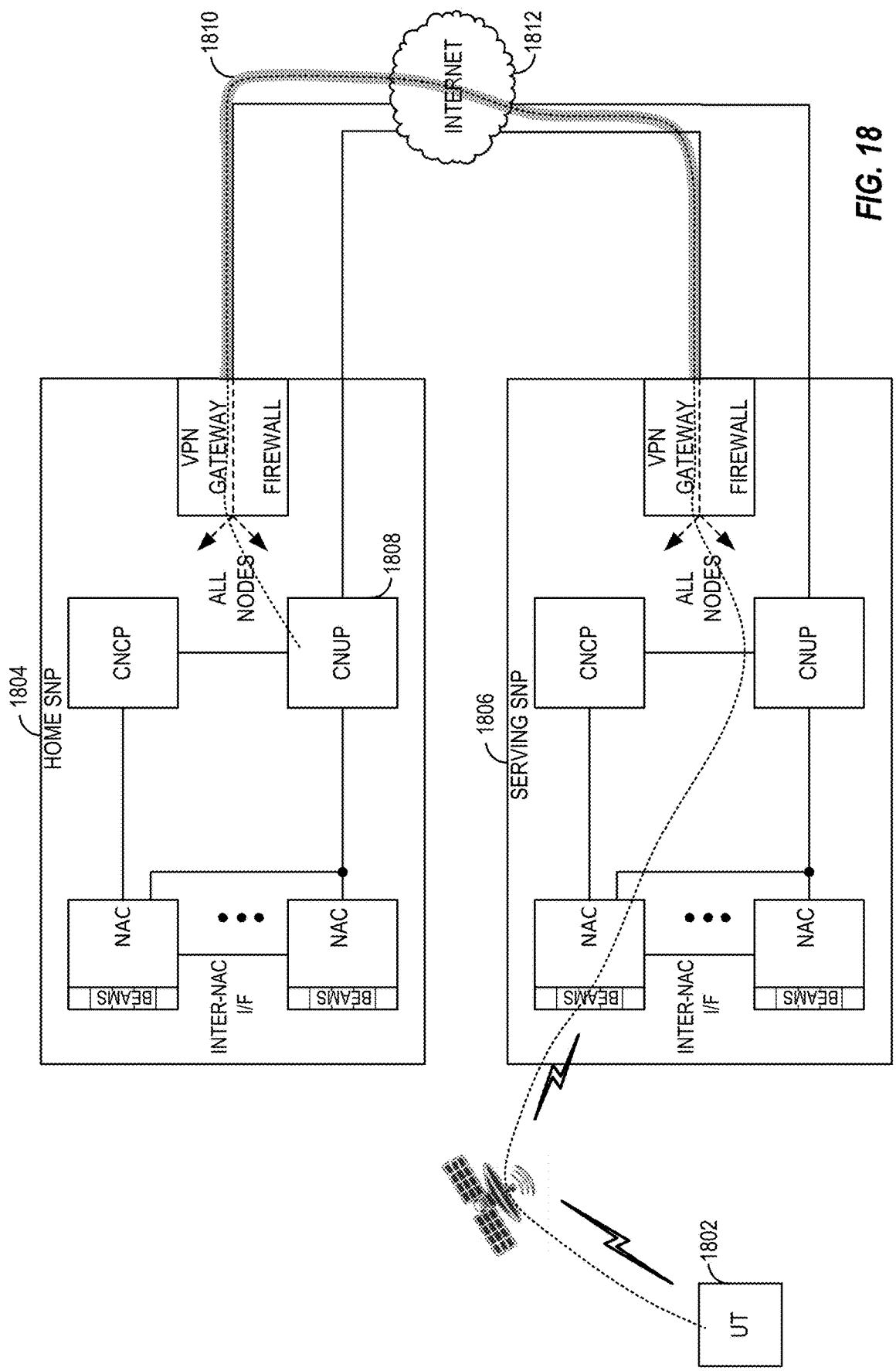
FIG. 18 is a block diagram illustrating an example of connections across SNPs in accordance with some aspects of the disclosure.

FIG. 17 illustrates an example paging area update (PAU). The call flow will be discussed in the context of a satellite communication system that includes a UT 1702, a first SNP (SNP1) 1704, and a second SNP (SNP2) 1706. The first SNP 1704 includes a first NAC (NAC1) 1708, a first UTLDB (UTLDB1) 1710, and a CNCP (CNCP1) 1712. The second SNP 1706 includes a second NAC (NAC2) 1714 and a second UTLDB (UTLDB2) 1716. The UT 1702 is an example of the UT 400 or the UT 401 of FIG. 1. The SNPs 1704 and 1706 are examples of the SNP 200 or the SNP 201 of FIG. 1. The NACs 1708 and 1714 are examples of the NAC 618 of FIG. 6. The UTLDBs 1710 and 1716 are examples of the UTLDB 636 of FIG. 6. The CNCP 1712 is an example of the CNCP 608 of FIG. 6. Other components could be used in other implementations.

One or more of the following operations may be performed. At a first operation (1), the UT 1702 receives a SIB from the first NAC 1708 located in the first SNP 1704. The SIB specifies the paging area as PAI1, which is the same as the PAI the UT 1702 has been receiving. At a second operation (2), either the UT 1702 moves or the satellites move, resulting in the UT 1702 selecting a cell in a different satellite. At a third operation (3), the UT 1702 receives the SIB of the current selected cell. This SIB specifies the paging area as PAI2. Thus, at a fourth operation (4), the paging area seen by the UT 1702 in the current cell, PAI2, is different from the previous paging area, PAI1. This triggers a PA Update procedure. Consequently, at a fifth operation (5), the UT 1702 performs a Radio Connection Establishment procedure. The second NAC 1714 in the second SNP 1706 connects the UT 1702 to the CNCP 1712 in the first SNP 1704 where the UT 1702 has been registered. At a sixth operation (6), the UT 1702 sends a Paging Area Update Request message to the CNCP 1712, indicating PAI2 as the UT's new paging area. At a seventh operation (7), the CNCP1 responds with a Paging Area Update Accept message. At an eight operation (8), the UT 1702 sends a Location and Motion Information Update message to the second NAC 1714. At a ninth operation (9), the second NAC 1714 updates the location and motion information of the UT 1702 with the second UTLDB 1716. At a tenth operation (10), the second UTLDB 1716 confirms the update of location and motion information to the second NAC 1714.

Connections Across SNPs.

As discussed herein, a UT may move from service under one SNP to service under a different SNP. For example, in the call flow of FIG. 17, the UT 1702 moved from the first SNP 1704 to the second SNP 1706. FIG. 18 illustrates graphically that a UT 1802 has moved from a home SNP 1804 to a new serving SNP 1806 (e.g., in an area where SNP coverage overlaps). In this case, the UT 1802 may communicate with the CNUP 1808 of the home SNP 1804 via the new serving SNP 1806 for a period of time. For example, the routing of the Paging Area Update Request and the Paging Area Update Accept at the sixth and seventh operations (6) and (7), respectively, in FIG. 17 is across SNPs. As shown in FIG. 18, the SNPs 1804 and 1806 may route inter-SNP communication via a virtual private network (VPN) tunnel 1810 between the SNPs 1804 and 1806.

SNP Relocation

Figure 19:
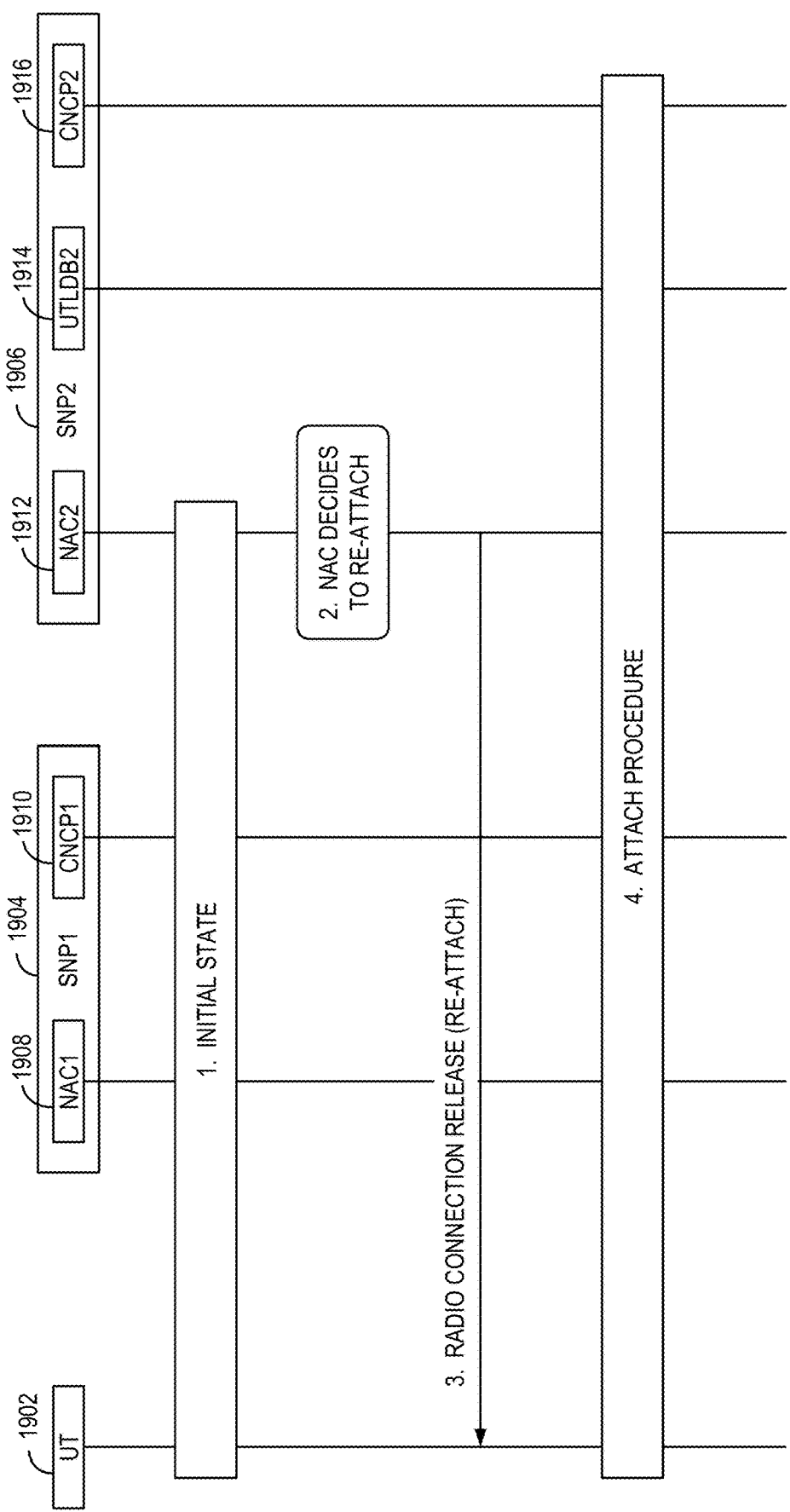
FIG. 19 is a timing diagram illustrating an example of SNP relocation in accordance with some aspects of the disclosure.

FIG. 19 illustrates an example of relocation of a UT to a different SNP. The call flow will be discussed in the context of a satellite communication system that includes a UT 1902, a first SNP (SNP1) 1904, and a second SNP (SNP2) 1906. The first SNP 1904 includes a first NAC (NAC1) 1908 and a first CNCP (CNCP1) 1910. The second SNP 1906 includes a second NAC (NAC2) 1912, a UTLDB (UTLDB2) 1914, and a second CNCP (CNCP2) 1916. The UT 1902 is an example of the UT 400 or the UT 401 of FIG. 1. The SNPs 1904 and 1906 are examples of the SNP 200 or the SNP 201 of FIG. 1. The NACs 1908 and 1912 are examples of the NAC 618 of FIG. 6. The UTLDB 1914 is an example of the UTLDB 636 of FIG. 6. The CNCPs 1910 and 1916 are examples of the CNCP 608 of FIG. 6. Other components could be used in other implementations.

Briefly, in the example of FIG. 19, the second NAC 1912 in the second SNP 1906 commands the UT 1902 (a non-stationary UT) to perform a re-Attach when the UT 1902 moves to the first SNP 1904. This can be achieved by sending a Radio Connection Release message with a newly defined cause value. When the UT 1902 attempts to re-Attach, the second NAC 1912 connects the UT 1902 to the second CNCP 1916.

One or more of the following operations may be performed. At a first operation (1), corresponding to an initial state, the UT 1902 is connected to the second NAC 1912. Thus, the UT 1902 reports its location and motion regularly to the second NAC 1912. However, the UT's home SNP is the first SNP 1904. That is, the first CNCP 1910 and the corresponding CNUP (not shown) serving the UT 1902 are in the first SNP 1904, and the UTs traffic is tunneled from the second SNP 1906 to the first SNP 1904 (e.g., via a VPN tunnel as shown in FIG. 16). The IP address of the UT 1902 is assigned by the CNUP in the first SNP 1904.

At a second operation (2), the second NAC 1912 determines that the UT 1902 has moved sufficiently into the coverage area of the second SNP 1906. Consequently, the second NAC 1912 elects to initiate a re-Attach procedure. At a third operation (3), the second NAC 1912 sends the Radio Connection Release message with cause re-Attach (e.g., mobilityReAttachRequired) to the UT 1902. At a fourth operation (4), the UT 1902 performs an Attach procedure and, as part of this procedure, the second SNP 1906 becomes the home SNP for the UT 1902. In other words, the UT 1902 is associated with the first CNCP 1910 and the CNUP (not shown) in the second SNP 1906, and also receives a new IP address from the CNUP in the second SNP 1906.

Inter-SNP Paging

A NAC may provide a UT with a list of PAs where the UT is not required to perform a PAU. This can be achieved by commanding the UT to perform a PAU with a special PAI (e.g., by sending a Radio Connection Release message with a newly defined cause value). Here, a CNCP may be configured to send the desired set of PAs to the UT upon receiving a PAU Request message with this special PAI.

As discussed herein, a NAC may forward a paging message to another NAC in a neighboring SNP if that NAC can reach the UT at the time of paging. This can be achieved by introducing a new message on the NAC-NAC interface (e.g., inter-NAC I/F 638 in FIG. 6). The message may be named Inter-NAC Paging. In some implementations, to reduce multiple forwards of paging messages, out of the M active NACs (i.e., those controlling a satellite) only the k-th NAC performs the forwarding. Here, k=(CNTI mod 1024) mod N.

Figure 20:
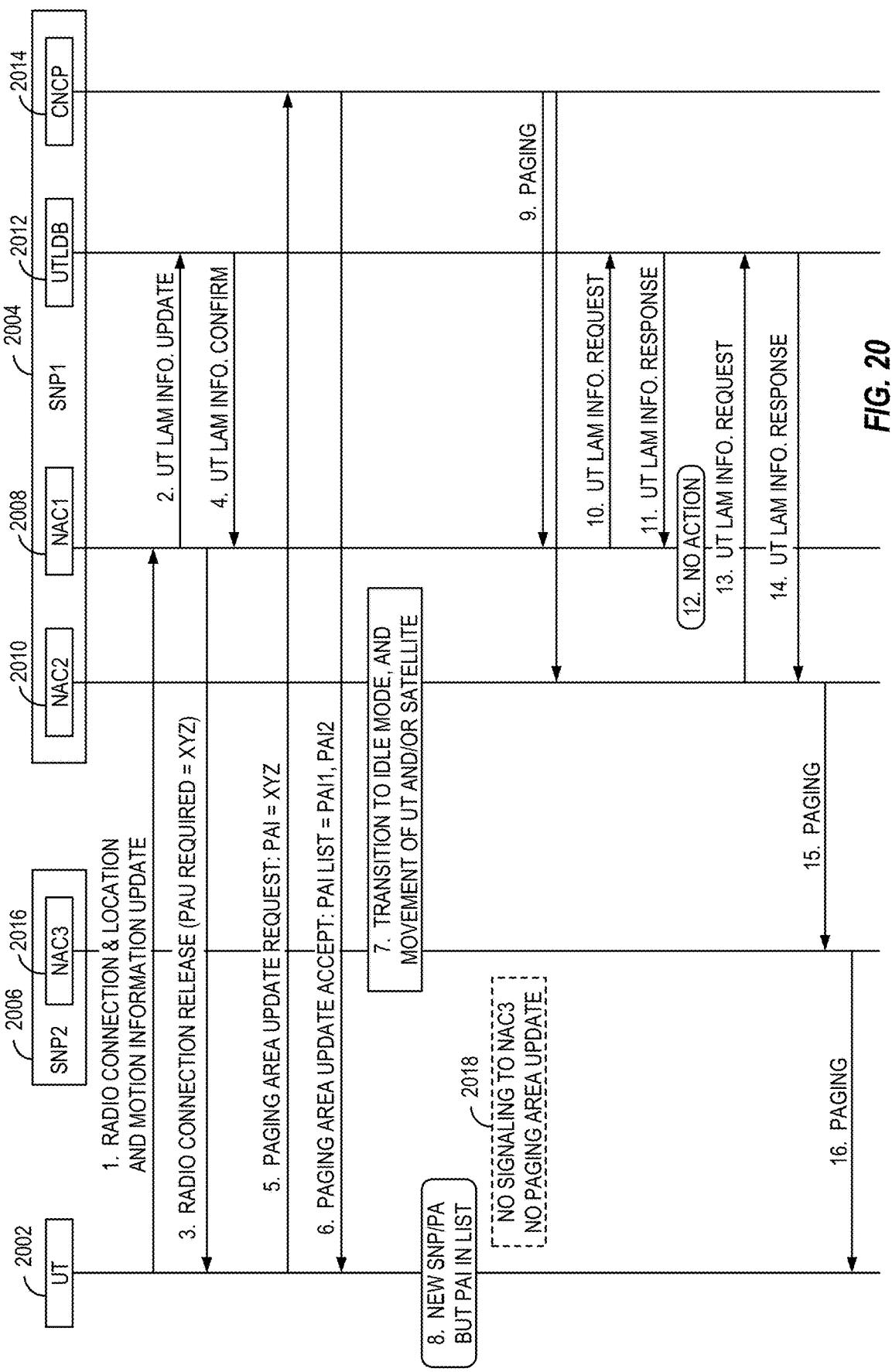
FIG. 20 is a timing diagram illustrating an example of paging of a UT in another SNP in accordance with some aspects of the disclosure.

FIG. 20 illustrates an example of paging a UT under another SNP. The call flow will be discussed in the context of a satellite communication system that includes a UT 2002, a first SNP (SNP1) 2004, and a second SNP (SNP2) 2006. The first SNP 2004 includes a first NAC (NAC1) 2008, a second NAC (NAC2) 2010, a UTLDB 2012, and a CNCP 2014. The second SNP 2006 includes a third NAC (NAC3) 2016. The UT 2002 is an example of the UT 400 or the UT 401 of FIG. 1. The SNPs 2004 and 2006 are examples of the SNP 200 or the SNP 201 of FIG. 1. The NACs 2008, 2010, and 2016 are examples of the NAC 618 of FIG. 6. The UTLDB 2012 is an example of the UTLDB 636 of FIG. 6. The CNCP 2014 is an example of the CNCP 608 of FIG. 6. Other components could be used in other implementations.

One or more of the following operations may be performed. At a first operation (1), at a previous connection establishment time, the UT 2002 provides its location and motion information to the first NAC 2008 to which it is connected. At second and fourth operations (2) & (4), the first NAC 2008 updates the UTLDB 2012 with the latest location and motion information. Therefore, the first NAC 2008 will know if the UT 2002 is in an overlapping SNP area. At a third operation (3), the first NAC 2008 commands the UT 2002 to perform the PAU with a special PAI (XYZ). At a fifth operation (5), the UT 2002 sends the PAU Request message to the CNCP 2014. At a sixth operation (6), the CNCP 2014 responds with a PAU Accept message and provides a PAI list containing two PAIs: PAI1 and PAI2.

At a seventh operation (7), the UT 2002 transitions to Idle mode. Subsequently, at an eighth operation (8), the UT 2002 is served by a new SNP (SNP2). However, the UT 2002 does not need to perform a PA update procedure because the new PA's PAI is present in the UT's PAI list (block 2018). At a ninth operation (9), the CNCP 2014 decides to page the UT 2002 based on a packet arrival from the network for the UT 2002. At tenth through twelfth operations (10)-(12), the first NAC 2008 retrieves the UT's information and decides not to page the UT 2002. At thirteenth and fourteenth operations (13)-(14), the second NAC 2010 also retrieves the location and the motion information for the UT and determines that the third NAC 2016 located in the second SNP 2006 can reach the UT 2002. At a fifteenth operation (15), the second NAC 2010 provides the Inter-NAC Paging message to the third NAC 2016 over the Inter-NAC interface. At a sixteenth operation (16), the third NAC 2016 delivers the Paging message to the UT 2002.

First Example Apparatus

Figure 21:
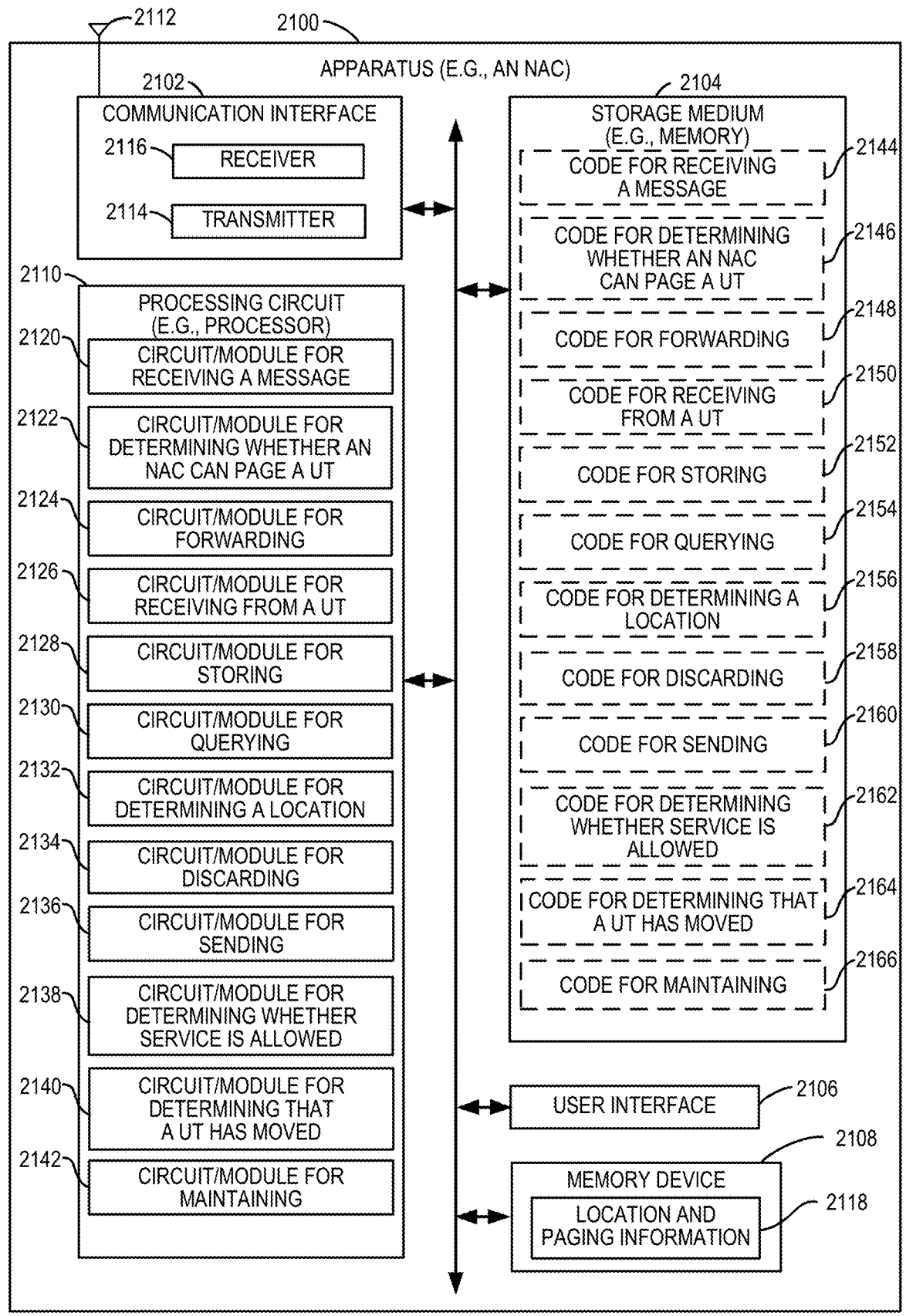
FIG. 21 is a block diagram illustrating an example hardware implementation for an apparatus (e.g., an electronic device) that can support paging and location management in accordance with some aspects of the disclosure.

FIG. 21 illustrates a block diagram of an example hardware implementation of an apparatus 2100 configured to communicate according to one or more aspects of the disclosure. For example, the apparatus 2100 could embody or be implemented within a NAC, an SNP, a satellite, a UT, or some other type of device that supports satellite communication. In various implementations, the apparatus 2100 could embody or be implemented within a gateway, a ground station, a vehicular component, or any other electronic device having circuitry.

The apparatus 2100 includes a communication interface 2102 (e.g., at least one transceiver), a storage medium 2104, a user interface 2106, a memory device 2108, and a processing circuit 2110 (e.g., at least one processor). In various implementations, the user interface 2106 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 21. The signaling bus may include any number of interconnecting buses and bridges depending on the specific application of the processing circuit 2110 and the overall design constraints. The signaling bus links together various circuits such that each of the communication interface 2102, the storage medium 2104, the user interface 2106, and the memory device 2108 are coupled to and/or in electrical communication with the processing circuit 2110. The signaling bus may also link various other circuits (not shown) such as timing sources, peripherals, voltage regulators, and power management circuits, which are well known in the art, and therefore, will not be described any further.

The communication interface 2102 provides a means for communicating with other apparatuses over a transmission medium. In some implementations, the communication interface 2102 may include circuitry and/or programming adapted to facilitate the communication of information bi-directionally with respect to one or more communication devices in a network. In some implementations, the communication interface 2102 may be configured for wire-based communication. In some implementations, the communication interface 2102 may be coupled to one or more antennas 2112 as shown in FIG. 21 for wireless communication within a wireless communication system. The communication interface 2102 can be configured with one or more standalone receivers and/or transmitters, as well as one or more transceivers. In the illustrated example, the communication interface 2102 includes a transmitter 2114 and a receiver 2116. The communication interface 2102 serves as one example of a means for receiving and/or means transmitting.

The memory device 2108 may represent one or more memory devices. As indicated, the memory device 2108 may maintain paging-related information and/or location-related information 2118 along with other information used by the apparatus 2100. In some implementations, the memory device 2108 and the storage medium 2104 are implemented as a common memory component. The memory device 2108 may also be used for storing data that is manipulated by the processing circuit 2110 or some other component of the apparatus 2100.

The storage medium 2104 may represent one or more computer-readable, machine-readable, and/or processor-readable devices for storing programming, such as processor executable code or instructions (e.g., software, firmware), electronic data, databases, or other digital information. The storage medium 2104 may also be used for storing data that is manipulated by the processing circuit 2110 when executing programming. The storage medium 2104 may be any available media that can be accessed by a general purpose or special purpose processor, including portable or fixed storage devices, optical storage devices, and various other mediums capable of storing, containing or carrying programming.

By way of example and not limitation, the storage medium 2104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 2104 may be embodied in an article of manufacture (e.g., a computer program product). By way of example, a computer program product may include a computer-readable medium in packaging materials. In view of the above, in some implementations, the storage medium 2104 may be a non-transitory (e.g., tangible) storage medium.

The storage medium 2104 may be coupled to the processing circuit 2110 such that the processing circuit 2110 can read information from, and write information to, the storage medium 2104. That is, the storage medium 2104 can be coupled to the processing circuit 2110 so that the storage medium 2104 is at least accessible by the processing circuit 2110, including examples where at least one storage medium is integral to the processing circuit 2110 and/or examples where at least one storage medium is separate from the processing circuit 2110 (e.g., resident in the apparatus 2100, external to the apparatus 2100, distributed across multiple entities, etc.).

Programming stored by the storage medium 2104, when executed by the processing circuit 2110, causes the processing circuit 2110 to perform one or more of the various functions and/or process operations described herein. For example, the storage medium 2104 may include operations configured for regulating operations at one or more hardware blocks of the processing circuit 2110, as well as to utilize the communication interface 2102 for wireless communication utilizing their respective communication protocols.

The processing circuit 2110 is generally adapted for processing, including the execution of such programming stored on the storage medium 2104. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2110 is arranged to obtain, process and/or send data, control data access and storage, issue commands, and control other desired operations. The processing circuit 2110 may include circuitry configured to implement desired programming provided by appropriate media in at least one example. For example, the processing circuit 2110 may be implemented as one or more processors, one or more controllers, and/or other structure configured to execute executable programming. Examples of the processing circuit 2110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2110 are for illustration and other suitable configurations within the scope of the disclosure are also contemplated.

According to one or more aspects of the disclosure, the processing circuit 2110 may be adapted to perform any or all of the features, processes, functions, operations and/or routines for any or all of the apparatuses described herein. For example, the processing circuit 2110 may be configured to perform one or more of the steps, functions, and/or processes described with respect to FIGS. 1-20 and 22-30. As used herein, the term "adapted" in relation to the processing circuit 2110 may refer to the processing circuit 2110 being one or more of configured, used, implemented, and/or programmed to perform a particular process, function, operation and/or routine according to various features described herein.

The processing circuit 2110 may be a specialized processor, such as an application specific integrated circuit (ASIC) that serves as a means for (e.g., structure for) carrying out one or more of the operations described in conjunction with FIGS. 1-20 and 22-30. The processing circuit 2110 may serve as one example of a means for transmitting and/or a means for receiving. In various implementations, the processing circuit 2110 may incorporate the functionality of the SNP controller 250 of FIG. 2.

According to at least one example of the apparatus 2100, the processing circuit 2110 may include one or more of a circuit/module for receiving a message 2120, a circuit/module for determining whether a NAC can page a UT 2122, a circuit/module for forwarding 2124, a circuit/module for receiving from a UT 2126, a circuit/module for storing 2128, a circuit/module for querying 2130, a circuit/module for determining a location 2132, a circuit/module for discarding 2134, a circuit/module for sending 2136, a circuit/module for determining whether service is allowed 2138, a circuit/module for determining that a UT has moved 2140, or a circuit/module for maintaining 2142. In various implementations, the circuit/module for receiving a message 2120, the circuit/module for determining whether a NAC can page a UT 2122, the circuit/module for forwarding 2124, the circuit/module for receiving from a UT 2126, the circuit/module for storing 2128, the circuit/module for querying 2130, the circuit/module for determining a location 2132, the circuit/module for discarding 2134, the circuit/module for sending 2136, the circuit/module for determining whether service is allowed 2138, the circuit/module for determining that a UT has moved 2140, or the circuit/module for maintaining 2142 may correspond, at least in part, to the SNP controller 250 of FIG. 2

The circuit/module for receiving a message 2120 may include circuitry and/or programming (e.g., code for receiving a message 2144, with this code being stored on the storage medium 2104) adapted to perform several functions relating to, for example, receiving a message from another apparatus (e.g., a network entity). In some implementations, the message is a paging message. Initially, the circuit/module for receiving a message 2120 obtains received information. For example, the circuit/module for receiving a message 2120 may obtain this information from a component of the apparatus 2100 such as the communication interface 2102 (e.g., a PSTN interface or an SNP interface), the memory device 2108, or some other component. As another example, the circuit/module for receiving a message 2120 may receive information directly from a device (e.g., a network entity) that sent the information. In some implementations, the circuit/module for receiving a message 2120 identifies a memory location of a value in the memory device 2108 and invokes a read of that location. In some implementations, the circuit/module for receiving a message 2120 processes (e.g., decodes) the received information. The circuit/module for receiving a message 2120 outputs the received information (e.g., stores the received information in the memory device 2108 or sends the information to another component of the apparatus 2100). In some implementations, the communication interface 2102 includes the circuit/module for receiving a message 2120 and/or the code for receiving a message 2144. In some implementations, the circuit/module for receiving a message 2120 is configured to control the communication interface 2102 (e.g., a transceiver or a receiver) to receive the message.

The circuit/module for determining whether a NAC can page a UT 2122 may include circuitry and/or programming (e.g., code for determining whether a NAC can page a UT 2146, with this code being stored on the storage medium 2104) adapted to perform several functions relating to, for example, determining whether a particular NAC can page a particular UT. In some implementations, the circuit/module for determining whether a NAC can page a UT 2122 performs the operations set forth in FIG. 23. In some implementations, the circuit/module for determining whether a NAC can page a UT 2122 performs the operations set forth in FIG. 25. In some implementations, the circuit/module for determining whether a NAC can page a UT 2122 comprises circuits/modules and/or code for performing the operations set forth in FIG. 25. For example, in some implementations, a circuit/module (and/or code) for determining ephemeris information accesses a memory that stores ephemeris information, retrieves the information (e.g., for one satellite or a plurality of satellites), and provides the information to another circuit/module or function. In some implementations, a circuit/module (and/or code) for determining ephemeris information receives the information from another entity (e.g., via a network interface.). In some implementations, a circuit/module (and/or code) for determining a location of a UT includes the functionality of the circuit/module for determining a location 2132. In some implementations, a circuit/module (and/or code) for determining whether the UT is within a beam of the satellite or for identifying a satellite for which a UT is within a beam (i.e., within the coverage area of the beam) of the satellite receives an indication of the determined ephemeris information and the determined location, and determines based on the UT location whether the UT is within the beam of a particular satellite or identifies the satellites having beams that cover the UT, and then outputs an indication (e.g., in the manner discussed herein) of this determination. In some aspects, the indication may be an identifier of a satellite. In some implementations, a circuit/module (and/or code) for determining that a NAC controls a satellite receives an indication of a satellite, identifies the NAC that controls the satellite (e.g., by reading a memory, receiving an indication from the network, etc.), and outputs an indication of whether a particular NAC controls the satellite.

The circuit/module for forwarding 2124 may include circuitry and/or programming (e.g., code for forwarding 2148, with this code being stored on the storage medium 2104) adapted to perform several functions relating to, for example, forwarding a message to a NAC. In some implementations, the message is a paging message. Initially, the circuit/module for forwarding 2124 obtains information to be forwarded. For example, the circuit/module for forwarding 2124 may obtain this information from a component of the apparatus 2100 such as the communication interface 2102 (e.g., a PSTN interface or an SNP interface), the memory device 2108, the circuit/module for receiving a message 2120, or some other component. In some implementations, the circuit/module for forwarding 2124 identifies a memory location of a value in the memory device 2108 and invokes a read of that location. In some implementations, the circuit/module for forwarding 2124 processes (e.g., reformats) the received information. The circuit/module for forwarding 2124 outputs the received information. For example, the circuit/module for forwarding 2124 may store the received information in the memory device 2108 or send the information to another component of the apparatus 2100 (e.g., a digital subsystem, an RF subsystem, or an SNP interface). In some implementations, the communication interface 2102 includes the circuit/module for forwarding 2124 and/or the code for forwarding 2148. In some implementations, the circuit/module for forwarding 2124 is configured to control the communication interface 2102 (e.g., a transceiver, a receiver, a transmitter, etc.) to forward the message.

The circuit/module for receiving from a UT 2126 may include circuitry and/or programming (e.g., code for receiving from a UT 2150, with this code being stored on the storage medium 2104) adapted to perform several functions relating to, for example, receiving information from a user terminal. In some implementations, the information is UT location information. In some implementations, the information is a PAU message. Initially, the circuit/module for receiving from a UT 2126 obtains received information. For example, the circuit/module for receiving from a UT 2126 may obtain this information from a component of the apparatus 2100 such as the communication interface 2102 (e.g., a digital subsystem or an RF subsystem), the memory device 2108, or some other component. As another example, the circuit/module for receiving from a UT 2126 may receive information directly from a device (e.g., a satellite) that relayed the information from the user terminal. In some implementations, the circuit/module for receiving from a UT 2126 identifies a memory location of a value in the memory device 2108 and invokes a read of that location. In some implementations, the circuit/module for receiving from a UT 2126 processes (e.g., decodes) the received information. The circuit/module for receiving from a UT 2126 outputs the received information (e.g., stores the received information in the memory device 2108 or sends the information to another component of the apparatus 2100). In some implementations, the communication interface 2102 includes the circuit/module for receiving from a UT 2126 and/or the code for receiving from a UT 2150. In some implementations, the circuit/module for receiving from a UT 2126 is configured to control the communication interface 2102 (e.g., a transceiver or a receiver) to receive the information.

The circuit/module for storing 2128 may include circuitry and/or programming (e.g., code for storing 2152, with this code being stored on the storage medium 2104) adapted to perform several functions relating to, for example, storing information in a database. In some implementations, the information is location information. Initially, the circuit/module for storing 2128 obtains information to be stored. For example, the circuit/module for storing 2128 may obtain this information from a component of the apparatus 2100 such as the communication interface 2102 (e.g., a digital subsystem or an RF subsystem), the memory device 2108, the circuit/module for receiving from a UT 2126, or some other component. In some implementations, the circuit/ module for storing 2128 identifies a memory location of a value in the memory device 2108 and invokes a read of that location. In some implementations, the circuit/module for storing 2128 processes (e.g., reformats) the received information. The circuit/module for storing 2128 then stores the received information in the memory device 2108 or sends the information to another component of the apparatus 2100.

The circuit/module for querying 2130 may include circuitry and/or programming (e.g., code for querying 2154, with this code being stored on the storage medium 2104) adapted to perform several functions relating to, for example, querying a database. In some implementations, the information is location information. Initially, the circuit/module for querying 2130 identifies the information to be queries. For example, the circuit/module for querying 2130 may obtain an identifier of a UT from a component of the apparatus 2100 such as the communication interface 2102, the memory device 2108, or some other component. In some implementations, the circuit/module for querying 2130 identifies a memory location of a value in the memory device 2108 and invokes a read of that location. In some implementations, the circuit/module for querying 2130 uses the UT identifier to retrieve information associated with that UT from memory. The circuit/module for storing 2128 then outputs the information read from the memory device 2108 (e.g., sends the information to another component of the apparatus 2100).

The circuit/module for determining a location 2132 may include circuitry and/or programming (e.g., code for determining a location 2156, with this code being stored on the storage medium 2104) adapted to perform several functions relating to, for example, determining a location of a UT based on information indicative of motion of the UT. In some implementations, the circuit/module for determining a location 2132 may determine where the UT is expected to be on the projected path (e.g., a geodesic arc) based on a prior initial point (UT location), UT velocity, some other parameter, or a combination of these parameters. The circuit/module for determining a location 2132 may then output an indication of the location (e.g., send the information to another component of the apparatus 2100).

The circuit/module for discarding 2134 may include circuitry and/or programming (e.g., code for discarding 2158, with this code being stored on the storage medium 2104) adapted to perform several functions relating to, for example, discarding location information. In some implementations, the circuit/module for discarding 2134 may determine that timing information indicates that a location measurement is too old. For example, the circuit/module for discarding 2134 may determine the difference between a time indicated by the timing information and the current time, and then compare this difference to a threshold. The circuit/module for discarding 2134 may then delete the location information from memory or mark the information as invalid, unallocated, etc.

The circuit/module for sending 2136 may include circuitry and/or programming (e.g., code for sending 2160, with this code being stored on the storage medium 2104) adapted to perform several functions relating to, for example, sending information (e.g., data) to another apparatus (e.g., a UT). In some implementations, the information is a threshold (e.g., that is used to control location reporting). In some implementations, the information is a message. In some implementations, the information is a list. Initially, the circuit/module for sending 2136 obtains the information to be sent (e.g., from the memory device 2108, or some other component). The circuit/module for sending 2136 may then format the information for sending (e.g., in a message, according to a protocol, etc.). The circuit/module for sending 2136 then causes the information to be sent via a wireless communication medium (e.g., via satellite signaling). To this end, the circuit/module for sending 2136 may send the data to the communication interface 2102 (e.g., a digital subsystem or an RF subsystem) or some other component for transmission. In some implementations, the communication interface 2102 includes the circuit/module for sending 2136 and/or the code for sending 2160. In some implementations, the circuit/module for sending 2136 is configured to control the communication interface 2102 (e.g., a transceiver or a transmitter) to send the information.

The circuit/module for determining whether service is allowed 2138 may include circuitry and/or programming (e.g., code for determining whether service is allowed 2162, with this code being stored on the storage medium 2104) adapted to perform several functions relating to, for example, determining whether service is allowed for a user terminal. In some implementations, the circuit/module for determining whether service is allowed 2138 may obtain a criterion. For example, the circuit/module for determining whether service is allowed 2138 may identify an area restriction. Examples of an area restriction include a country restriction (e.g., that indicates which UTs are allowed service in different countries), a defined geographical area, a legal area, or some other suitable area-related restriction. In addition, the circuit/module for determining whether service is allowed 2138 may determine the current location of the UT (e.g., based on a report from the UT). In this case, the circuit/module for determining whether service is allowed 2138 compares the UT location with the area restriction (e.g., a country restriction, etc.) to determine whether service can be provided to the UT. The circuit/module for determining whether service is allowed 2138 may then output an indication of this determination (e.g., to the memory device 2108 or some other component of the apparatus 2100).

The circuit/module for determining that a UT has moved 2140 may include circuitry and/or programming (e.g., code for determining that a UT has moved 2164, with this code being stored on the storage medium 2104) adapted to perform several functions relating to, for example, determining that a UT has moved from the coverage of one SNP to another. In some implementations, the circuit/module for determining that a UT has moved 2140 determines the location of the UT (e.g., as discussed herein). The circuit/module for determining a location 2132 may then determine which satellites provide coverage at that location (e.g., from ephemeris information). Next, the circuit/module for determining a location 2132 identifies the SNPs that control those satellites (e.g., from a table and/or ephemeris information). Finally, the circuit/module for determining a location 2132 outputs an indication of this determination (e.g., to the memory device 2108 or some other component of the apparatus 2100).

The circuit/module for maintaining 2142 may include circuitry and/or programming (e.g., code for maintaining 2166, with this code being stored on the storage medium 2104) adapted to perform several functions relating to, for example, maintaining a list of paging areas. In some implementations, the list indicates where a UT does not need to perform a PAU. In some implementations, the circuit/module for maintaining 2142 identifies areas of overlapping coverage and determined (based on the UT location) whether the UT is within any of those areas. If so, the circuit/module for maintaining 2142 obtains a list of corresponding paging areas to be stored. In some implementations, the circuit/module for maintaining 2142 processes (e.g., reformats) the list. The circuit/module for maintaining 2142 then stores the list in the memory device 2108 or sends the information to another component of the apparatus 2100.

As mentioned above, programming stored by the storage medium 2104, when executed by the processing circuit 2110, causes the processing circuit 2110 to perform one or more of the various functions and/or process operations described herein. For example, the storage medium 2104 may include one or more of the code for receiving a message 2144, the code for determining whether a NAC can page a UT 2146, the code for forwarding 2148, the code for receiving from a UT 2150, the code for storing 2152, the code for querying 2154, the code for determining a location 2156, the code for discarding 2158, the code for sending 2160, the code for determining whether service is allowed 2162, the code for determining that a UT has moved 2164, or the code for maintaining 2166.

First Example Process

Figure 22:
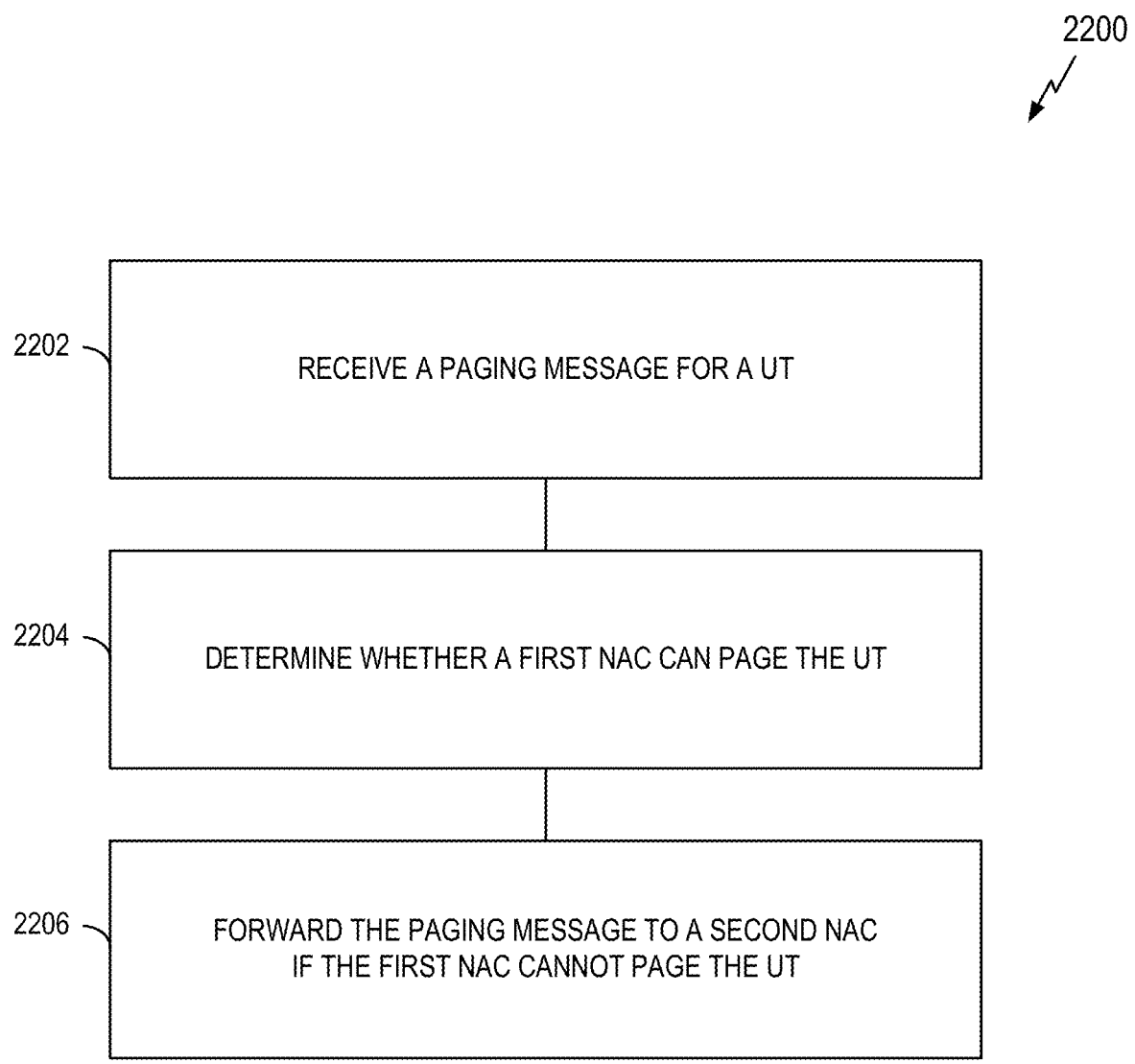
FIG. 22 is a flowchart illustrating an example of a paging process in accordance with some aspects of the disclosure.

FIG. 22 illustrates a process 2200 for communication in accordance with some aspects of the disclosure. The process 2200 may take place within a processing circuit which may be located in a NAC, an SNP, or some other suitable apparatus. In some implementations, the process 2200 represents operations performed by the SNP controller 250 of FIG. 2. In some implementations, the process 2200 represents operations performed by the apparatus 2100 of FIG. 21 (e.g., by the processing circuit 2110). Of course, in various aspects within the scope of the disclosure, the process 2200 may be implemented by any suitable apparatus capable of supporting paging-related operations.

At block 2202, an apparatus (e.g., a NAC) receives a paging message for a UT. For example, a NAC may receive the paging message from a core network entity. In some implementations, the circuit/module for receiving a message 2120 of FIG. 21 performs the operations of block 2202. In some implementations, the code for receiving a message 2144 of FIG. 21 is executed to perform the operations of block 2202.

At block 2204, the apparatus determines whether a first NAC can page the UT. For example, the NAC may determine whether the UT is within a coverage area of a satellite controlled by the first NAC. In some implementations, the circuit/module for determining whether a NAC can page a UT 2122 of FIG. 21 performs the operations of block 2204. In some implementations, the code for determining whether a NAC can page a UT 2146 of FIG. 21 is executed to perform the operations of block 2204.

At block 2206, the apparatus forwards the paging message to a second NAC if the first NAC cannot page the UT. For example, the first NAC may forward the paging message (e.g., via an Inter-NAC I/F) to a second NAC that is currently controlling a satellite that can page the UT. In some implementations, the circuit/module for forwarding 2124 of FIG. 21 performs the operations of block 2206. In some implementations, the code for forwarding 2148 of FIG. 21 is executed to perform the operations of block 2206.

Second Example Process

Figure 23:
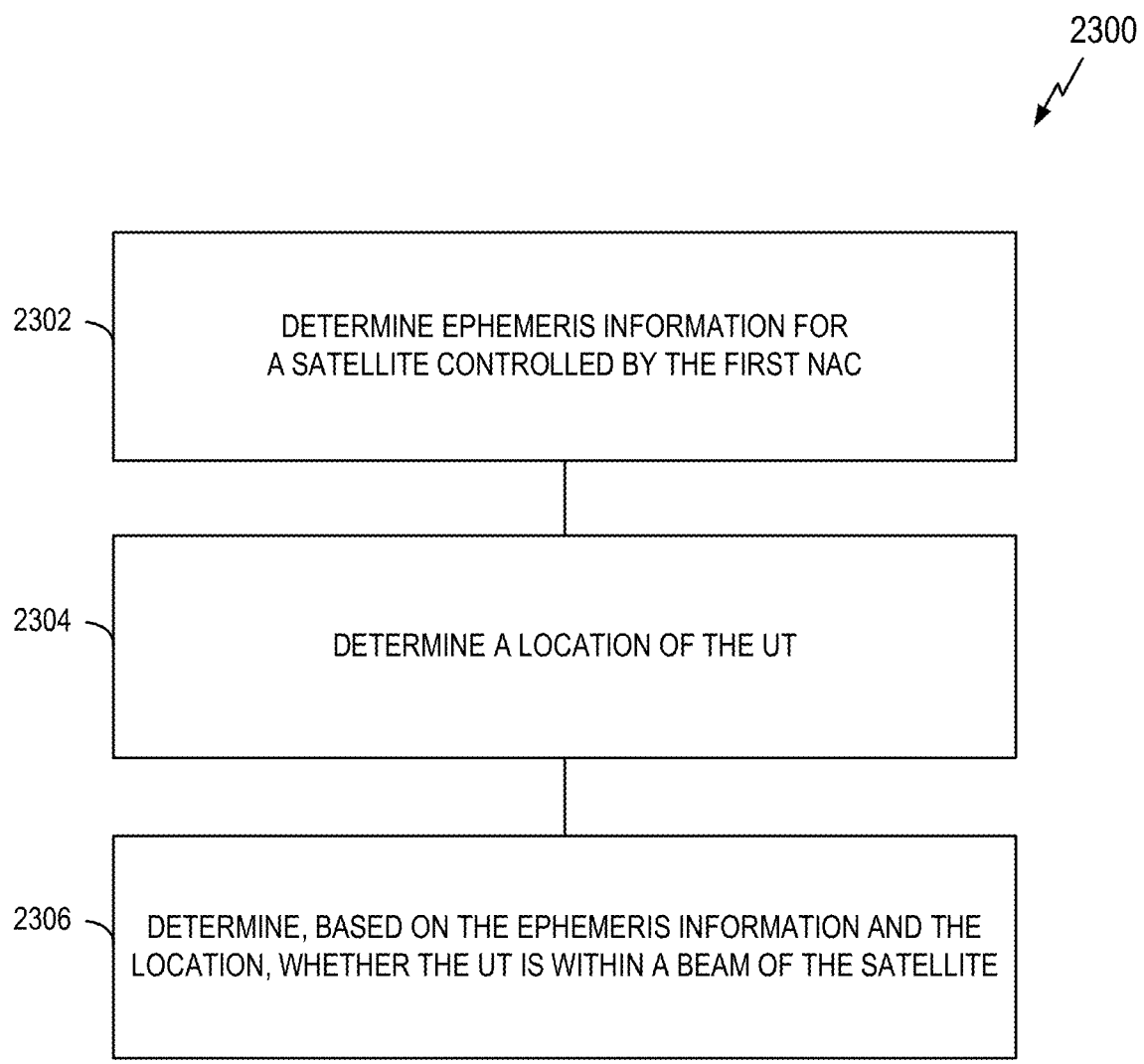
FIG. 23 is a flowchart illustrating an example of a process for determining whether a NAC can page a UT in accordance with some aspects of the disclosure.

FIG. 23 illustrates a process 2300 for communication in accordance with some aspects of the disclosure. In some implementations, the process 2300 may be performed in addition to (e.g., in conjunction with) the process 2200 of FIG. 22 (e.g., to determine whether the first NAC can page the UT). The process 2300 may take place within a processing circuit which may be located in a NAC, an SNP, or some other suitable apparatus. In some implementations, the process 2300 represents operations performed by the SNP controller 250 of FIG. 2. In some implementations, the process 2300 represents operations performed by the apparatus 2100 of FIG. 21 (e.g., by the processing circuit 2110). Of course, in various aspects within the scope of the disclosure, the process 2300 may be implemented by any suitable apparatus capable of supporting paging-related operations.

At block 2302, an apparatus (e.g., a NAC) determines ephemeris information for a satellite controlled by the first NAC. For example, a NAC may retrieve this information from a database. In some implementations, the circuit/module for determining whether a NAC can page a UT 2122 of FIG. 21 performs the operations of block 2302. In some implementations, the code for determining whether a NAC can page a UT 2146 of FIG. 21 is executed to perform the operations of block 2302.

At block 2304, the apparatus determines a location of the UT. For example, a NAC may retrieve UT location information from a UTLDB. In some implementations, the circuit/module for determining a location 2132 of FIG. 21 performs the operations of block 2304. In some implementations, the code for determining a location 2156 of FIG. 21 is executed to perform the operations of block 2304.

At block 2306, the apparatus determines whether the UT is within a beam of the satellite (i.e., whether the UT is within the coverage area of the beam). In some aspects, this determination may be based on the ephemeris information determined at block 2302 and the location determined at block 2304. In some implementations, the circuit/module for determining whether a NAC can page a UT 2122 of FIG. 21 performs the operations of block 2306. In some implementations, the code for determining whether a NAC can page a UT 2146 of FIG. 21 is executed to perform the operations of block 2306.

Third Example Process

Figure 24:
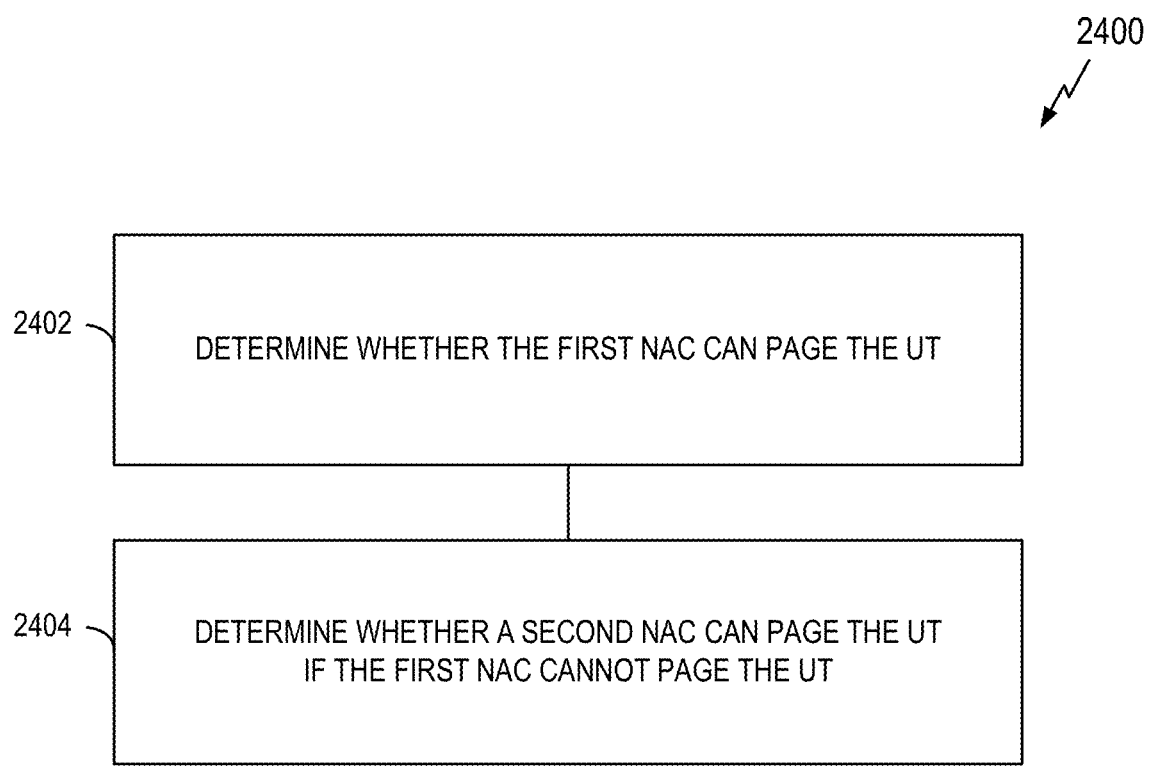
FIG. 24 is a flowchart illustrating an example of a process for determining which NAC can page a UT in accordance with some aspects of the disclosure.

FIG. 24 illustrates a process 2400 for communication in accordance with some aspects of the disclosure. In some implementations, the process 2400 may be performed in addition to (e.g., in conjunction with) the process 2200 of FIG. 22. The process 2400 may take place within a processing circuit which may be located in a NAC, an SNP, or some other suitable apparatus. In some implementations, the process 2400 represents operations performed by the SNP controller 250 of FIG. 2. In some implementations, the process 2400 represents operations performed by the apparatus 2100 of FIG. 21 (e.g., by the processing circuit 2110). Of course, in various aspects within the scope of the disclosure, the process 2400 may be implemented by any suitable apparatus capable of supporting paging-related operations.

At block 2402, an apparatus (e.g., a NAC) determines whether the first NAC can page the UT. These operations correspond to the operations of block 2204 of FIG. 2. In some implementations, the circuit/module for determining whether a NAC can page a UT 2122 of FIG. 21 performs the operations of block 2402. In some implementations, the code for determining whether a NAC can page a UT 2146 of FIG. 21 is executed to perform the operations of block 2402.

At block 2404, if the first NAC cannot page the UT, the apparatus determines whether a second NAC can page the UT. For example, a NAC may perform the operations of FIG. 25 to determine whether the second NAC can page the UT. In some implementations, the circuit/module for determining whether a NAC can page a UT 2122 of FIG. 21 performs the operations of block 2404. In some implementations, the code for determining whether a NAC can page a UT 2146 of FIG. 21 is executed to perform the operations of block 2404.

Fourth Example Process

Figure 25:
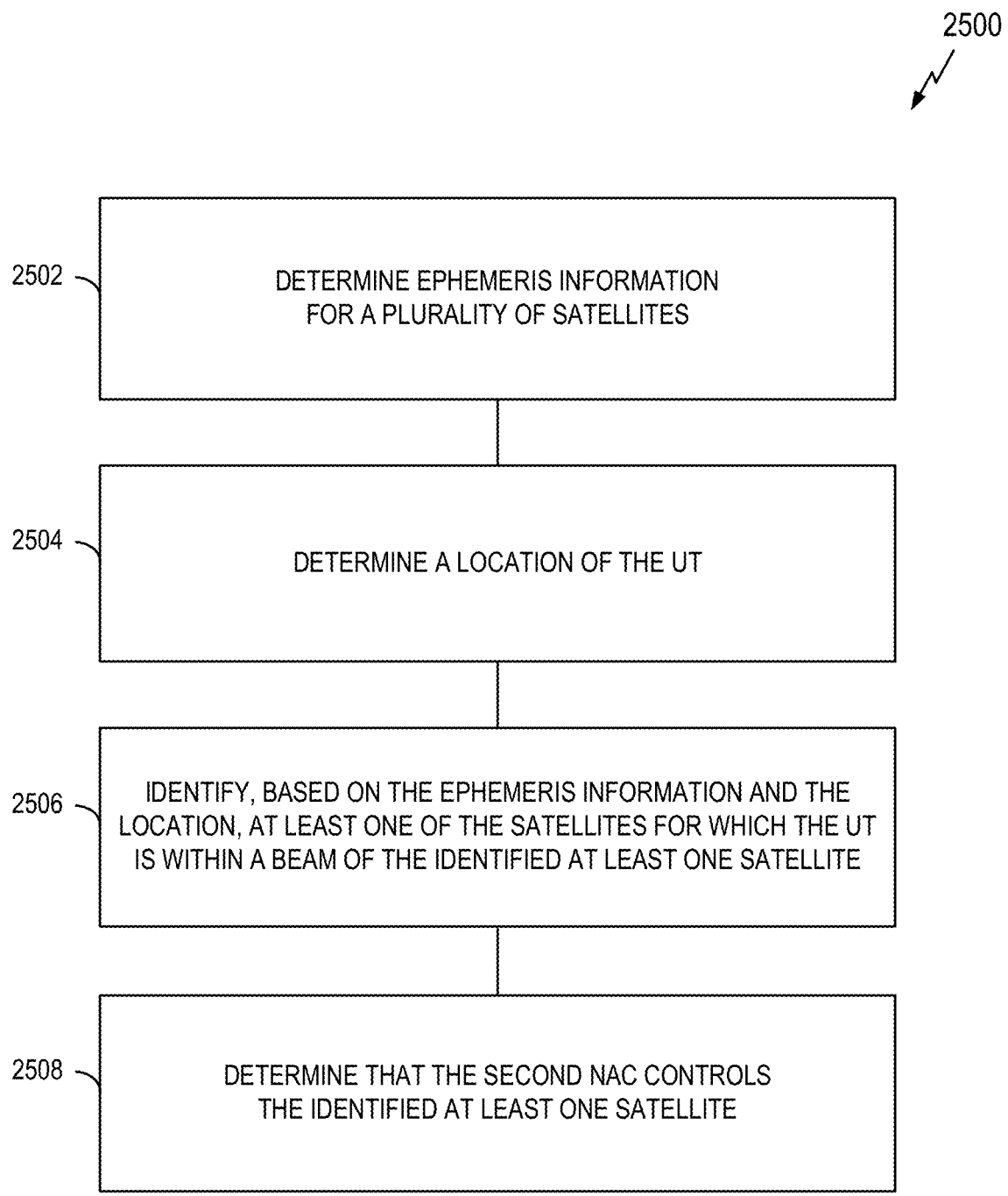
FIG. 25 is a flowchart illustrating an example of a process for determining whether a NAC can page a UT in accordance with some aspects of the disclosure.

FIG. 25 illustrates a process 2500 for communication in accordance with some aspects of the disclosure. In some implementations, the process 2500 may be performed in addition to (e.g., in conjunction with) the process 2200 of FIG. 22 or the process 2400 of FIG. 24 (e.g., to determine whether the second NAC can page the UT). The process 2500 may take place within a processing circuit which may be located in a NAC, an SNP, or some other suitable apparatus. In some implementations, the process 2500 represents operations performed by the SNP controller 250 of FIG. 2. In some implementations, the process 2500 represents operations performed by the apparatus 2100 of FIG. 21 (e.g., by the processing circuit 2110). Of course, in various aspects within the scope of the disclosure, the process 2500 may be implemented by any suitable apparatus capable of supporting paging-related operations.

At block 2502, an apparatus (e.g., a NAC) determines ephemeris information for a plurality of satellites. For example, a NAC may retrieve this information from a database. In some implementations, the circuit/module for determining whether a NAC can page a UT 2122 of FIG. 21 performs the operations of block 2502. In some implementations, the code for determining whether a NAC can page a UT 2146 of FIG. 21 is executed to perform the operations of block 2502.

At block 2504, the apparatus determines a location of the UT. For example, a NAC may retrieve UT location information from a UTLDB. In some implementations, the circuit/module for determining a location 2132 of FIG. 21 performs the operations of block 2504. In some implementations, the code for determining a location 2156 of FIG. 21 is executed to perform the operations of block 2504.

At block 2506, the apparatus identifies at least one of the satellites for which the UT is within a beam of the identified at least one satellite. In some aspects, this identification may be based on the ephemeris information determined at block 2502 and the location determined at block 2504. In some implementations, the circuit/module for determining whether a NAC can page a UT 2122 of FIG. 21 performs the operations of block 2506. In some implementations, the code for determining whether a NAC can page a UT 2146 of FIG. 21 is executed to perform the operations of block 2506.

At block 2508, the apparatus determines that the second NAC controls the identified at least one satellite. For example, a NAC may check a configuration database to determine the current mappings between SNPs and satellites in the system. In some implementations, the circuit/module for determining whether a NAC can page a UT 2122 of FIG. 21 performs the operations of block 2508. In some implementations, the code for determining whether a NAC can page a UT 2146 of FIG. 21 is executed to perform the operations of block 2508.

Fifth Example Process

Figure 26:
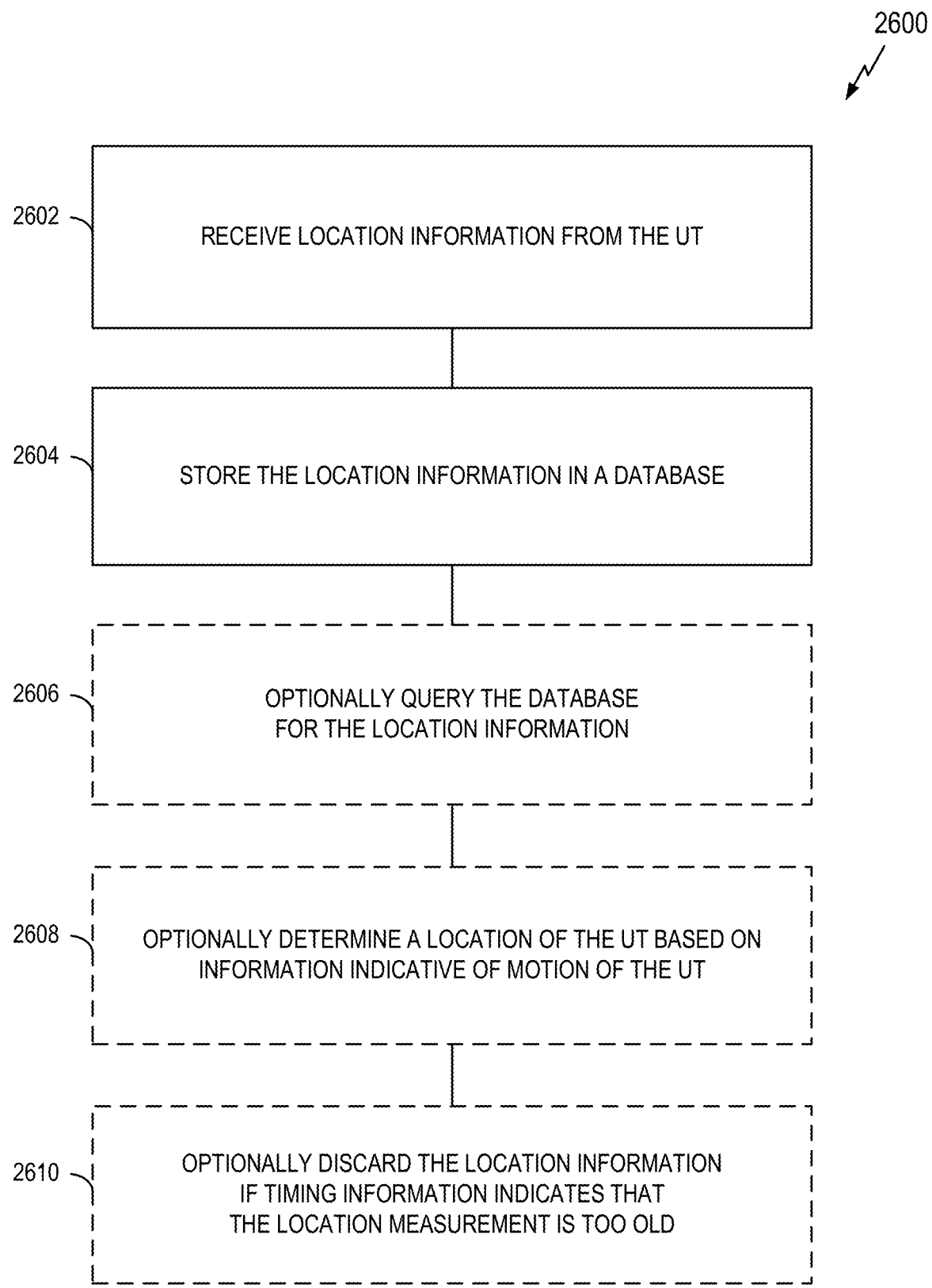
FIG. 26 is a flowchart illustrating an example of a process for managing location information in accordance with some aspects of the disclosure.

FIG. 26 illustrates a process 2600 for communication in accordance with some aspects of the disclosure. In some implementations, the process 2600 may be performed in addition to (e.g., in conjunction with) the process 2200 of FIG. 22. The process 2600 may take place within a processing circuit which may be located in a NAC, an SNP, or some other suitable apparatus. In some implementations, the process 2600 represents operations performed by the SNP controller 250 of FIG. 2. In some implementations, the process 2600 represents operations performed by the apparatus 2100 of FIG. 21 (e.g., by the processing circuit 2110). Of course, in various aspects within the scope of the disclosure, the process 2600 may be implemented by any suitable apparatus capable of supporting paging-related operations.

At block 2602, an apparatus (e.g., a NAC) receives location information from the UT. For example, this information may be included in a location report message transmitted by the UT. In some implementations, the circuit/module for receiving from a UT 2126 of FIG. 21 performs the operations of block 2602. In some implementations, the code for receiving from a UT 2150 of FIG. 21 is executed to perform the operations of block 2602.

At block 2604, the apparatus stores the location information in a database. For example, a NAC may store received UT location information in a UTLDB. In some implementations, the circuit/module for storing 2128 of FIG. 21 performs the operations of block 2604. In some implementations, the code for storing 2152 of FIG. 21 is executed to perform the operations of block 2604.

At optional block 2606, the apparatus may query the database for the location information stored at block 2604. For example, a NAC may retrieve UT location information to identify each satellite for which the UT falls under the coverage area of the satellite, to determine whether service is allowed, or for other purposes. In some implementations, the circuit/module for querying 2130 of FIG. 21 performs the operations of block 2606. In some implementations, the code for querying 2154 of FIG. 21 is executed to perform the operations of block 2606.

In some aspects, the location information may include information indicative of motion of the UT. In this case, at optional block 2608, the apparatus may determine a location of the UT based on the information indicative of motion of the UT. In some implementations, the circuit/module for determining a location 2132 of FIG. 21 performs the operations of block 2608. In some implementations, the code for determining a location 2156 of FIG. 21 is executed to perform the operations of block 2608.

In some aspects, the location information may include timing information associated with a location measurement for the UT. In this case, at optional block 2610, the apparatus may discard the location information if the timing information indicates that the location measurement is too old. In some implementations, the circuit/module for discarding 2134 of FIG. 21 performs the operations of block 2610. In some implementations, the code for discarding 2158 of FIG. 21 is executed to perform the operations of block 2610.

Sixth Example Process

Figure 27:
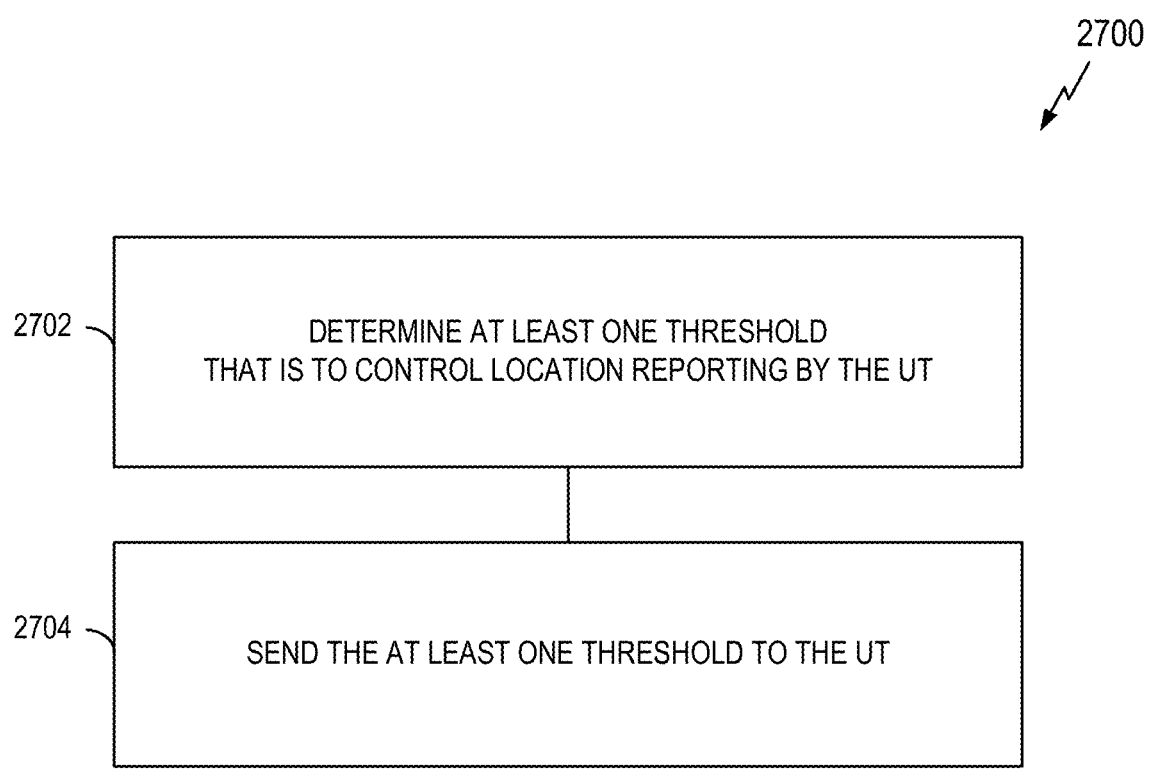
FIG. 27 is a flowchart illustrating an example of a process of providing a threshold to a UT in accordance with some aspects of the disclosure.

FIG. 27 illustrates a process 2700 for communication in accordance with some aspects of the disclosure. In some implementations, the process 2700 may be performed in addition to (e.g., in conjunction with) the process 2200 of FIG. 22. The process 2700 may take place within a processing circuit which may be located in a NAC, an SNP, or some other suitable apparatus. In some implementations, the process 2700 represents operations performed by the SNP controller 250 of FIG. 2. In some implementations, the process 2700 represents operations performed by the apparatus 2100 of FIG. 21 (e.g., by the processing circuit 2110). Of course, in various aspects within the scope of the disclosure, the process 2700 may be implemented by any suitable apparatus capable of supporting paging-related operations.

At block 2702, an apparatus (e.g., a NAC) determines at least one threshold that is to control location reporting by the UT. For example, a NAC may send a distance-based threshold to the UT. In some aspects, the at least one threshold includes a first threshold for idle mode and a second threshold for connected mode. In some implementations, the circuit/module for determining a location 2132 of FIG. 21 performs the operations of block 2702. In some implementations, the code for determining a location 2156 of FIG. 21 is executed to perform the operations of block 2702.

At block 2704, the apparatus sends the at least one threshold to the UT. In some implementations, the circuit/module for sending 2136 of FIG. 21 performs the operations of block 2704. In some implementations, the code for sending 2160 of FIG. 21 is executed to perform the operations of block 2704.

Seventh Example Process

Figure 28:
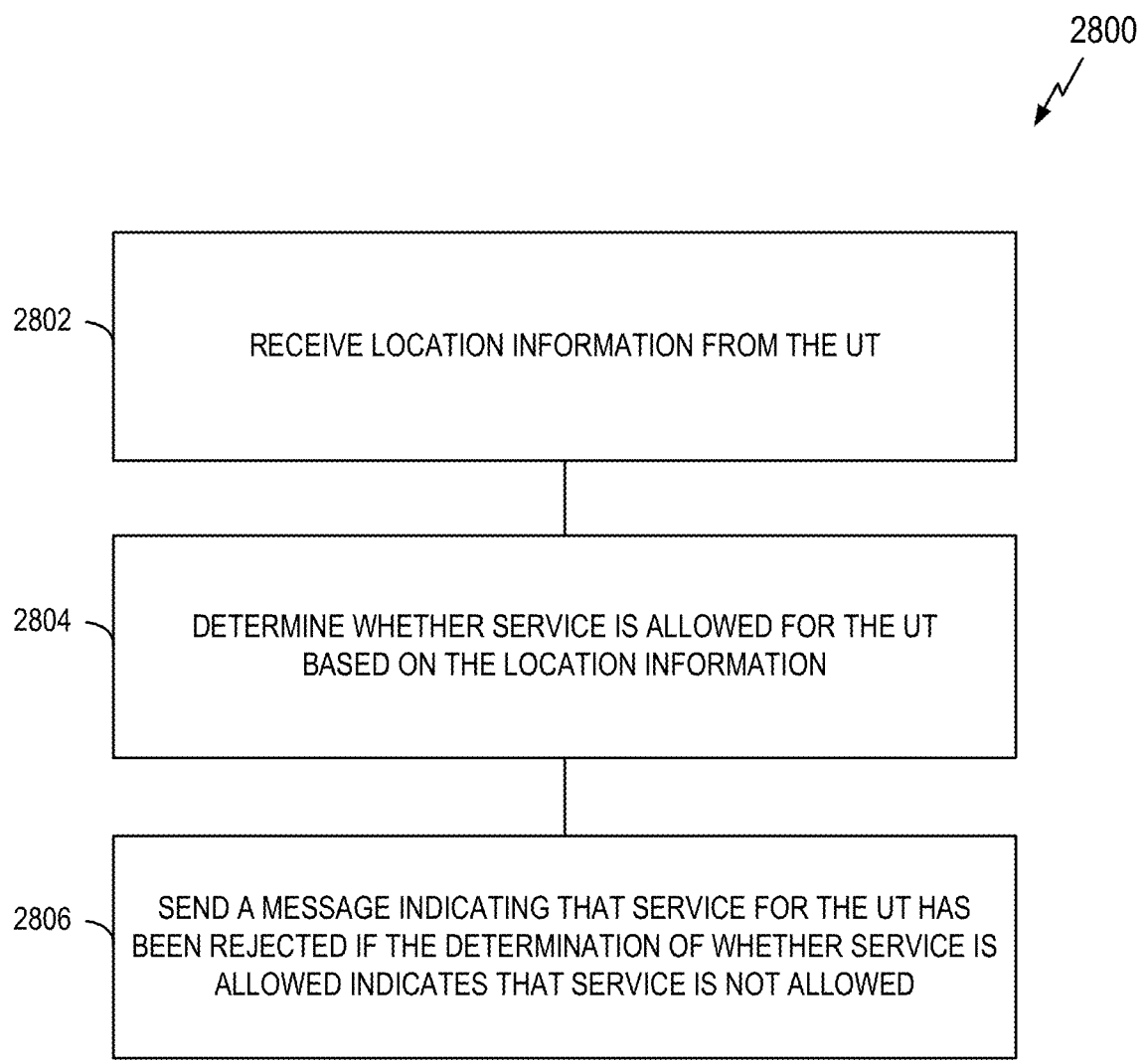
FIG. 28 is a flowchart illustrating an example of a service management process in accordance with some aspects of the disclosure.

FIG. 28 illustrates a process 2800 for communication in accordance with some aspects of the disclosure. In some implementations, the process 2800 may be performed in addition to (e.g., in conjunction with) the process 2200 of FIG. 22. The process 2800 may take place within a processing circuit which may be located in a NAC, an SNP, or some other suitable apparatus. In some implementations, the process 2800 represents operations performed by the SNP controller 250 of FIG. 2. In some implementations, the process 2800 represents operations performed by the apparatus 2100 of FIG. 21 (e.g., by the processing circuit 2110). Of course, in various aspects within the scope of the disclosure, the process 2800 may be implemented by any suitable apparatus capable of supporting paging-related operations.

At block 2802, an apparatus (e.g., a NAC) receives location information from the UT. For example, this information may be included in a location report message transmitted by the UT. In some implementations, the circuit/module for receiving from a UT 2126 of FIG. 21 performs the operations of block 2802. In some implementations, the code for receiving from a UT 2150 of FIG. 21 is executed to perform the operations of block 2802.

At block 2804, the apparatus determines whether service is allowed for the UT. In some aspects, this determination may be based on the location information received at block 2802. In some aspects, this determination may be based on an area restriction (e.g., a country restriction, etc.). In some implementations, the circuit/module for determining whether service is allowed 2138 of FIG. 21 performs the operations of block 2804. In some implementations, the code for determining whether service is allowed 2162 of FIG. 21 is executed to perform the operations of block 2804.

At block 2806, if the determination of whether service is allowed indicates that service is not allowed, the apparatus sends a message indicating that service for the UT has been rejected. In some implementations, the circuit/module for sending 2136 of FIG. 21 performs the operations of block 2806. In some implementations, the code for sending 2160 of FIG. 21 is executed to perform the operations of block 2806.

Eighth Example Process

Figure 29:
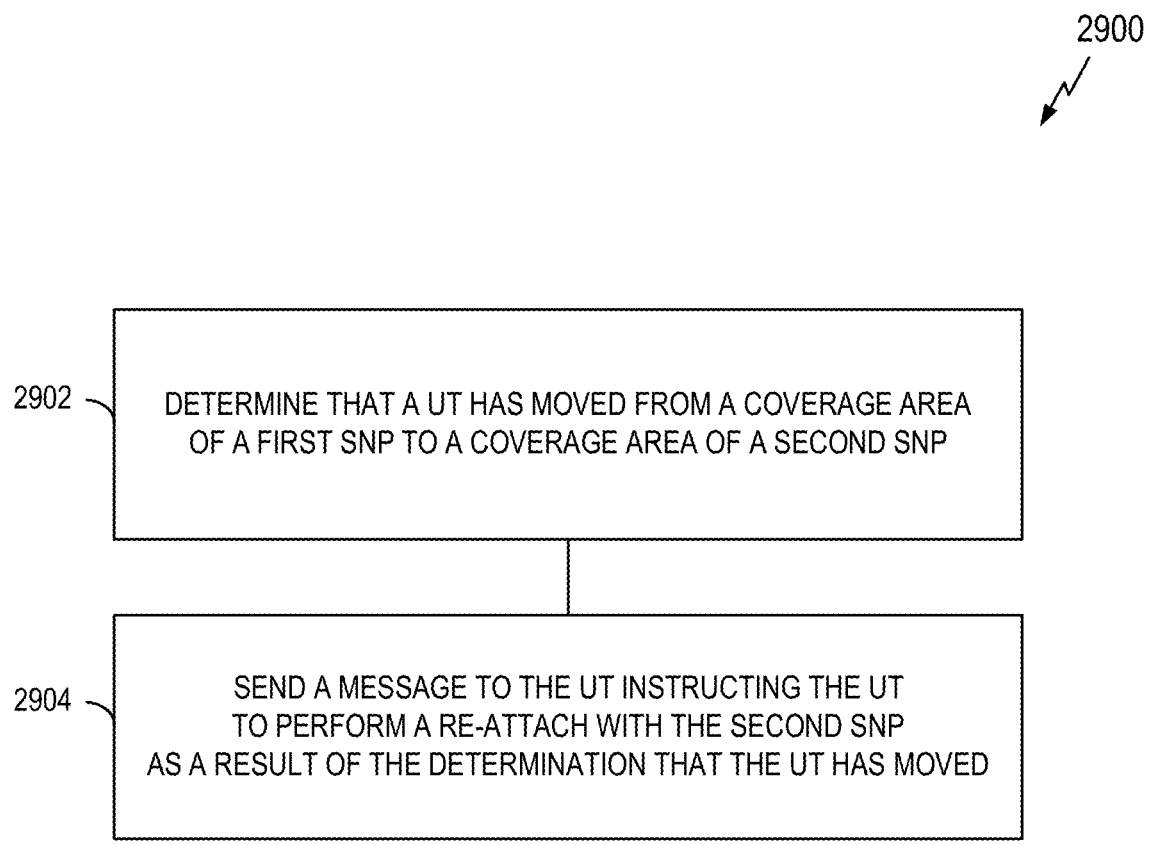
FIG. 29 is a flowchart illustrating an example of a re-attach management process in accordance with some aspects of the disclosure.

FIG. 29 illustrates a process 2900 for communication in accordance with some aspects of the disclosure. In some implementations, the process 2900 may be performed in addition to (e.g., in conjunction with) the process 2200 of FIG. 22. The process 2900 may take place within a processing circuit which may be located in a NAC, an SNP, or some other suitable apparatus. In some implementations, the process 2900 represents operations performed by the SNP controller 250 of FIG. 2. In some implementations, the process 2900 represents operations performed by the apparatus 2100 of FIG. 21 (e.g., by the processing circuit 2110). Of course, in various aspects within the scope of the disclosure, the process 2900 may be implemented by any suitable apparatus capable of supporting paging-related operations.

At block 2902, an apparatus (e.g., a NAC) determines that the UT has moved from a coverage area of a first satellite network portal (SNP) to a coverage area of a second SNP. This determination may be based, for example, on the location of the UT and the current coverage areas of the satellites currently managed by the SNPs. In some implementations, the circuit/module for determining that a UT has moved 2140 of FIG. 21 performs the operations of block 2902. In some implementations, the code for determining that a UT has moved 2164 of FIG. 21 is executed to perform the operations of block 2902.

At block 2904, as a result of the determination that the UT has moved at block 2902, the apparatus sends a message to the UT instructing the UT to perform a re-attach with the second SNP. In some implementations, the circuit/module for sending 2136 of FIG. 21 performs the operations of block 2904. In some implementations, the code for sending 2160 of FIG. 21 is executed to perform the operations of block 2904.

In some aspects, the process 2900 further includes sending information between the UT and a core network user-plane (CNUP) of the first SNP via a virtual private network (VPN) gateway of the second SNP. In some implementations, the circuit/module for sending 2136 of FIG. 21 performs these operations. In some implementations, the code for sending 2160 of FIG. 21 is executed to perform these operations.

Ninth Example Process

Figure 30:
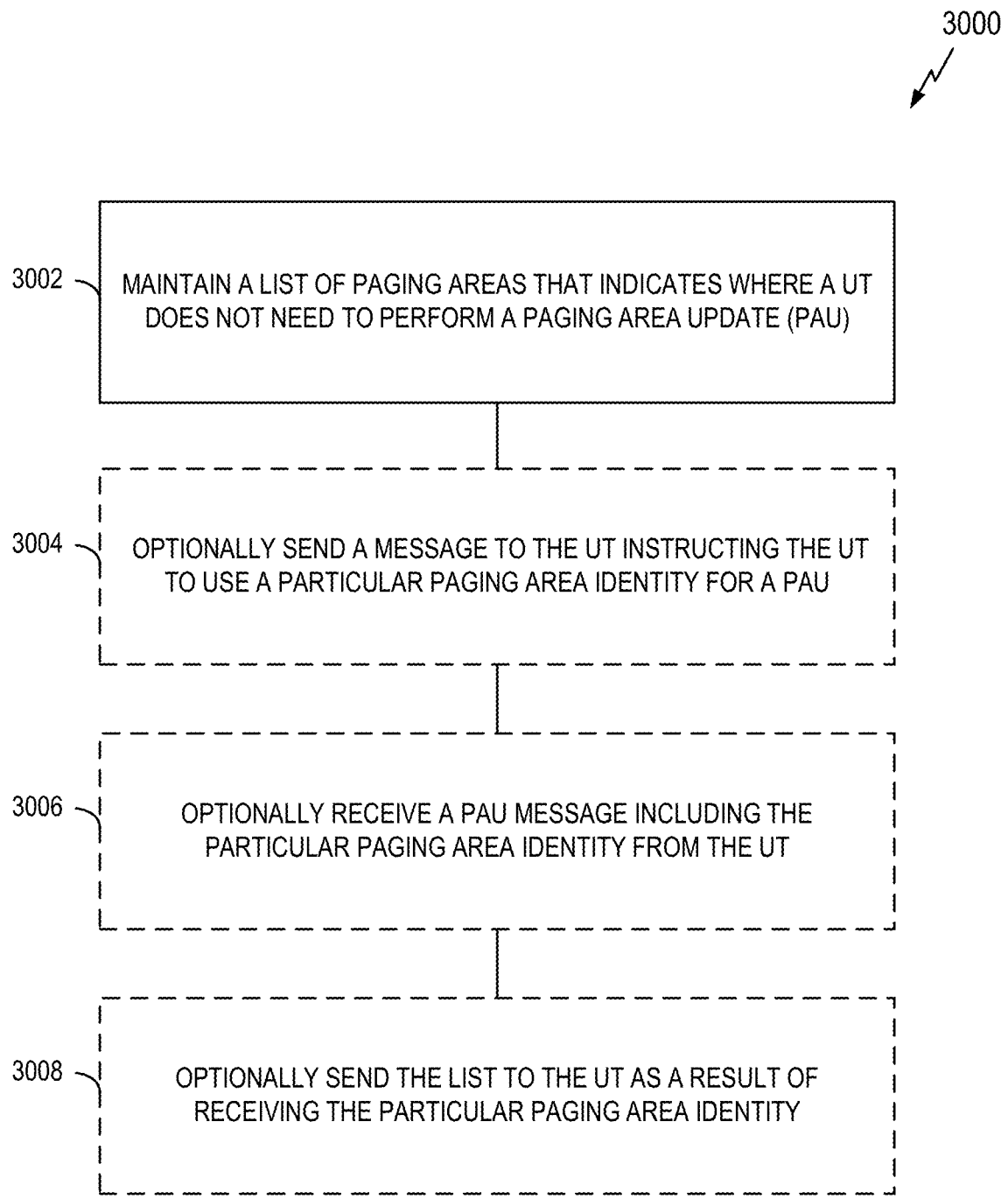
FIG. 30 is a flowchart illustrating an example of a paging area update process in accordance with some aspects of the disclosure.

FIG. 30 illustrates a process 3000 for communication in accordance with some aspects of the disclosure. In some implementations, the process 3000 may be performed in addition to (e.g., in conjunction with) the process 2200 of FIG. 22. The process 3000 may take place within a processing circuit which may be located in a NAC, an SNP, or some other suitable apparatus. In some implementations, the process 3000 represents operations performed by the SNP controller 250 of FIG. 2. In some implementations, the process 3000 represents operations performed by the apparatus 2100 of FIG. 21 (e.g., by the processing circuit 2110). Of course, in various aspects within the scope of the disclosure, the process 3000 may be implemented by any suitable apparatus capable of supporting paging-related operations.

At block 3002, an apparatus (e.g., a NAC) maintains a list of paging areas that indicates where the UT does not need to perform a paging area update (PAU). In some implementations, the circuit/module for maintaining 2142 of FIG. 21 performs the operations of block 3002. In some implementations, the code for maintaining 2166 of FIG. 21 is executed to perform the operations of block 3002.

At optional block 3004, the apparatus may send a message to the UT instructing the UT to use a particular paging area identity for a PAU. In some implementations, the circuit/module for sending 2136 of FIG. 21 performs the operations of block 3004. In some implementations, the code for sending 2160 of FIG. 21 is executed to perform the operations of block 3004.

At optional block 3006, as a result of sending the message at block 3004, the apparatus may receive a PAU message including the particular paging area identity from the UT. In some implementations, the circuit/module for receiving a message 2120 of FIG. 21 performs the operations of block 3006. In some implementations, the code for receiving a message 2144 of FIG. 21 is executed to perform the operations of block 3006.

At optional block 3008, as a result of receiving the particular paging area identity at block 3006, the apparatus sends the list of paging areas (from block 3002) to the UT. In some implementations, the circuit/module for sending 2136 of FIG. 21 performs the operations of block 3008. In some implementations, the code for sending 2160 of FIG. 21 is executed to perform the operations of block 3008.

Second Example Apparatus

Figure 31:
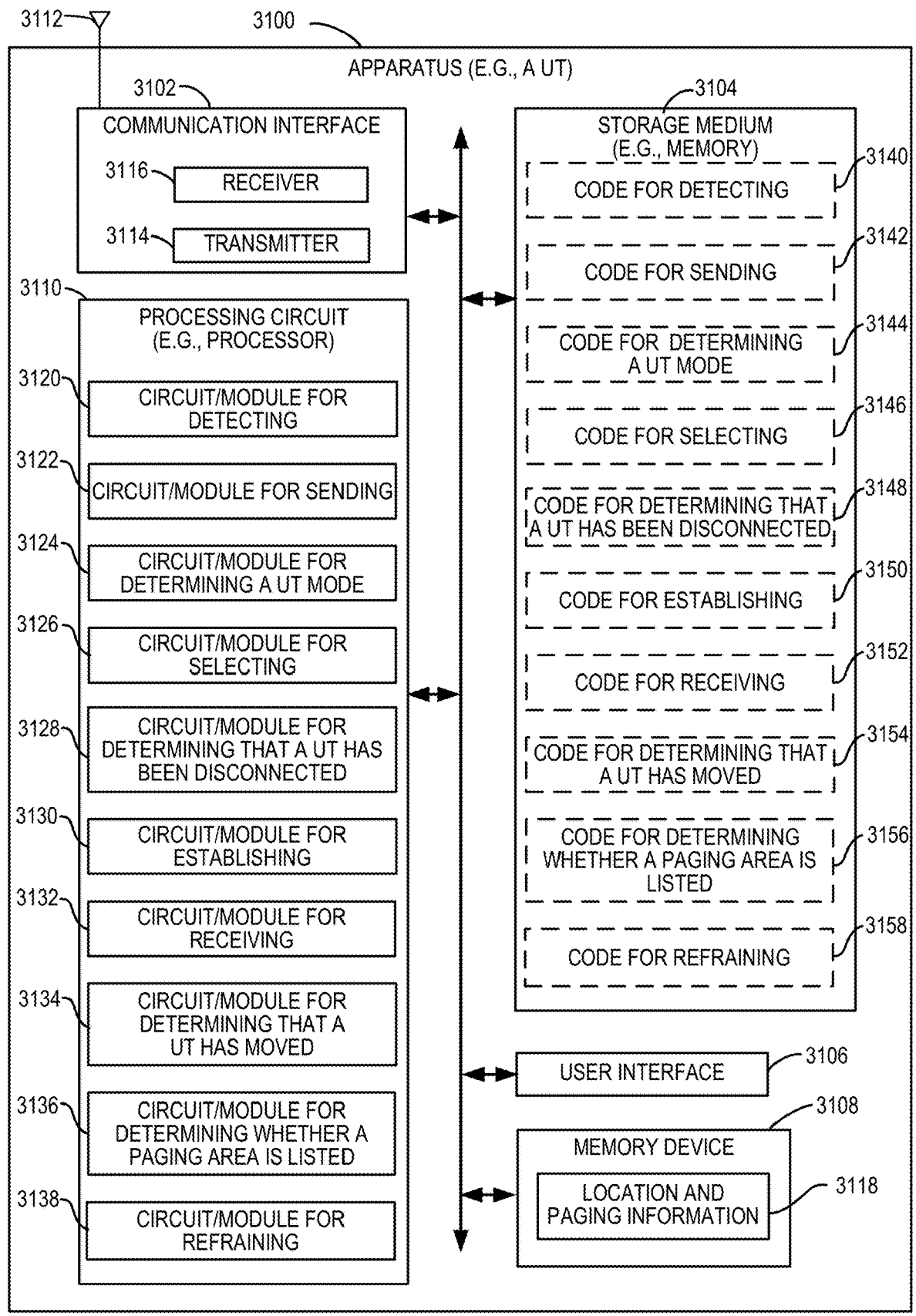
FIG. 31 is a block diagram illustrating an example hardware implementation for another apparatus (e.g., an electronic device) that can support location reporting and paging in accordance with some aspects of the disclosure.

FIG. 31 is an illustration of an apparatus 3100 that may support location reporting according to one or more aspects of the disclosure. For example, the apparatus 3100 could embody or be implemented within a UT, an SNP, a satellite, or some other type of device that supports satellite communication. In various implementations, the apparatus 3100 could embody or be implemented within a gateway, a ground station, a vehicular component, or any other electronic device having circuitry.

The apparatus 3100 includes a communication interface 3102 (e.g., at least one transceiver), a storage medium 3104, a user interface 3106, a memory device 3108 (e.g., storing location-related information and/or paging-related information 3118), and a processing circuit 3110 (e.g., at least one processor). In various implementations, the user interface 3106 may include one or more of: a keypad, a display, a speaker, a microphone, a touchscreen display, of some other circuitry for receiving an input from or sending an output to a user. The communication interface 3102 may be coupled to one or more antennas 3112, and may include a transmitter 3114 and a receiver 3116. In general, the components of FIG. 31 may be similar to corresponding components of the apparatus 2100 of FIG. 21.

According to one or more aspects of the disclosure, the processing circuit 3110 may be adapted to perform any or all of the features, processes, functions, operations and/or routines for any or all of the apparatuses described herein. For example, the processing circuit 3110 may be configured to perform any of the steps, functions, and/or processes described with respect to FIGS. 1-20 and 32-39. As used herein, the term "adapted" in relation to the processing circuit 3110 may refer to the processing circuit 3110 being one or more of configured, used, implemented, and/or programmed to perform a particular process, function, operation and/or routine according to various features described herein.

The processing circuit 3110 may be a specialized processor, such as an application specific integrated circuit (ASIC) that serves as a means for (e.g., structure for) carrying out any one of the operations described in conjunction with FIGS. 1-20 and 32-39. The processing circuit 3110 may serve as one example of a means for transmitting and/or a means for receiving. In various implementations, the processing circuit 3110 may incorporate the functionality of the control processor 420 of FIG. 4.

According to at least one example of the apparatus 3100, the processing circuit 3110 may include one or more of a circuit/module for detecting 3120, a circuit/module for sending 3122, a circuit/module for determining a UT mode 3124, a circuit/module for selecting 3126, a circuit/module for determining that a UT has been disconnected 3128, a circuit/module for establishing 3130, a circuit/module for receiving 3132, a circuit/module for determining that a UT has moved 3134, a circuit/module for determining whether a paging area is listed 3136, or a circuit/module for refraining 3138. In various implementations, the circuit/module for detecting 3120, the circuit/module for sending 3122, the circuit/module for determining a UT mode 3124, the circuit/module for selecting 3126, the circuit/module for determining that a UT has been disconnected 3128, the circuit/module for establishing 3130, the circuit/module for receiving 3132, the circuit/module for determining that a UT has moved 3134, the circuit/module for determining whether a paging area is listed 3136, or the circuit/module for refraining 3138 may correspond, at least in part, to the control processor 420 of FIG. 4.

The circuit/module for detecting 3120 may include circuitry and/or programming (e.g., code for detecting 3140, with this code being stored on the storage medium 3104) adapted to perform several functions relating to, for example, detecting a change in a location of a user terminal (UT) beyond a threshold distance. In some implementations, the circuit/module for detecting 3120 performs the operations of FIG. 33. In some implementations, the circuit/module for detecting 3120 includes circuits/modules and/or code for performing the operations set forth in FIG. 35. For example, in some implementations, a circuit/module (and/or code) for determining a distance accesses a memory that stores UT location information, retrieves the information for a particular UT (e.g., for first and second locations of the UT), determines the distance between the locations, and outputs an indication of the distance to another circuit/module or function. In some implementations, a circuit/module (and/or code) for comparing (e.g., a comparator) receives the indication of distance, obtains a threshold (e.g., from a memory), compares the distance to the threshold, and output an indication of the comparison. In some implementations, the circuit/module for detecting 3120 performs the operations of FIG. 35. In some implementations, the circuit/module for detecting 3120 includes a circuit/module and/or code for determining that a UT has deviated from a projected path that performs the operations set forth in FIG. 35.

The circuit/module for sending 3122 may include circuitry and/or programming (e.g., code for sending 3142, with this code being stored on the storage medium 3104) adapted to perform several functions relating to, for example, sending information (e.g., data) to another apparatus (e.g., a NAC). In some implementations, the information is a message including location information for the UT. In some implementations, the sending of the message is triggered by detection of a change in the location of the UT. In some implementations, the information is a PAI. In some implementations, the sending of the PAI is triggered by a determination that the UT has moved. Initially, the circuit/module for sending 3122 obtains an indication of the appropriate trigger and the information to be sent (e.g., from the memory device 3108, or some other component). The circuit/module for sending 3122 may then format the information for sending (e.g., according to a protocol, etc.). The circuit/module for sending 3122 then causes the information to be sent via a wireless communication medium (e.g., via satellite signaling). To this end, the circuit/module for sending 3122 may send the data to the communication interface 3102 (e.g., a digital subsystem or an RF subsystem) or some other component for transmission. In some implementations, the communication interface 3102 includes the circuit/module for sending 3122 and/or the code for sending 3142. In some implementations, the circuit/module for sending 3122 is configured to control the communication interface 3102 (e.g., a transceiver or a transmitter) to send the information.

The circuit/module for determining a UT mode 3124 may include circuitry and/or programming (e.g., code for determining a UT mode 3144, with this code being stored on the storage medium 3104) adapted to perform several functions relating to, for example, determining whether the UT is in an idle mode or a connected mode. In some implementations, the circuit/module for determining a UT mode 3124 makes this determination by retrieving an indication from the memory device 3108 or some other component of the apparatus 3100. In some implementations, the circuit/module for determining a UT mode 3124 makes this determination by communicating with a radio of the apparatus. The circuit/module for determining a UT mode 3124 may then output an indication of this determination (e.g., to the memory device 3108 or some other component of the apparatus 3100).

The circuit/module for selecting 3126 may include circuitry and/or programming (e.g., code for selecting 3146, with this code being stored on the storage medium 3104) adapted to perform several functions relating to, for example, selecting a threshold based on the determination of whether the UT is in an idle mode or a connected mode. Initially, the circuit/module for selecting 3126 receives an indication of the UT mode (e.g., from the memory device 3108, the circuit/module for determining a UT mode 3124, or some other component of the apparatus 3100). In some implementations, the circuit/module for selecting 3126 then selects between a first threshold designated for idle mode and a second threshold designated for connected mode. The circuit/module for selecting 3126 may then output an indication of this selection (e.g., to the memory device 3108 or some other component of the apparatus 3100).

The circuit/module for determining that a UT has been disconnected 3128 may include circuitry and/or programming (e.g., code for determining that a UT has been disconnected 3148, with this code being stored on the storage medium 3104) adapted to perform several functions relating to, for example, determining that the UT has been disconnected (e.g., from a network). In some implementations, the circuit/module for determining that a UT has been disconnected 3128 makes this determination based on a received message (e.g., as discussed herein). Thus, the circuit/module for determining that a UT has been disconnected 3128 may receive the information from the message (e.g., from the memory device 3108, the communication interface 3102, or some other component of the apparatus 3100). The circuit/module for determining that a UT has been disconnected 3128 may then output an indication of this determination (e.g., to the memory device 3108 or some other component of the apparatus 3100).

The circuit/module for establishing 3130 may include circuitry and/or programming (e.g., code for establishing 3150, with this code being stored on the storage medium 3104) adapted to perform several functions relating to, for example, establishing a connection. In some implementations, the connection is established as a result of the determination that the UT has been disconnected and/or in response to a connection trigger. Thus, in some implementations, the circuit/module for establishing 3130 receives an indication of this determination and an indication of the trigger. The circuit/module for establishing 3130 then communicates with an appropriate network entity (e.g., via the communication interface 3102) to establish the connection between the UT and the network.

The circuit/module for receiving 3132 may include circuitry and/or programming (e.g., code for receiving 3152, with this code being stored on the storage medium 3104) adapted to perform several functions relating to, for example, receiving information. In some implementations, the information is a list of paging areas. In some implementations, the information is an indication that a UT is to send a particular PAI. Initially, the circuit/module for receiving 3132 obtains received information. For example, the circuit/module for receiving 3132 may obtain this information from a component of the apparatus 3100 such as the communication interface 3102 (e.g., a digital subsystem or an RF subsystem), the memory device 3108, or some other component. As another example, the circuit/module for receiving 3132 may receive information directly from a device (e.g., a satellite) that relayed the information to the user terminal. In some implementations, the circuit/module for receiving 3132 identifies a memory location of a value in the memory device 3108 and invokes a read of that location. In some implementations, the circuit/module for receiving 3132 processes (e.g., decodes) the received information. The circuit/module for receiving 3132 outputs the received information (e.g., stores the received information in the memory device 3108 or sends the information to another component of the apparatus 3100). In some implementations, the communication interface 3102 includes the circuit/module for receiving 3132 and/or the code for receiving 3152. In some implementations, the circuit/module for receiving 3132 is configured to control the communication interface 3102 (e.g., a transceiver or a receiver) to receive the information.

The circuit/module for determining that a UT has moved 3134 may include circuitry and/or programming (e.g., code for determining that a UT has moved 3154, with this code being stored on the storage medium 3104) adapted to perform several functions relating to, for example, determining that a UT has moved to a new coverage area. In some implementations, the circuit/module for determining that a UT has moved 3134 receives messages from the network that indicate which paging area the UT is currently in. The circuit/module for determining that a UT has moved 3134 may obtain this information from a component of the apparatus 3100 such as the communication interface 3102 (e.g., a digital subsystem or an RF subsystem), the memory device 3108, or some other component. As another example, the circuit/module for receiving 3132 may receive information directly from a device (e.g., a satellite) that relayed the information to the user terminal. In some implementations, the circuit/module for determining that a UT has moved 3134 determines the location of the UT (e.g., as discussed herein). The circuit/module for determining a location 3134 may then determine which satellites provide coverage at that location (e.g., from ephemeris information). Next, the circuit/module for determining a location 3134 identifies the SNPs that control those satellites (e.g., from a table and/or ephemeris information). In either scenario, the circuit/module for determining a location 3134 outputs an indication of its determination (e.g., to the memory device 3108 or some other component of the apparatus 3100).

The circuit/module for determining whether a paging area is listed 3136 may include circuitry and/or programming (e.g., code for determining whether a paging area is listed 3156, with this code being stored on the storage medium 3104) adapted to perform several functions relating to, for example, determining whether a paging area is listed in a list of paging areas. Initially, the circuit/module for determining whether a paging area is listed 3136 accesses the list. The circuit/module for determining whether a paging area is listed 3136 checks the list for an entry corresponding to the paging area of interest. The circuit/module for determining whether a paging area is listed 3136 then outputs an indication of its determination (e.g., to the memory device 3108 or some other component of the apparatus 3100).

The circuit/module for refraining 3138 may include circuitry and/or programming (e.g., code for refraining 3158, with this code being stored on the storage medium 3104) adapted to perform several functions relating to, for example, refraining from performing a paging area update if the new paging area is listed in the list. Initially, the circuit/module for refraining 3138 receives an indication of whether the paging area is listed (e.g., from the memory device 3108, the circuit/module for determining whether a paging area is listed 3136, or from some other component of the apparatus 3100). If the paging area is listed, the circuit/module for refraining 3138 may set a value (e.g., a flag) indicating that a PAU is not needed.

As mentioned above, programming stored by the storage medium 3104, when executed by the processing circuit 3110, causes the processing circuit 3110 to perform one or more of the various functions and/or process operations described herein. For example, the storage medium 3104 may include one or more of the code for detecting 3140, the code for sending 3142, the code for determining a UT mode 3144, the code for selecting 3146, the code for determining that a UT has been disconnected 3148, the code for establishing 3150, the code for receiving 3152, the code for determining that a UT has moved 3154, the code for determining whether a paging area is listed 3156, or the code for refraining 3158.

Tenth Example Process

Figure 32:
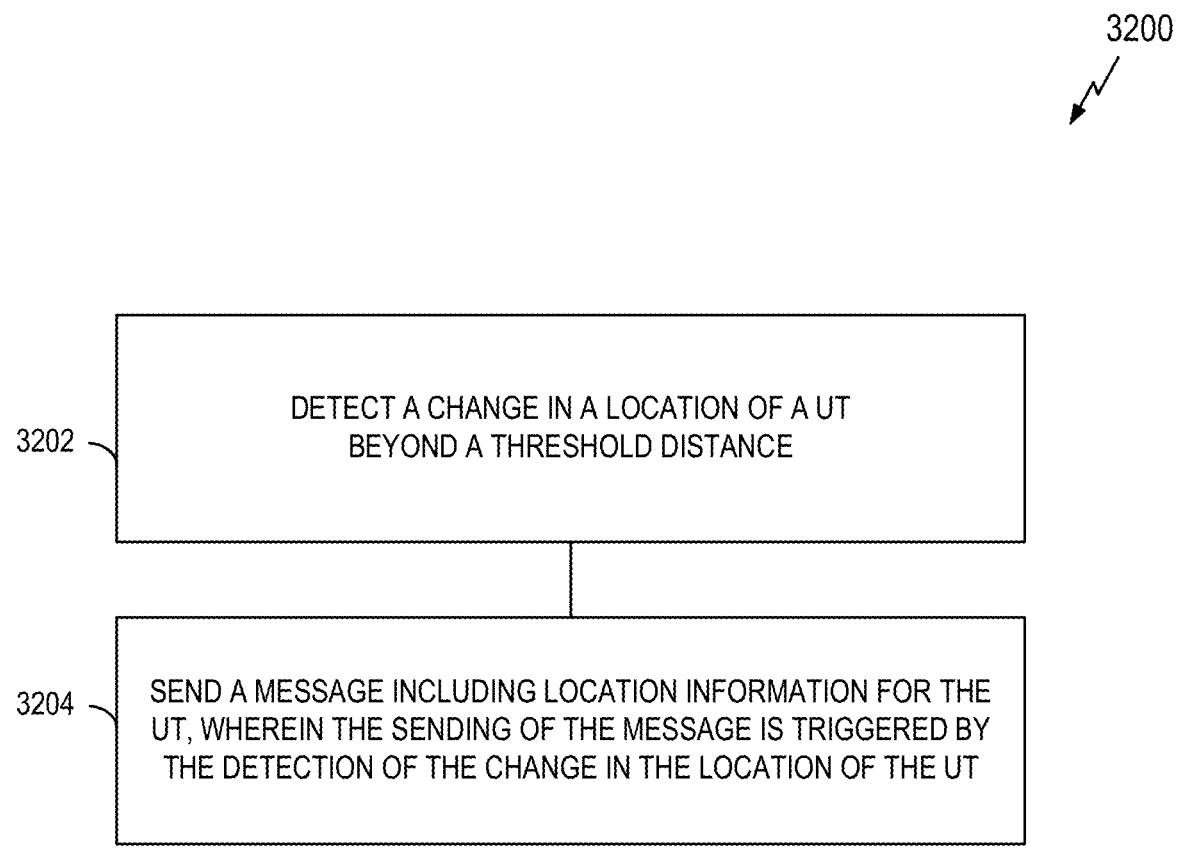
FIG. 32 is a flowchart illustrating an example of a location reporting process in accordance with some aspects of the disclosure.

FIG. 32 illustrates a process 3200 for communication in accordance with some aspects of the disclosure. The process 3200 may take place within a processing circuit which may be located in a UT, or some other suitable apparatus. In some implementations, the process 3200 represents operations performed by the control processor 420 of FIG. 4. In some implementations, the process 3200 represents operations performed by the apparatus 3100 of FIG. 31 (e.g., by the processing circuit 3110). Of course, in various aspects within the scope of the disclosure, the process 3200 may be implemented by any suitable apparatus capable of supporting location reporting-related operations.

At block 3202, an apparatus (e.g., a UT) detects a change in a location of a UT beyond a threshold distance. For example, a UT may perform the operations described in FIG. 33 or FIG. 35. In some aspects, the detection of the change in the location of the UT may include determining that the UT has deviated from a projected trajectory. In some implementations, the circuit/module for detecting 3120 of FIG. 31 performs the operations of block 3202. In some implementations, the code for detecting 3140 of FIG. 31 is executed to perform the operations of block 3202.

At block 3204, the apparatus sends a message including location information for the UT. In some aspects, the sending of the message may be triggered by the detection of the change in the location of the UT at block 3202. In some implementations, the circuit/module for sending 3122 of FIG. 31 performs the operations of block 3204. In some implementations, the code for sending 3142 of FIG. 31 is executed to perform the operations of block 3204.

The location information can take different forms in different implementations. In some aspects, the location information may include geographic coordinates indicative of a current location of the UT. In some aspects, the location information may indicate a velocity vector of the UT. In some aspects, the location information may indicate an acceleration vector of the UT.

The message can take different forms in different implementations. In some aspects, the message includes timing information indicative of a time of a location measurement. In some aspects, the message includes timing information indicative of a time at which the message is sent.

Eleventh Example Process

Figure 33:
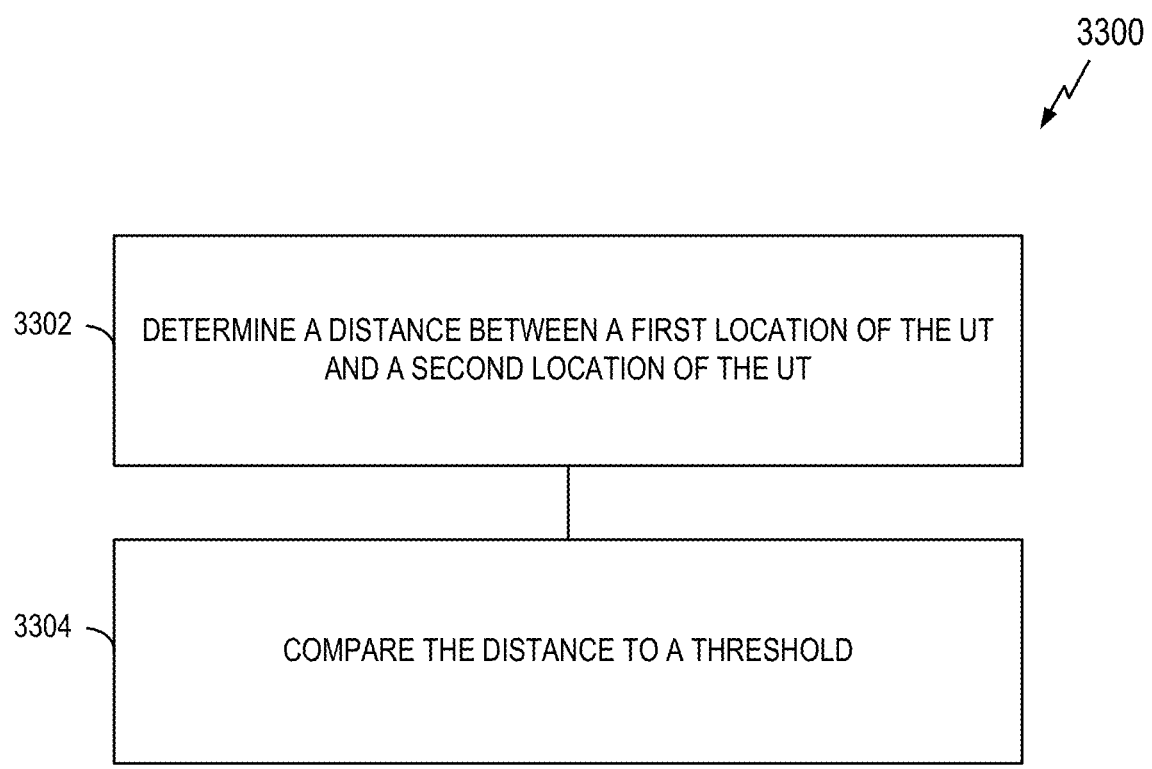
FIG. 33 is a flowchart illustrating an example of a process for detecting a change in the location of a UT in accordance with some aspects of the disclosure.

FIG. 33 illustrates a process 3300 for communication in accordance with some aspects of the disclosure. In some implementations, the process 3300 may be performed in addition to (e.g., in conjunction with) the process 3200 of FIG. 32 (e.g., to detect the change in the location of the UT). The process 3300 may take place within a processing circuit which may be located in a UT, or some other suitable apparatus. In some implementations, the process 3300 represents operations performed by the control processor 420 of FIG. 4. In some implementations, the process 3300 represents operations performed by the apparatus 3100 of FIG. 31 (e.g., by the processing circuit 3110). Of course, in various aspects within the scope of the disclosure, the process 3300 may be implemented by any suitable apparatus capable of supporting location reporting-related operations.

At block 3302, an apparatus (e.g., a UT) determines a distance between a first location of the UT and a second location of the UT. For example, the UT may retrieve this UT location information from a UTLDB. In some implementations, the circuit/module for detecting 3120 of FIG. 31 performs the operations of block 3302. In some implementations, the code for detecting 3140 of FIG. 31 is executed to perform the operations of block 3302.

At block 3304, the apparatus compares the distance to a threshold. In some implementations, the threshold is received from an SNP or other suitable entity. In some implementations, the circuit/module for detecting 3120 of FIG. 31 performs the operations of block 3304. In some implementations, the code for detecting 3140 of FIG. 31 is executed to perform the operations of block 3304.

Twelfth Example Process

Figure 34:
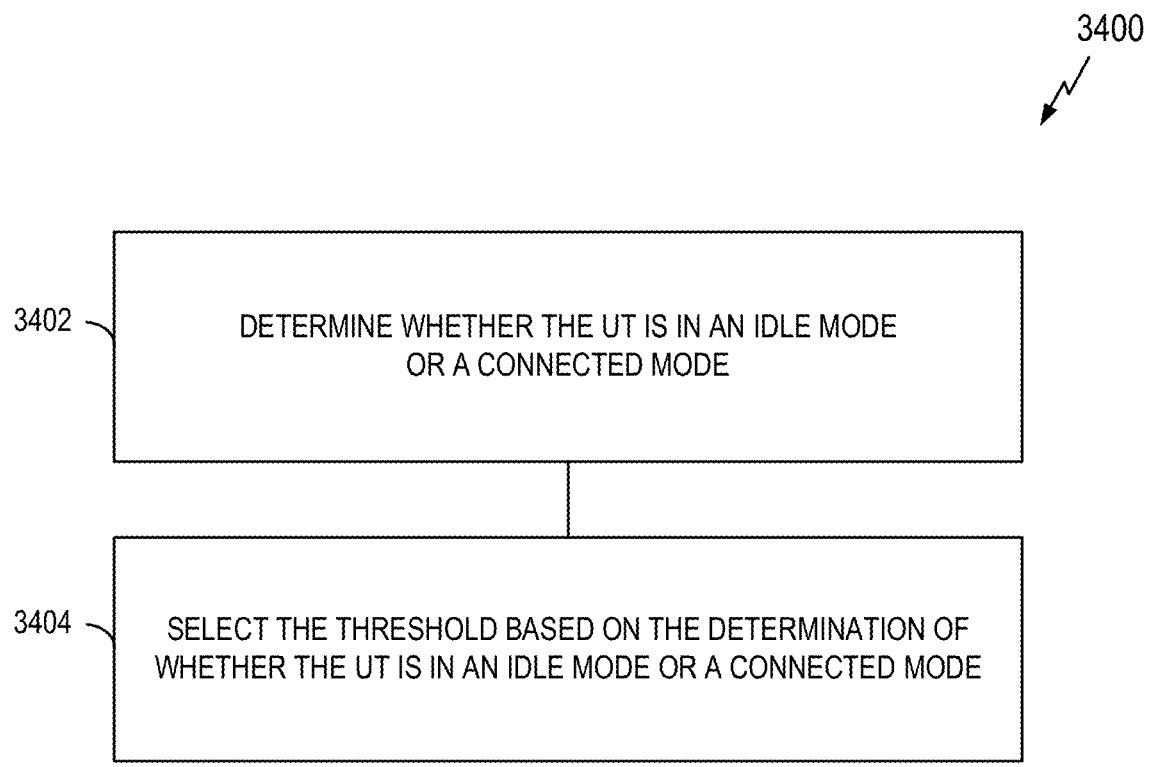
FIG. 34 is a flowchart illustrating an example of a threshold selection process in accordance with some aspects of the disclosure.

FIG. 34 illustrates a process 3400 for communication in accordance with some aspects of the disclosure. In some implementations, the process 3400 may be performed in addition to (e.g., in conjunction with) the process 3200 of FIG. 32 or the process 3300 of FIG. 33 (e.g., to select the threshold). The process 3400 may take place within a processing circuit which may be located in a UT, or some other suitable apparatus. In some implementations, the process 3400 represents operations performed by the control processor 420 of FIG. 4. In some implementations, the process 3400 represents operations performed by the apparatus 3100 of FIG. 31 (e.g., by the processing circuit 3110). Of course, in various aspects within the scope of the disclosure, the process 3400 may be implemented by any suitable apparatus capable of supporting location reporting-related operations.

At block 3402, an apparatus (e.g., a UT) determines whether the UT is in an idle mode or a connected mode. In some implementations, the circuit/module for determining a UT mode 3124 of FIG. 31 performs the operations of block 3402. In some implementations, the code for determining a UT mode 3144 of FIG. 31 is executed to perform the operations of block 3402.

At block 3404, the apparatus selects the threshold (e.g., used at FIG. 33) based on the determination at block 3402 of whether the UT is in an idle mode or a connected mode. In some implementations, the circuit/module for selecting 3126 of FIG. 31 performs the operations of block 3404. In some implementations, the code for selecting 3146 of FIG. 31 is executed to perform the operations of block 3404.

Thirteenth Example Process

Figure 35:
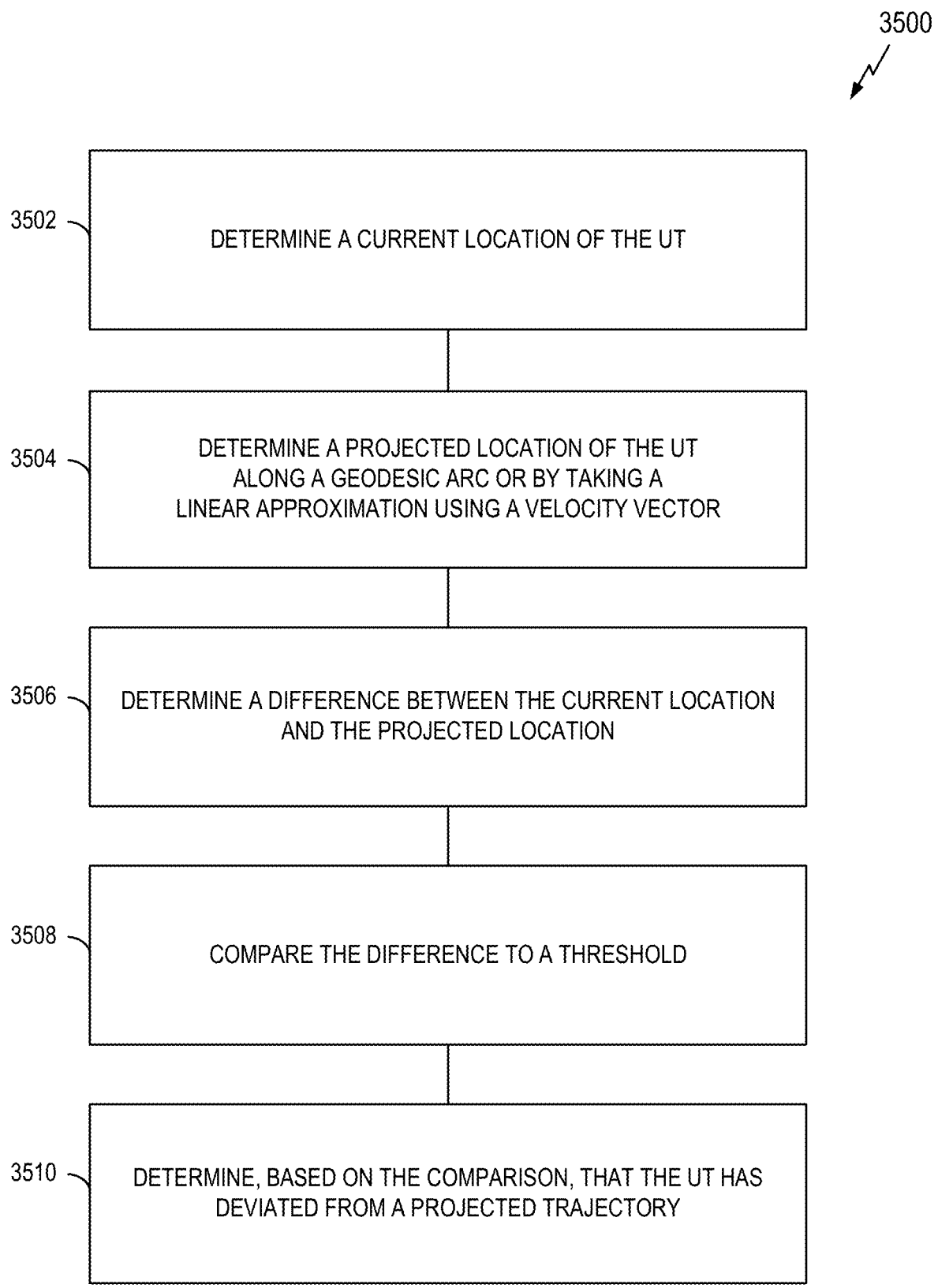
FIG. 35 is a flowchart illustrating an example of a process for detecting a deviation from a projected path in accordance with some aspects of the disclosure.

FIG. 35 illustrates a process 3500 for communication in accordance with some aspects of the disclosure. In some implementations, the process 3500 may be performed in addition to (e.g., in conjunction with) the process 3200 of FIG. 32 (e.g., to detect the change in the location of the UT by determining that the UT has deviated from a projected trajectory). The process 3500 may take place within a processing circuit which may be located in a UT, or some other suitable apparatus. In some implementations, the process 3500 represents operations performed by the control processor 420 of FIG. 4. In some implementations, the process 3500 represents operations performed by the apparatus 3100 of FIG. 31 (e.g., by the processing circuit 3110). Of course, in various aspects within the scope of the disclosure, the process 3500 may be implemented by any suitable apparatus capable of supporting location reporting-related operations.

At block 3502, an apparatus (e.g., a UT) determines a current location of the UT. In some implementations, the circuit/module for detecting 3120 of FIG. 31 performs the operations of block 3502. In some implementations, the code for detecting 3140 of FIG. 31 is executed to perform the operations of block 3502.

At block 3504, the apparatus determines a projected location of the UT along a geodesic arc or by taking a linear approximation using a velocity vector. In some implementations, the circuit/module for detecting 3120 of FIG. 31 performs the operations of block 3504. In some implementations, the code for detecting 3140 of FIG. 31 is executed to perform the operations of block 3504.

At block 3506, the apparatus determines a difference between the current location and the projected location. In some implementations, the circuit/module for detecting 3120 of FIG. 31 performs the operations of block 3506. In some implementations, the code for detecting 3140 of FIG. 31 is executed to perform the operations of block 3506.

At block 3508, the apparatus compares the difference to a threshold. In some implementations, the circuit/module for detecting 3120 of FIG. 31 performs the operations of block 3508. In some implementations, the code for detecting 3140 of FIG. 31 is executed to perform the operations of block 3508.

At block 3510, based on the comparison of block 3508, the apparatus determines that the UT has deviated from a projected trajectory. In some implementations, the circuit/module for detecting 3120 of FIG. 31 performs the operations of block 3510. In some implementations, the code for detecting 3140 of FIG. 31 is executed to perform the operations of block 3510.

Fourteenth Example Process

Figure 36:
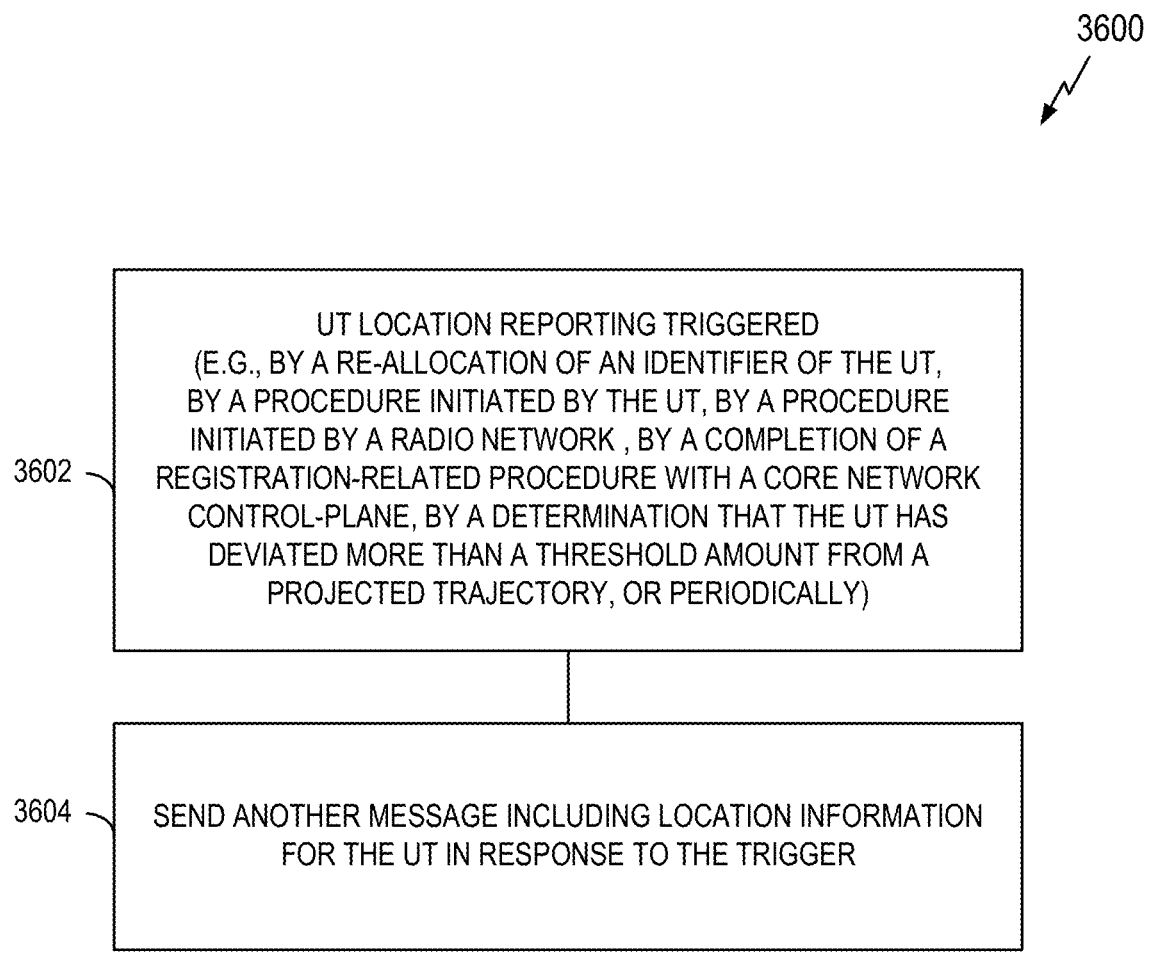
FIG. 36 is a flowchart illustrating another example of a location reporting process in accordance with some aspects of the disclosure.

FIG. 36 illustrates a process 3600 for communication in accordance with some aspects of the disclosure. In some implementations, the process 3600 may be performed in addition to (e.g., in conjunction with) the process 3200 of FIG. 32. The process 3600 may take place within a processing circuit which may be located in a UT, or some other suitable apparatus. In some implementations, the process 3600 represents operations performed by the control processor 420 of FIG. 4. In some implementations, the process 3600 represents operations performed by the apparatus 3100 of FIG. 31 (e.g., by the processing circuit 3110). Of course, in various aspects within the scope of the disclosure, the process 3600 may be implemented by any suitable apparatus capable of supporting location reporting-related operations.

At block 3602, UT location reporting is triggered at an apparatus (e.g., a UT). In some implementations, the circuit/module for sending 3122 of FIG. 31 performs the operations of block 3602. In some implementations, the code for sending 3142 of FIG. 31 is executed to perform the operations of block 3602.

In some aspects, the sending of another location report message is triggered by a re-allocation of an identifier of the UT. In some aspects, the sending of another location report message is triggered by a procedure initiated by the UT. In some aspects, the sending of another location report message is triggered by a procedure initiated by a radio network. In some aspects, the sending of another location report message is triggered by a completion of a registration-related procedure with a core network control-plane (CNCP). In some aspects, the sending of another location report message is triggered by a determination (e.g., by the UT) that the UT has deviated more than a threshold amount from a projected trajectory (e.g., determined as discussed in FIG. 35). In some aspects, the sending of another location report message is triggered periodically.

At block 3604, the apparatus sends another message including location information for the UT. In some implementations, the circuit/module for sending 3122 of FIG. 31 performs the operations of block 3604. In some implementations, the code for sending 3142 of FIG. 31 is executed to perform the operations of block 3604.

Fifteenth Example Process

Figure 37:
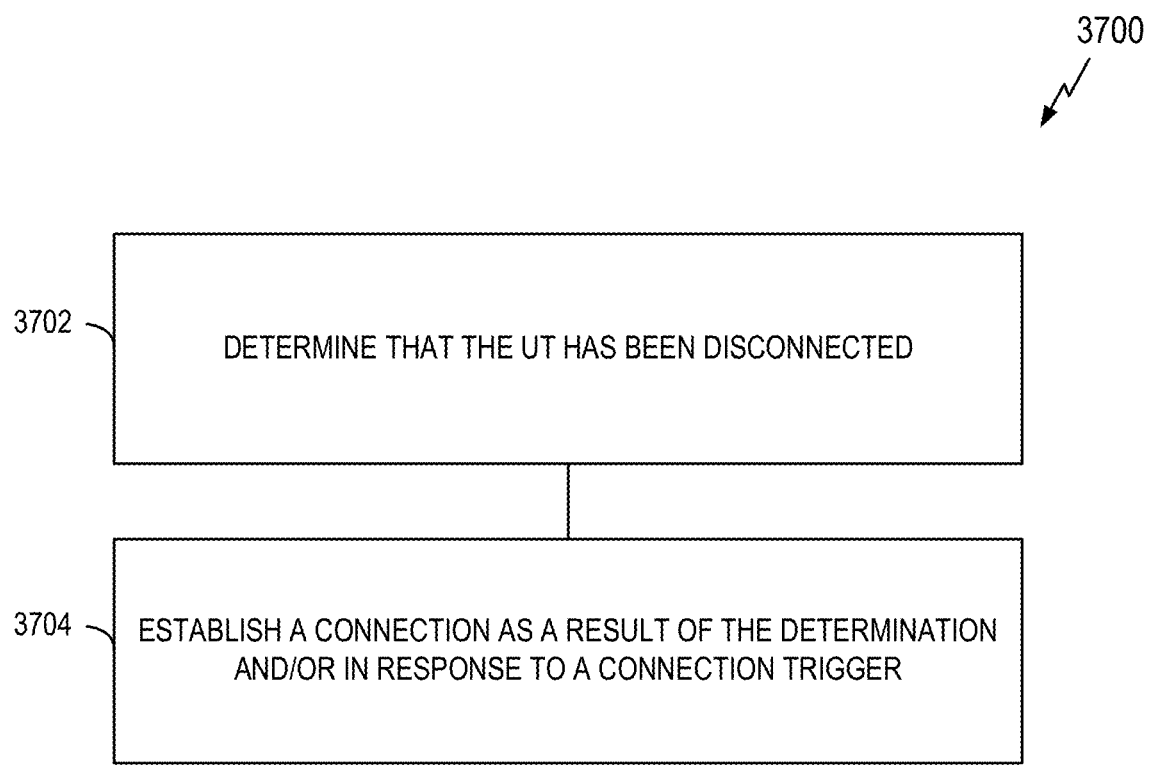
FIG. 37 is a flowchart illustrating an example of a connection process in accordance with some aspects of the disclosure.

FIG. 37 illustrates a process 3700 for communication in accordance with some aspects of the disclosure. In some implementations, the process 3700 may be performed in addition to (e.g., in conjunction with) the process 3200 of FIG. 32. The process 3700 may take place within a processing circuit which may be located in a UT, or some other suitable apparatus. In some implementations, the process 3700 represents operations performed by the control processor 420 of FIG. 4. In some implementations, the process 3700 represents operations performed by the apparatus 3100 of FIG. 31 (e.g., by the processing circuit 3110). Of course, in various aspects within the scope of the disclosure, the process 3700 may be implemented by any suitable apparatus capable of supporting location reporting-related operations.

At block 3702, an apparatus (e.g., a UT) determines that the UT has been disconnected. In some implementations, the circuit/module for determining that a UT has been disconnected 3128 of FIG. 31 performs the operations of block 3702. In some implementations, the code for determining that a UT has been disconnected 3148 of FIG. 31 is executed to perform the operations of block 3702.

At block 3704, the apparatus establishes a connection as a result of the determination that the UT has been disconnected at block 3702 and/or in response to a connection trigger. In some aspects, the connection trigger includes at least one of: a location of the UT has changed by a threshold amount since the determination that the UT has been disconnected, the UT has moved to a different paging area since the determination that the UT has been disconnected, or a defined amount of time has elapsed since the determination that the UT has been disconnected. In some implementations, the circuit/module for establishing 3130 of FIG. 31 performs the operations of block 3704. In some implementations, the code for establishing 3150 of FIG. 31 is executed to perform the operations of block 3704.

Sixteenth Example Process

Figure 38:
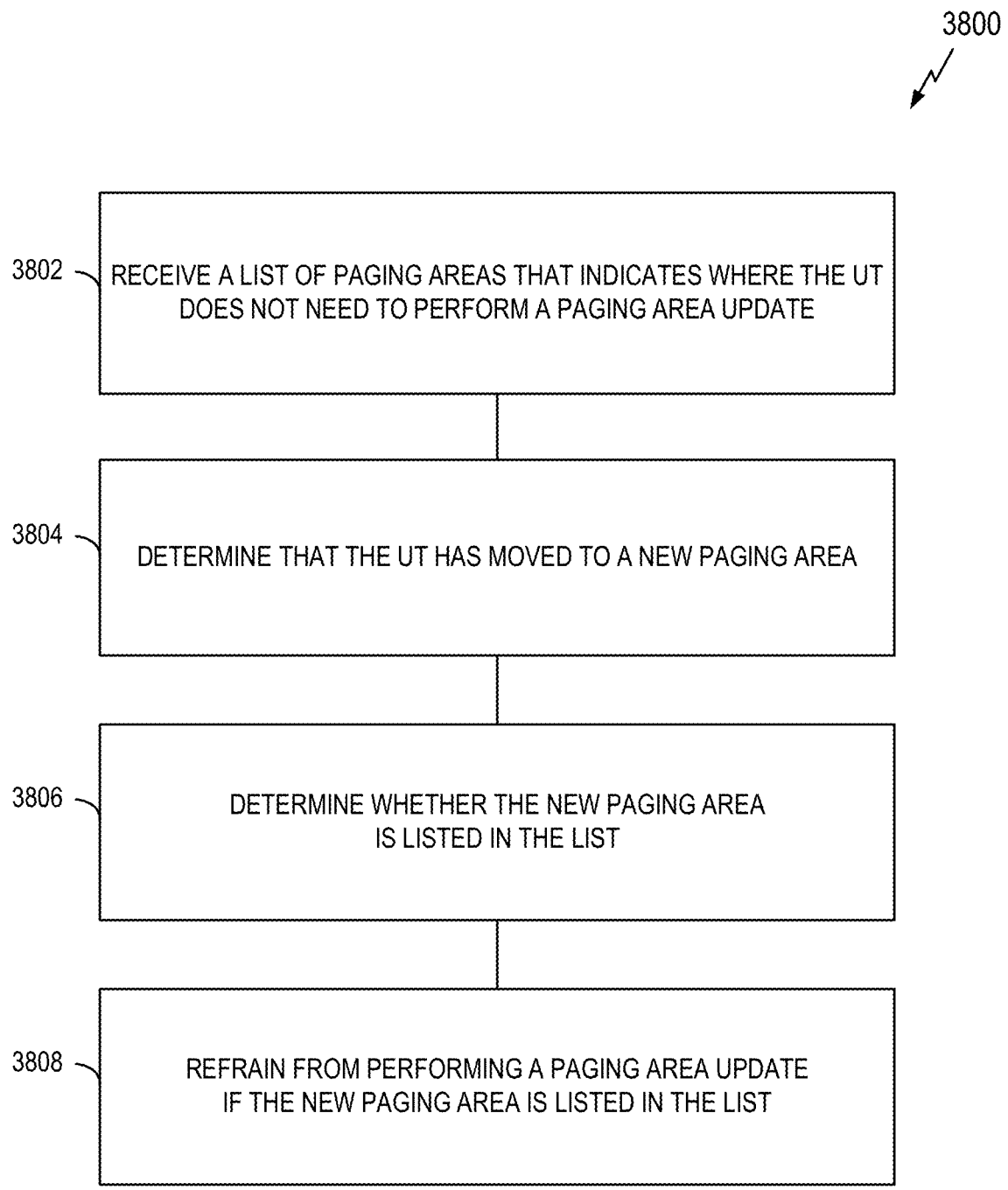
FIG. 38 is a flowchart illustrating an example of a paging area process in accordance with some aspects of the disclosure.

FIG. 38 illustrates a process 3800 for communication in accordance with some aspects of the disclosure. In some implementations, the process 3800 may be performed in addition to (e.g., in conjunction with) the process 3200 of FIG. 32. The process 3800 may take place within a processing circuit which may be located in a UT, or some other suitable apparatus. In some implementations, the process 3800 represents operations performed by the control processor 420 of FIG. 4. In some implementations, the process 3800 represents operations performed by the apparatus 3100 of FIG. 31 (e.g., by the processing circuit 3110). Of course, in various aspects within the scope of the disclosure, the process 3800 may be implemented by any suitable apparatus capable of supporting location reporting-related operations.

At block 3802, an apparatus (e.g., a UT) receives a list of paging areas that indicates where the UT does not need to perform a paging area update. In some implementations, the circuit/module for receiving 3132 of FIG. 31 performs the operations of block 3802. In some implementations, the code for receiving 3152 of FIG. 31 is executed to perform the operations of block 3802.

At block 3804, the apparatus determines that the UT has moved to a new paging area. In some implementations, the circuit/module for determining that a UT has moved 3134 of FIG. 31 performs the operations of block 3804. In some implementations, the code for determining that a UT has moved 3154 of FIG. 31 is executed to perform the operations of block 3804.

At block 3806, the apparatus determines whether the new paging area (from block 3804) is listed in the list. In some implementations, the circuit/module for determining whether a paging area is listed 3136 of FIG. 31 performs the operations of block 3806. In some implementations, the code for determining whether a paging area is listed 3156 of FIG. 31 is executed to perform the operations of block 3806.

At block 3808, if the new paging area is listed in the list (received at block 3802), the apparatus refrains from performing a paging area update. In some implementations, the circuit/module for refraining 3138 of FIG. 31 performs the operations of block 3808. In some implementations, the code for refraining 3158 of FIG. 31 is executed to perform the operations of block 3808.

Seventeenth Example Process

Figure 39:
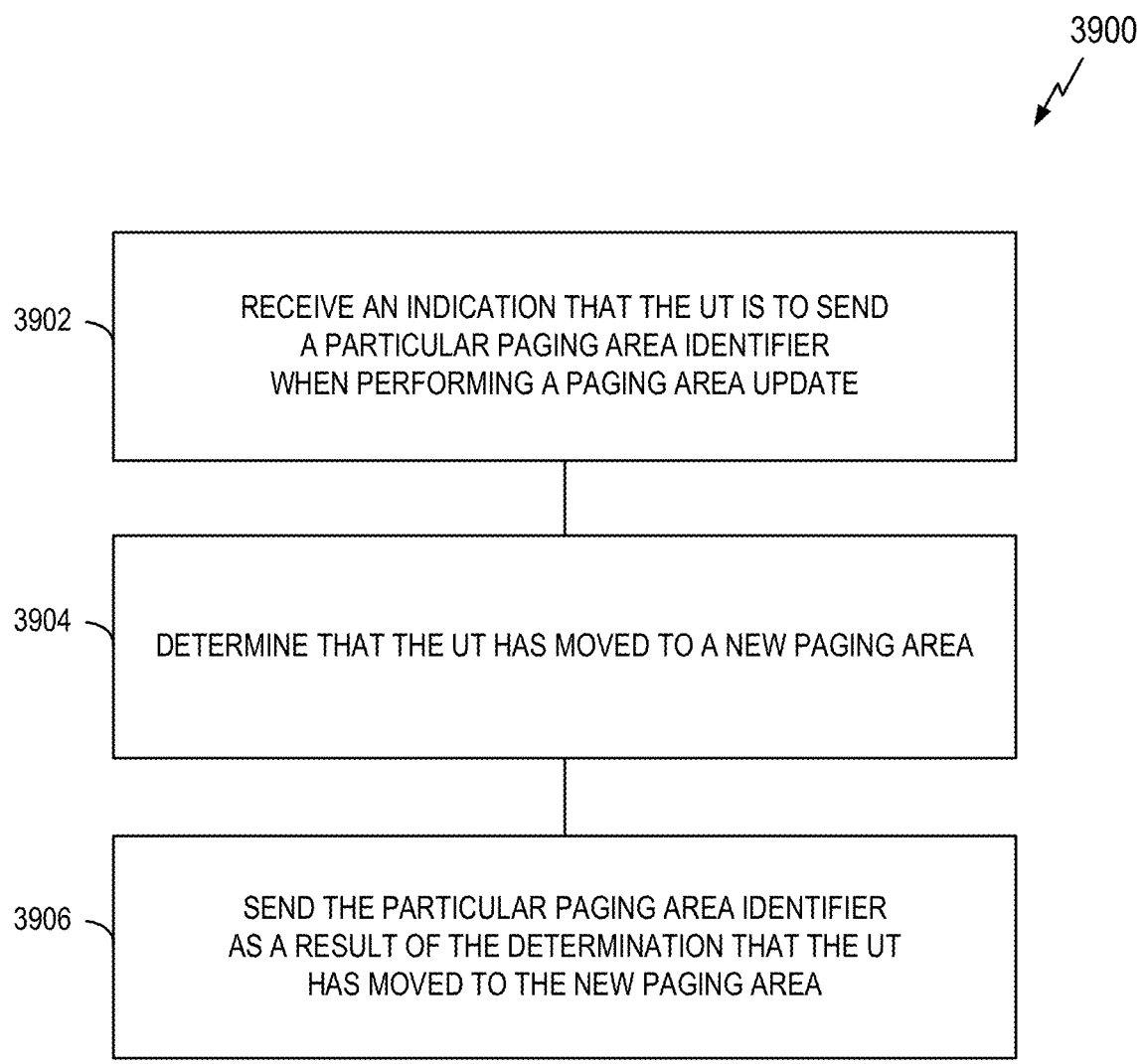
FIG. 39 is a flowchart illustrating an example of a paging area identifier process in accordance with some aspects of the disclosure.

FIG. 39 illustrates a process 3900 for communication in accordance with some aspects of the disclosure. In some implementations, the process 3900 may be performed in addition to (e.g., in conjunction with) the process 3200 of FIG. 32. The process 3900 may take place within a processing circuit which may be located in a UT, or some other suitable apparatus. In some implementations, the process 3900 represents operations performed by the control processor 420 of FIG. 4. In some implementations, the process 3900 represents operations performed by the apparatus 3100 of FIG. 31 (e.g., by the processing circuit 3110). Of course, in various aspects within the scope of the disclosure, the process 3900 may be implemented by any suitable apparatus capable of supporting location reporting-related operations.

At block 3902, an apparatus (e.g., a UT) receives an indication that the UT is to send a particular paging area identifier when performing a paging area update. In some implementations, the circuit/module for receiving 3132 of FIG. 31 performs the operations of block 3902. In some implementations, the code for receiving 3152 of FIG. 31 is executed to perform the operations of block 3902.

At block 3904, the apparatus determines that the UT has moved to a new paging area. In some implementations, the circuit/module for determining that a UT has moved 3134 of FIG. 31 performs the operations of block 3904. In some implementations, the code for determining that a UT has moved 3154 of FIG. 31 is executed to perform the operations of block 3904.

At block 3906, the apparatus sends the particular paging area identifier as a result of the determination that the UT has moved to the new paging area. In some implementations, the circuit/module for sending 3122 of FIG. 31 performs the operations of block 3906. In some implementations, the code for sending 3142 of FIG. 31 is executed to perform the operations of block 3906.

ADDITIONAL ASPECTS

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of a, b, or c" or "one or more of a, b, or c" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

The invention claimed is:

1. A method of wireless communication by a user terminal, the method comprising:
by one or more processors of the user terminal:
receiving, from a network, an idle mode threshold distance and a connected mode threshold distance;
based on whether the user terminal is in an idle mode or a connected mode, selecting a threshold distance from the idle mode threshold distance received from the network and the connected mode threshold distance received from the network;
detecting that a change in a location of the user terminal satisfies the selected threshold distance; and sending, to the network, a message including location information of the user terminal in response to detecting that a change in a location of the user terminal satisfies the selected threshold distance.

2. The method of claim 1, wherein the location information comprises geographic coordinates indicative of a current location of the user terminal.

3. The method of claim 1, wherein the location information indicates a velocity vector of the user terminal.

4. The method of claim 1, wherein the location information indicates an acceleration vector of the user terminal.

5. The method of claim 1, wherein the message further includes timing information indicative of a time of a location measurement.

6. The method of claim 1, wherein the message further includes timing information indicative of a time at which the message is sent.

7. An apparatus for wireless communication comprising:
a memory; and
a processor coupled to the memory, the processor and the memory configured to:
receive, from a network, an idle mode threshold distance and a connected mode threshold distance;
based on whether a user terminal is in an idle mode or a connected mode, select a threshold distance from the idle mode threshold distance received from the network and the connected mode threshold distance received from the network;
detect that a change in a location of the user terminal satisfies the selected threshold distance; and
send, to the network, a message including location information of the user terminal in response to detecting that a change in a location of the user terminal satisfies the selected threshold distance.

8. The apparatus of claim 7, wherein the location information comprises geographic coordinates indicative of a current location of the user terminal.

9. The apparatus of claim 7, wherein the location information indicates a velocity vector of the user terminal.

10. The apparatus of claim 7, wherein the location information indicates an acceleration vector of the user terminal.

11. The apparatus of claim 7, wherein the message further includes timing information indicative of a time of a location measurement.

12. The apparatus of claim 7, wherein the message further includes timing information indicative of a time at which the message is sent.

13. A non-transitory computer-readable medium storing computer-executable code for wireless communication including code to:
receive, from a network, an idle mode threshold distance and a connected mode threshold distance;
based on whether a user terminal is in an idle mode or a connected mode, select a threshold distance from the idle mode threshold distance received from the network and the connected mode threshold distance received from the network;
detect that a change in a location of the user terminal satisfies the selected threshold distance; and
send, to the network, a message including location information of the user terminal in response to detecting that a change in a location of the user terminal satisfies the selected threshold distance.

14. The non-transitory computer-readable medium of claim 13, wherein the location information comprises geographic coordinates indicative of a current location of the user terminal.

15. The non-transitory computer-readable medium of claim 13, wherein the location information indicates a velocity vector of the user terminal.

16. The non-transitory computer-readable medium of claim 13, wherein the location information indicates an acceleration vector of the user terminal.

17. The non-transitory computer-readable medium of claim 13, wherein the message further includes timing information indicative of a time of a location measurement.

18. An apparatus comprising:
means for receiving, from a network, an idle mode threshold distance and a connected mode threshold distance;
means for, based on whether a user terminal is in an idle mode or a connected mode, selecting a threshold distance from the idle mode threshold distance received from the network and the connected mode threshold distance received from the network;
means for detecting that a change in a location of the user terminal satisfies the selected threshold distance; and
means for sending, to the network, a message including location information of the user terminal in response to detecting that a change in a location of the user terminal satisfies the selected threshold distance.

19. The apparatus of claim 18, wherein the location information comprises geographic coordinates indicative of a current location of the user terminal.

20. The apparatus of claim 18, the location information indicates a velocity vector of the user terminal.

21. The apparatus of claim 18, wherein the location information indicates an acceleration vector of the user terminal.

22. The apparatus of claim 18, wherein the message further includes timing information indicative of a time of a location measurement.

* * * * *